United States Patent
Banning

(10) Patent No.: US 11,841,997 B2
(45) Date of Patent: Dec. 12, 2023

(54) APPARATUS FOR CONTROLLING CONTENTS OF A COMPUTER-GENERATED IMAGE USING 3D MEASUREMENTS

(71) Applicant: UltimatePointer, L.L.C., Houston, TX (US)

(72) Inventor: Erik Jan Banning, Houston, TX (US)

(73) Assignee: UltimatePointer, L.L.C., Houston, TX (US)

( * ) Notice: Subject to any disclaimer, the term of this patent is extended or adjusted under 35 U.S.C. 154(b) by 21 days.

(21) Appl. No.: 17/853,361

(22) Filed: Jun. 29, 2022

(65) Prior Publication Data

US 2022/0334655 A1 Oct. 20, 2022

Related U.S. Application Data

(63) Continuation of application No. 16/447,559, filed on Jun. 20, 2019, now abandoned, which is a continuation of application No. 15/014,879, filed on Feb. 3, 2016, now Pat. No. 10,372,237, which is a continuation of application No. 11/483,170, filed on Jul. 7, 2006, now Pat. No. 9,285,897.

(Continued)

(51) Int. Cl.
G09G 5/00 (2006.01)
G06F 3/0346 (2013.01)

(52) U.S. Cl.
CPC ................... *G06F 3/0346* (2013.01)

(58) Field of Classification Search
CPC ........ G06F 3/0346; G06F 3/005; G06F 3/012; G06F 3/033; G06F 3/0338; G06F 3/03549; G06F 3/038; G03B 21/00; G03B 21/006
See application file for complete search history.

(56) References Cited

U.S. PATENT DOCUMENTS 3,983,474 A 9/1976 Kuipers
4,054,881 A 10/1977 Raab
(Continued)

FOREIGN PATENT DOCUMENTS

GB 2324150 A 10/1998
JP S58-163039 A 9/1983
(Continued)

OTHER PUBLICATIONS

U.S. Appl. No. 60/566,444, filed Apr. 30, 2004, Liberty et al.
(Continued)

*Primary Examiner* — Insa Sadio
(74) *Attorney, Agent, or Firm* — Jason H. Vick; Sheridan Ross, PC

(57) ABSTRACT

A method for controlling a computer display cursor in an interaction region includes projecting an image of the computer display to create the interaction region. A distance is established between a first point and a second point. The first point has a predetermined relation to the projection device, and the second point has a predetermined relation to the interaction region. At least one of an orientation and a position of a pointing line is measured. The pointing line has a predetermined relation to a pointing device. The established distance and the at least one of measured position and orientation are used to control the cursor position on the interaction region.

13 Claims, 25 Drawing Sheets

Related U.S. Application Data

(60) Provisional application No. 60/742,393, filed on Dec. 5, 2005, provisional application No. 60/698,702, filed on Jul. 13, 2005.

(56) References Cited

U.S. PATENT DOCUMENTS

| | | |
|---|---|---|
| 4,099,719 A | 7/1978 | Dean et al. |
| 4,298,874 A | 11/1981 | Kuipers |
| 4,314,251 A | 2/1982 | Raab |
| 4,328,548 A | 5/1982 | Crow et al. |
| 4,346,384 A | 8/1982 | Raab |
| 4,349,815 A | 9/1982 | Spooner |
| 4,395,045 A | 7/1983 | Baer |
| 4,521,772 A | 6/1985 | Lyon |
| 4,550,250 A | 10/1985 | Mueller et al. |
| 4,562,433 A | 12/1985 | Biferno |
| 4,565,999 A | 1/1986 | King et al. |
| 4,567,479 A | 1/1986 | Boyd |
| 4,613,866 A | 9/1986 | Blood |
| 4,619,616 A | 10/1986 | Clarke |
| 4,641,255 A | 2/1987 | Hohmann |
| 4,654,648 A | 3/1987 | Herrington et al. |
| 4,682,159 A | 7/1987 | Davison |
| 4,682,195 A | 7/1987 | Yilmaz |
| 4,688,037 A | 8/1987 | Krieg |
| 4,719,455 A | 1/1988 | Louis |
| 4,730,186 A | 3/1988 | Koga et al. |
| 4,737,794 A | 4/1988 | Jones |
| 4,742,356 A | 5/1988 | Kuipers |
| 4,745,402 A | 5/1988 | Auerbach |
| 4,768,028 A | 8/1988 | Blackie |
| 4,787,051 A | 11/1988 | Olson |
| 4,796,019 A | 1/1989 | Auerbach |
| 4,823,170 A | 4/1989 | Hansen |
| 4,832,170 A | 5/1989 | Takeuchi et al. |
| 4,833,785 A | 5/1989 | Parent et al. |
| 4,839,838 A | 6/1989 | LaBiche et al. |
| 4,959,721 A | 9/1990 | Micic et al. |
| 5,009,501 A | 4/1991 | Fenner et al. |
| 5,023,943 A | 6/1991 | Heberle |
| 5,045,843 A | 9/1991 | Hansen |
| 5,047,754 A | 9/1991 | Akatsuka et al. |
| 5,095,302 A | 3/1992 | McLean et al. |
| 5,117,375 A | 5/1992 | Worcester et al. |
| 5,179,656 A | 1/1993 | Lisle |
| 5,181,181 A | 1/1993 | Glynn |
| 5,231,674 A | 7/1993 | Cleveland et al. |
| 5,235,363 A | 8/1993 | Vogeley et al. |
| 5,262,777 A | 11/1993 | Low et al. |
| 5,274,363 A | 12/1993 | Koved et al. |
| 5,296,838 A | 3/1994 | Suzuki |
| 5,307,072 A | 4/1994 | Jones, Jr. |
| 5,327,528 A | 7/1994 | Hidaka et al. |
| 5,339,095 A | 8/1994 | Redford |
| 5,349,460 A | 9/1994 | Ogasahara et al. |
| 5,349,529 A | 9/1994 | Masumoto et al. |
| 5,351,969 A | 10/1994 | Smith, III et al. |
| 5,355,148 A | 10/1994 | Andeson |
| 5,359,348 A | 10/1994 | Pilcher et al. |
| 5,363,120 A | 11/1994 | Drumm |
| 5,365,461 A | 11/1994 | Stein et al. |
| 5,367,315 A | 11/1994 | Pan |
| 5,388,199 A | 2/1995 | Kakazu et al. |
| 5,394,360 A | 2/1995 | Fukumoto |
| 5,416,535 A | 5/1995 | Sato et al. |
| 5,436,616 A | 7/1995 | Futatsugi et al. |
| 5,440,326 A | 8/1995 | Quinn |
| 5,448,261 A | 9/1995 | Koike et al. |
| 5,448,263 A | 9/1995 | Martin |
| 5,453,686 A | 9/1995 | Anderson |
| D364,610 S | 11/1995 | Sanchez et al. |
| 5,469,193 A | 11/1995 | Giobbi et al. |
| 5,484,966 A | 1/1996 | Segen |
| 5,488,392 A | 1/1996 | Harris |
| 5,502,459 A | 3/1996 | Marshall et al. |
| 5,506,605 A | 4/1996 | Paley |
| 5,508,719 A | 4/1996 | Gervais |
| 5,515,079 A | 5/1996 | Hauck |
| 5,530,456 A | 6/1996 | Kokubo |
| 5,552,705 A | 9/1996 | Keller |
| 5,564,005 A | 10/1996 | Weber et al. |
| 5,574,479 A | 11/1996 | Odell |
| 5,598,187 A | 1/1997 | Ide et al. |
| 5,602,568 A | 2/1997 | Kim |
| 5,602,569 A | 2/1997 | Kato |
| 5,606,124 A | 2/1997 | Doyle et al. |
| 5,627,565 A | 5/1997 | Morishita et al. |
| 5,629,500 A | 5/1997 | Fukuzaki et al. |
| 5,631,669 A | 5/1997 | Stobbs et al. |
| 5,638,092 A | 6/1997 | Eng et al. |
| 5,646,525 A | 7/1997 | Gilboa |
| 5,654,741 A | 8/1997 | Sampsell et al. |
| 5,664,005 A | 9/1997 | Emery et al. |
| 5,668,574 A | 9/1997 | Jarlance-Huang |
| 5,691,747 A | 11/1997 | Amano |
| 5,703,623 A | 12/1997 | Hall et al. |
| 5,712,658 A | 1/1998 | Arita et al. |
| 5,724,264 A | 3/1998 | Rosenberg et al. |
| 5,734,371 A | 3/1998 | Kaplan |
| 5,760,397 A | 6/1998 | Huguenin et al. |
| 5,760,766 A | 6/1998 | Auber et al. |
| 5,767,669 A | 6/1998 | Hansen et al. |
| 5,774,063 A | 6/1998 | Berry et al. |
| 5,790,076 A | 8/1998 | Sypniewski |
| 5,791,351 A | 8/1998 | Curchod |
| 5,793,354 A | 8/1998 | Kaplan |
| 5,796,386 A | 8/1998 | Lipscomb et al. |
| 5,819,260 A | 10/1998 | Lu et al. |
| 5,835,078 A | 11/1998 | Arita et al. |
| 5,850,304 A | 12/1998 | Elmers et al. |
| 5,851,183 A | 12/1998 | Bucholz |
| 5,870,082 A | 2/1999 | Selker et al. |
| 5,877,748 A | 3/1999 | Redlich |
| 5,883,616 A | 3/1999 | Koizumi et al. |
| 5,898,421 A | 4/1999 | Quinn |
| 5,898,424 A | 4/1999 | Flannery |
| 5,898,425 A | 4/1999 | Sekine |
| 5,913,727 A | 6/1999 | Ahdoot |
| 5,914,702 A | 6/1999 | Derocher et al. |
| 5,926,168 A | 7/1999 | Fan |
| 5,929,444 A | 7/1999 | Leichner |
| 5,931,747 A | 8/1999 | Mast |
| 5,952,996 A | 9/1999 | Kim et al. |
| 5,963,134 A | 10/1999 | Bowers et al. |
| 5,986,644 A | 11/1999 | Herder et al. |
| 5,999,167 A | 12/1999 | Marsh et al. |
| 6,002,099 A | 12/1999 | Martin et al. |
| 6,012,980 A | 1/2000 | Yoshida et al. |
| 6,014,139 A | 1/2000 | Watson et al. |
| 6,020,877 A | 2/2000 | Smith |
| 6,037,943 A | 3/2000 | Crone et al. |
| 6,067,085 A | 5/2000 | Modh et al. |
| 6,069,594 A | 5/2000 | Barnes et al. |
| 6,073,043 A | 6/2000 | Schneider |
| 6,075,508 A | 6/2000 | Ono et al. |
| 6,084,556 A | 7/2000 | Zwern |
| 6,094,190 A | 7/2000 | Kodim |
| 6,104,380 A | 8/2000 | Stork et al. |
| 6,104,390 A | 8/2000 | Sturgeon et al. |
| 6,110,039 A | 8/2000 | Oh |
| 6,130,534 A | 10/2000 | Huang et al. |
| 6,130,663 A | 10/2000 | Null |
| 6,130,664 A | 10/2000 | Suzuki |
| 6,134,506 A | 10/2000 | Rosenberg et al. |
| 6,146,278 A | 11/2000 | Kobayashi |
| 6,171,190 B1 | 1/2001 | Thanasack et al. |
| 6,172,354 B1 | 1/2001 | Adan et al. |
| 6,184,847 B1 | 2/2001 | Fateh et al. |
| 6,184,863 B1 | 2/2001 | Sibert et al. |
| 6,186,630 B1 | 2/2001 | Miyashita |
| 6,191,773 B1 | 2/2001 | Maruno et al. |
| 6,195,085 B1 | 2/2001 | Becker et al. |
| 6,212,296 B1 | 4/2001 | Stork et al. |

(56) References Cited

U.S. PATENT DOCUMENTS

| | | |
|---|---|---|
| 6,271,831 B1 | 8/2001 | Escobosa et al. |
| 6,275,214 B1 | 8/2001 | Hansen |
| 6,285,379 B1 | 9/2001 | Gallery |
| 6,292,171 B1 | 9/2001 | Fu et al. |
| 6,297,804 B1 | 10/2001 | Kishitani |
| 6,317,118 B1 | 11/2001 | Yoneno |
| 6,326,979 B1 | 12/2001 | Radeztsky |
| 6,335,723 B1 | 1/2002 | Wood et al. |
| 6,342,878 B1 | 1/2002 | Chevassus et al. |
| 6,346,933 B1 | 2/2002 | Lin |
| 6,353,434 B1 | 3/2002 | Akebi et al. |
| 6,373,961 B1 | 4/2002 | Richardson et al. |
| 6,385,331 B2 | 5/2002 | Harakawa et al. |
| 6,388,656 B1 | 5/2002 | Chae |
| 6,400,139 B1 | 6/2002 | Khalfin et al. |
| 6,404,416 B1 | 6/2002 | Kahn et al. |
| 6,411,277 B1 | 6/2002 | Shah-Nazaroff |
| 6,417,840 B1 | 7/2002 | Daniels |
| 6,424,340 B1 | 7/2002 | Holtzman et al. |
| 6,426,741 B1 | 7/2002 | Goldsmith et al. |
| 6,452,606 B1 | 9/2002 | Luzzatto |
| 6,456,567 B1 | 9/2002 | Blevins et al. |
| 6,466,198 B1 | 10/2002 | Feinstein |
| 6,466,232 B1 | 10/2002 | Newell et al. |
| 6,467,184 B1 | 10/2002 | Wust et al. |
| 6,469,624 B1 | 10/2002 | Whan et al. |
| 6,483,499 B1 | 11/2002 | Li et al. |
| 6,492,981 B1 | 12/2002 | Stork et al. |
| 6,504,526 B1 | 1/2003 | Mauritz |
| 6,507,339 B1 | 1/2003 | Tanaka |
| 6,509,888 B1 | 1/2003 | Tuovinen et al. |
| 6,509,896 B1 | 1/2003 | Saikawa et al. |
| 6,520,647 B2 | 2/2003 | Raskar |
| 6,529,186 B1 | 3/2003 | Thayer |
| 6,531,999 B1 | 3/2003 | Trajkovic |
| 6,558,002 B1 | 3/2003 | Miyashita |
| 6,545,661 B1 | 4/2003 | Goschy et al. |
| 6,545,664 B1 | 4/2003 | Kim |
| 6,559,833 B2 | 5/2003 | Rowe |
| 6,567,071 B1 | 5/2003 | Curran et al. |
| 6,569,094 B2 | 5/2003 | Suzuki et al. |
| 6,592,461 B1 | 7/2003 | Raviv et al. |
| 6,600,478 B2 | 7/2003 | White et al. |
| 6,606,083 B1 | 8/2003 | Murray et al. |
| 6,608,668 B2 | 8/2003 | Gharib et al. |
| 6,608,688 B1 | 8/2003 | Faul et al. |
| 6,618,076 B1 | 9/2003 | Sukthankar et al. |
| 6,642,918 B2 | 11/2003 | Uchida et al. |
| 6,704,000 B2 | 3/2004 | Carpenter |
| 6,712,692 B2 | 3/2004 | Basson et al. |
| 6,727,877 B2 | 4/2004 | Itakura |
| 6,727,885 B1 | 4/2004 | Ishino et al. |
| 6,774,869 B2 | 4/2004 | Biocca et al. |
| 6,750,848 B1 | 6/2004 | Pryor |
| 6,757,068 B2 | 6/2004 | Foxlin |
| 6,764,185 B1 | 7/2004 | Beardsley et al. |
| 6,766,066 B2 | 7/2004 | Kitazawa |
| 6,784,660 B2 | 8/2004 | Ashe |
| 6,788,289 B2 | 9/2004 | Kitazawa |
| 6,795,068 B1 | 9/2004 | Marks |
| 6,809,726 B2 | 10/2004 | Kavanagh |
| 6,847,356 B1 | 1/2005 | Hasegawa et al. |
| 6,852,032 B2 | 2/2005 | Ishino |
| 6,877,863 B2 | 4/2005 | Wood et al. |
| 6,952,198 B2 | 10/2005 | Hansen |
| 6,982,699 B1 | 1/2006 | Lenssen et al. |
| 7,031,875 B2 | 4/2006 | Ellenby et al. |
| 7,035,897 B1 | 4/2006 | Devereaux et al. |
| 7,075,514 B2 | 7/2006 | Tanaka |
| 7,081,051 B2 | 7/2006 | Himoto et al. |
| 7,091,949 B2 | 8/2006 | Hansen |
| 7,102,616 B1 | 9/2006 | Sleator |
| 7,145,551 B1 | 12/2006 | Bathiche et al. |
| 7,158,117 B2 | 1/2007 | Sato et al. |
| 7,158,118 B2 | 1/2007 | Liberty |
| 7,161,578 B1 | 1/2007 | Schneider |
| 7,176,881 B2 | 2/2007 | Nishimura et al. |
| 7,176,887 B2 | 2/2007 | Marvit et al. |
| 7,176,888 B2 | 2/2007 | Marvit et al. |
| 7,223,173 B2 | 5/2007 | Masuyama et al. |
| 7,236,156 B2 | 6/2007 | Liberty et al. |
| 7,239,301 B2 | 7/2007 | Liberty et al. |
| 7,262,760 B2 | 8/2007 | Liberty |
| 7,301,648 B2 | 11/2007 | Foxlin |
| 7,367,809 B2 | 5/2008 | Takahashi |
| 7,414,611 B2 | 8/2008 | Liberty |
| 7,432,879 B2 | 10/2008 | Schonlau |
| 7,489,298 B2 | 2/2009 | Liberty |
| 7,489,299 B2 | 2/2009 | Liberty et al. |
| 7,535,456 B2 | 5/2009 | Liberty et al. |
| 7,559,656 B2 | 7/2009 | Yumiki et al. |
| 7,601,066 B1 | 10/2009 | Masuyama et al. |
| 7,646,372 B2 | 1/2010 | Marks et al. |
| 7,746,321 B2 | 6/2010 | Banning |
| 7,796,116 B2 | 9/2010 | Salsman et al. |
| 7,830,362 B2 | 11/2010 | Finley |
| 7,852,317 B2 | 12/2010 | Grunnet-Jepsen et al. |
| 7,859,523 B2 | 12/2010 | Kong |
| 7,907,154 B2 | 3/2011 | Ryowski et al. |
| 8,049,729 B2 | 11/2011 | Banning |
| 8,072,424 B2 | 12/2011 | Liberty |
| 8,537,231 B2 | 9/2013 | Mekenkamp et al. |
| 8,723,803 B2 | 5/2014 | Banning |
| 8,866,742 B2 | 10/2014 | Banning |
| 8,982,050 B2 | 3/2015 | Solomon et al. |
| 9,063,586 B2 | 6/2015 | Banning |
| 9,210,376 B2 | 12/2015 | Yu et al. |
| 9,285,897 B2 | 3/2016 | Banning |
| 9,411,437 B2 | 8/2016 | Banning |
| 9,414,125 B2 | 8/2016 | Ferren et al. |
| 9,479,721 B2 | 10/2016 | Ivanich et al. |
| 9,602,584 B2 | 3/2017 | Chen |
| 9,721,466 B2 | 8/2017 | Sallas et al. |
| 9,785,255 B2 | 10/2017 | Banning |
| 10,307,908 B2 | 6/2019 | Reekmans et al. |
| 10,318,019 B2 | 6/2019 | Banning |
| 10,372,237 B2 | 8/2019 | Banning |
| 10,372,397 B2 | 8/2019 | Yu et al. |
| 10,402,693 B2 | 9/2019 | Chen |
| 10,459,535 B2 | 10/2019 | Banning |
| 10,521,778 B2 | 12/2019 | Bull et al. |
| 10,565,599 B2 | 2/2020 | Rodkey |
| 10,698,502 B2 | 6/2020 | Banning |
| 10,878,692 B2 | 12/2020 | Sallas et al. |
| 10,939,159 B1 | 3/2021 | Fuchs et al. |
| 11,073,919 B2 | 7/2021 | Banning |
| 11,244,561 B1 | 2/2022 | Fuchs et al. |
| 11,402,927 B2 | 8/2022 | Banning |
| 11,409,376 B2 | 8/2022 | Banning |
| 11,416,084 B2 | 8/2022 | Banning |
| 2001/0010514 A1 | 8/2001 | Ishino |
| 2001/0043719 A1 | 11/2001 | Harakawa et al. |
| 2001/0045940 A1 | 11/2001 | Hansen |
| 2001/0046896 A1 | 11/2001 | Miyamoto et al. |
| 2002/0024675 A1 | 2/2002 | Foxlin |
| 2002/0027548 A1 | 3/2002 | Yoneno |
| 2002/0042699 A1 | 4/2002 | Tanaka et al. |
| 2002/0057275 A1 | 5/2002 | Parikh et al. |
| 2002/0067350 A1 | 6/2002 | Ben Ayed |
| 2002/0075386 A1 | 6/2002 | Tanaka |
| 2002/0079143 A1 | 6/2002 | Silverstein et al. |
| 2002/0080094 A1 | 6/2002 | Biocca et al. |
| 2002/0084980 A1 | 7/2002 | White et al. |
| 2002/0085097 A1 | 7/2002 | Colmenarez et al. |
| 2002/0089489 A1 | 7/2002 | Carpenter |
| 2002/0190946 A1 | 12/2002 | Metzger |
| 2002/0197584 A1 | 12/2002 | Kendir et al. |
| 2003/0006959 A1 | 1/2003 | Varanda |
| 2003/0017872 A1 | 1/2003 | Oishi et al. |
| 2003/0030622 A1 | 2/2003 | Vaarala |
| 2003/0076299 A1 | 4/2003 | Trajkovic |
| 2003/0107607 A1 | 6/2003 | Nguyen |
| 2003/0117370 A1 | 6/2003 | Van Brocklin et al. |
| 2003/0169233 A1 | 9/2003 | Hansen |

(56) References Cited

U.S. PATENT DOCUMENTS

| | | | |
|---|---|---|---|
| 2003/0193572 A1 | 10/2003 | Wilson et al. | |
| 2003/0202089 A1 | 10/2003 | Alhadef et al. | |
| 2003/0222892 A1 | 12/2003 | Diamond et al. | |
| 2004/0027328 A1 | 2/2004 | Yang | |
| 2004/0046736 A1 | 3/2004 | Pryor et al. | |
| 2004/0070564 A1 | 4/2004 | Dawson et al. | |
| 2004/0073360 A1 | 4/2004 | Foxlin | |
| 2004/0090423 A1 | 5/2004 | Bisset | |
| 2004/0095317 A1* | 5/2004 | Zhang | G06F 3/0346 345/158 |
| 2004/0125073 A1 | 7/2004 | Potter et al. | |
| 2004/0164926 A1 | 8/2004 | Schonlau | |
| 2004/0176925 A1* | 9/2004 | Satoh | G01B 11/002 702/150 |
| 2004/0207597 A1 | 10/2004 | Marks | |
| 2004/0233461 A1 | 11/2004 | Armstrong et al. | |
| 2004/0246229 A1 | 12/2004 | Yamada | |
| 2004/0252102 A1 | 12/2004 | Wilson et al. | |
| 2005/0021470 A1 | 1/2005 | Martin et al. | |
| 2005/0059488 A1 | 3/2005 | Larsen et al. | |
| 2005/0110778 A1 | 3/2005 | Ben Ayed | |
| 2005/0083248 A1 | 4/2005 | Biocca et al. | |
| 2005/0091297 A1 | 4/2005 | Sato et al. | |
| 2005/0093823 A1 | 5/2005 | Hinckley et al. | |
| 2005/0116931 A1 | 6/2005 | Olbrich | |
| 2005/0129325 A1 | 6/2005 | Wu | |
| 2005/0150697 A1 | 7/2005 | Altman et al. | |
| 2005/0162384 A1 | 7/2005 | Yokoyarna | |
| 2005/0174324 A1 | 8/2005 | Liberty et al. | |
| 2006/0109245 A1 | 5/2006 | Wilson et al. | |
| 2006/0246213 A1* | 11/2006 | Moreau | C23C 4/12 118/712 |
| 2006/0261247 A1 | 11/2006 | Chen | |
| 2006/0284792 A1 | 12/2006 | Foxlin | |
| 2007/0060383 A1 | 3/2007 | Dohta | |
| 2007/0066394 A1 | 3/2007 | Ikeda et al. | |
| 2007/0200847 A1 | 8/2007 | Rossler et al. | |
| 2007/0298882 A1 | 12/2007 | Marks et al. | |
| 2008/0136796 A1 | 6/2008 | Dowling | |
| 2011/0095980 A1 | 4/2011 | Sweetser et al. | |
| 2019/0317613 A1 | 10/2019 | Banning | |
| 2022/0350422 A1 | 11/2022 | Banning | |

FOREIGN PATENT DOCUMENTS

| | | |
|---|---|---|
| JP | S60-138628 A | 7/1985 |
| JP | S62-281025 A | 12/1987 |
| JP | H03-176718 A | 7/1991 |
| JP | 04-253220 A | 9/1992 |
| JP | H05-80925 A | 4/1993 |
| JP | H06-308879 A | 11/1994 |
| JP | H07-121293 A | 5/1995 |
| JP | H07-160411 A | 6/1995 |
| JP | H07-191797 A | 7/1995 |
| JP | H07-230354 A | 8/1995 |
| JP | H07-508586 A | 9/1995 |
| JP | H07-271508 A | 10/1995 |
| JP | H07-295737 A | 11/1995 |
| JP | H08-19062 A | 1/1996 |
| JP | H8-71252 A | 3/1996 |
| JP | H08-234900 A | 9/1996 |
| JP | H08-331667 A | 12/1996 |
| JP | H08-335136 A | 12/1996 |
| JP | H09-80372 A | 3/1997 |
| JP | H09-81308 A | 3/1997 |
| JP | H10-91328 A | 4/1998 |
| JP | H10-207631 A | 8/1998 |
| JP | H10-228349 A | 8/1998 |
| JP | H10-232739 A | 9/1998 |
| JP | H11-85395 A | 3/1999 |
| JP | H11-167453 A | 6/1999 |
| JP | H11-211474 A | 8/1999 |
| JP | H11-211480 A | 8/1999 |
| JP | H11-319316 A | 11/1999 |
| JP | 2000-200149 A | 7/2000 |
| JP | 2000-267799 A | 9/2000 |
| JP | 2001-013935 A | 1/2001 |
| JP | 2001-500299 A | 1/2001 |
| JP | 2001-125736 A | 5/2001 |
| JP | 2001-148025 A | 5/2001 |
| JP | 2001-166881 A | 6/2001 |
| JP | 2001-175411 A | 6/2001 |
| JP | 2001-325069 A | 11/2001 |
| JP | 2002-091692 A | 3/2002 |
| JP | 2002-196877 A | 7/2002 |
| JP | 2002-215321 A | 8/2002 |
| JP | 2002-233665 A | 8/2002 |
| JP | 2002-298145 A | 10/2002 |
| JP | 2002-320770 A | 11/2002 |
| JP | 2003-044220 A | 2/2003 |
| JP | 2003-044221 A | 2/2003 |
| JP | 2003-091366 A | 3/2003 |
| JP | 2003-103050 A | 4/2003 |
| JP | 2003-140830 A | 5/2003 |
| JP | 2003-156335 A | 5/2003 |
| JP | 2003-164667 A | 6/2003 |
| JP | 2003 173235 A | 6/2003 |
| JP | 2003-199973 A | 7/2003 |
| JP | 2003-208260 A | 7/2003 |
| JP | 2003-233460 A | 8/2003 |
| JP | 2003-234983 A | 8/2003 |
| JP | 2003-256129 | 9/2003 |
| JP | 2003-279892 A | 10/2003 |
| JP | 2003-280813 A | 10/2003 |
| JP | 2004-013383 | 1/2004 |
| JP | 2004-118807 A | 4/2004 |
| JP | 2004-272433 A | 9/2004 |
| JP | 2004-531791 A | 10/2004 |
| JP | 2004-309659 A | 11/2004 |
| JP | 2005-122534 A | 5/2005 |
| JP | 2005-215828 A | 8/2005 |
| JP | 2005-284874 A | 10/2005 |
| JP | 2006-236195 A | 9/2006 |
| WO | WO 00/60534 A1 | 10/2000 |
| WO | WO 02/07839 A2 | 1/2002 |
| WO | WO 02/075364 | 9/2002 |
| WO | WO 2004/021712 A | 3/2004 |
| WO | WO 2004/104897 A1 | 12/2004 |
| WO | WO 2005/040991 A2 | 5/2005 |
| WO | WO 2005/108119 A2 | 11/2005 |
| WO | WO 2005/109215 A2 | 11/2005 |
| WO | WO 2005/109847 A2 | 11/2005 |
| WO | WO 2005/109879 A2 | 11/2005 |

OTHER PUBLICATIONS

U.S. Appl. No. 60/612,571, filed Sep. 23, 2004, Liberty et al.
U.S. Appl. No. 60/641,410, filed Jan. 5, 2005, Liberty.
AIRcable User Manual; 2005.
Andrejašič, Matej "Mems Accelerometers" University of Ljubljana; Mar. 2008.
Ansar, Adnan et al. "Linear Pose Estimation from Points or Lines" IEEE Transactions on Pattern Analysis and Machine Intelligence 25(5):578-589; Jun. 2003.
Ashdown, Mark S.D. "Personal Projected Displays" University of Cambridge: Technical Report, No. 585; ISSN 1476-2986; Mar. 2004.
Ashdown, Mark et al. "The Escritoire: A Personal Projected Display for Interacting with Documents" University of Cambridge; Technical Report, No. 538; ISSN 1476-2986; Mar. 2002.
Ashdown, Mark et al. "The Writing's on the Wall: Large, Remotely Controlled Displays" In the Proceedings of the First European Conference on Computer-Supported Collaborative Learning; Netherlands; pp. 83-88; Mar. 2001.
Atari Games Corp "Area 51: Sega Saturn Console Game with Stunner Peripheral" Operator's Manual; 1996.
Azuma, Ronald et al. "A Motion-Stabilized Outdoor Augmented Reality System" Proceedings of IEEE Virtual Reality '99; Houston, TX; pp. 252-259; Mar. 1999.
Bachmann, Eric R. et al. "Inertial and Magnetic Posture Tracking for Inserting Humans into Networked Virtual Environments" ACM Symposium on Virtual Reality Software & Technology 2001.

(56) References Cited

OTHER PUBLICATIONS

Badler, Norman I. et al. "Multi-Dimensional Input Techniques and Articulated Figure Positioning by Multiple Constraints" Interactive 3D Graphics; Oct. 1986.

Banning, Erik "Declaration in Support of U.S. Appl. No. 11/135,911—Easily Deployable Interactive Direct-Pointing System and Presentation Control System and Calibration Method Therefore" Dec. 13, 2005.

Benbasat, Ari Y. et al. "Compact, Configurable Inertial Gesture Recognition" CHI '01 Ext. Abstr. Hum. Factors Comput. Syst., 10.1145/634067.634178; Mar. 2001.

Boritz, James et al. "A Study of Interactive 6 DOF Docking in a Computerized Virtual Environment" Proceedings, IEEE 1998 Virtual Reality Annual International Symposium (Cat. No. 98CB36180), 1998, pp. 139-146.

Cantzler, H. et al. "A Novel Form of a Pointing Device" Vision, Video, and Graphics, pp. 1-6; 2003.

Cao, Xiang et al. "Vision Wand: Interaction Techniques for Large Displays Using a Passive Wand Tracked in 3D" ACM SIGGRAPH 2004 Papers; Aug. 2004.

Cavens, Duncan et al. "Interacting with the Big Screen: Pointers to Ponder" Jun. 2002.

Cheok, Adrian David et al. "Micro-Accelerometer Based Hardware Interfaces for Wearable Computer Mixed Reality Applications" Proceedings. Sixth International Symposium on Wearable Computers, 2002, pp. 223-230.

Cohen, Philip et al. "Multimodal Interaction for 2D and 3D Environment" Projects in VR; Jul./Aug. 1999.

Datamonitor "Logitech International S.A. Company Profile" www.datamonitor.com; Jun. 2008.

Eberly, David "Least Squares Fitting of Data" Geometric Tools, Inc.; Sep. 17, 2001.

Eckert, Richard R et al. "The Classroom of the 21st Century: the Interactive Learning Wall" ACM SIGCHI Bulletin, vol. 32, Issue 2; Apr. 2000.

Elrod, Scott et al. "Liveboard: A Large Interactive Display Supporting Group Meetings, Presentations and Remote Collaboration" Proceedings of the SIGCHI Conference on Human Factors in Computing Systems; 1992.

Forte Technologies. Inc. "VFX1 Headgear Technical Specifications", Jan. 17, 1998, retrieved from archive.erg, http://web.archive.org/web/19980117025842/http://www.fortevr.comlvfxtechs.html, Mar. 27, 2017.

Forum for Detecting Laser Pointer in a Projection Through a Camera and Program . . . AnandTech; Feb. 13, 2003.

Foxlin, Eric et al. "FlightTracker: a Novel Optical/Internal Tracker for Cockpit Enhanced Vision" IEEE/ACM International Symposium on Mixed and Augmented Reality; Nov. 2004.

Fuhrmann, Thomas et al. "Bluewand—A Versatile Remote Control and Pointing Device" KiVS Kurzbeiträge, VDE Verlag; pp. 81-88; 2003.

Fukumoto, Masaaki et al. "Finger-Pointer: A Glove Free Interface" May 1992.

Genc, Y. et al. "Practical Solutions for Calibration of Optical See-Through Devices" ISMAR '02; May 24, 2002.

Hall, Theodore Wayne "Hand-Eye Coordination in Desktop Virtual Reality" CAAD, Future; pp. 177-182; 1997.

Hinckley, Ken et al. "Usability Analysis of 3D Rotation Techniques" in Proc. UIST 1997 Symp. on User interface Software and Technology; Oct. 1997.

Hogue, Andrew "MARVIN: a Mobile Automatic Realtime Visual and Inertial Tracking System" York University; Toronto, Ontario, Canada; May 2003.

Honeywell "Digital Compass Solutions: HMR3200/HMR3300" Honeywell.com; Form #900266 Feb. 2003 Rev. D; Date Unavailable (8 pages).

Honeywell "Digital Compass Solutions: HMR32001HMR3300" Honeywell.com; Form #900266 Rev. F; Dec. 2005 (11 pages).

Honeywell "Digital Compass Solutions User's Guide: HMR3200/HMR3300" Honeywell.com; Apr. 2002 Rev. A; Date is Unavailable.

Interactive Imaging Systems, Inc., "CyberPuck VRC", Feb. 4, 2001, retrieved from archive.org, http://web.archlve.org/web/20010204045300/http://iisvr.com/99iis/Products/vrcNRC.htm, Mar. 27, 2017.

Interactive Imaging Systems, Inc., "Products", Oct. 8, 1999, retrieved from archive.org, http://web.archive.org/web/19991008110212/http://iisvr.com/99iis/products.html, Mar. 27, 2017.

Interactive Imaging Systems, Inc., "VFX1", Oct. 13, 1999, retrieved from archive. org, http://web.archive.org/web/19991013120528/http://iisvr.com/99iis/ProductsNFX1.html, Mar. 27, 2017.

Interactive Imaging Systems, Inc., "VFX1 Basics", Oct. 18, 1999, retrieved from archive.org, http://web.archive.org/web/19991008191445/http://iisvr.com/99iis/techsupport/vfx1basics.htm, Mar. 27, 2017.

Interactive Imaging Systems, Inc.,"VFX1 Technical Specifications", Oct. 22, 1999, retrieved from archive.org, http://web.archive.org/web/19991022011340/http://www.iisvr.com/99iis/techsupport/vfx1 spec.htm, Mar. 27, 2017.

Interactive Imaging Systems, Inc., "VFX3D Specifications", Oct. 8, 1999, retrieved from archive.org, http://web.archive.org/web/19991008212309/http://iisvr.com/99iis/techsupport/vfx3dspec.htm, Mar. 27, 2017.

Interactive Imaging Systems. Inc. "VFX3D", Feb. 4, 2001, retrieved from archive.org, http://web.archive.org/web/20010204045500/hllp:/iisvr.com/99iis/Producl.s/vfx3dNFX3D.htm, Mar. 27, 2017.

Interactive Imaging Systems, Inc., "VFX3D Specifications", Feb. 4, 2001, retrieved from archive.org, http://Web.archive.org/web/20010204051500/http://iisvr.com/99iis/techsupport/vfx3d/vfx3dspec.htm, Mar. 27, 2017.

Interactive Imaging Systems, Inc., "Developer Info VFX3D Sok", Feb. 1, 2001, retrieved from archive.org, http://web.archive.org/web/20010201154600/hllp:/iisvr.com/99iis/developers.html, Mar. 27, 2017.

Konami "Teraburst" Arcade Game; Operator's Manual; 1998.

Laberge, Dominic et al. "An Auto-Calibrated Laser-Pointing Interface for Large Screen Displays" Proceedings Seventh IEEE International Symposium on Distributed Simulation and Real-Time Applications, 2003, pp. 190-194.

Levin, Golan et al. "Bringing Sketching Tools to Keychain Computers with an Acceleration-Based Interface" CH1'99: Conference on Human Factors in Computing Systems; May 1999.

Liu, Yuncai et al. "Determination of Camera Location from the 2-D to the 3-D Line and Point Correspondences" (Abstract Only); IEEE Transactions on Pattern Analysis and Machine Intelligence, vol. 12, No. 1, pp. 28-37, Jan. 1990.

Logitech "MXAir: on the Desk. In the Air.—User's Guide" Date Unavailable.

Matveyev, Serge V. et al. "The Optical Tweezers: Multiple-Point Interaction Technique" Proceedings of the ACM Symposium on Virtual Reality Software and Technology, VRST 2003, Osaka, Japan; Oct. 2003.

Marrin, Teresa "Possibilities for the Digital Baton as a General-Purpose Gestural Interface" Human Factors in Computing Systems, CHI '97: Mar. 1997.

Melexis Integrated Systems "Applications Note: Transmitter and Receiver Antenna Basics" Jan. 16, 2004.

Midway Games, Inc. "CarnEvil Arcade Game" Operation Manual; 1998.

Myers, Brad A. et al. "Interacting at a Distance: Measuring the Performance of Laser Pointers and Other Devices" CHI 2002; vol. 4, Issue 1; Apr. 20-25, 2002.

Naimark, Leonid et al. "Circular Data Matrix Fiducial System and Robust Image Processing for a Wearable Vision-Inertial Self-Tracker" Proceedings. International Symposium on Mixed and Augmented Reality, 2002, pp. 27-36.

Newsletter of the Academic Computing Center; May 1996.

Nintendo of America, Inc. "Kirby Tilt 'n' Tumble Instruction Booklet" 2001.

Oh, Ji-Young et al. "Laser Pointers as Collaborative Pointing Devices" Graphics Interface; Oct. 2002.

Olsen, Dan R., Jr. et al. "Laser Pointer Interaction" CHI 2001.

(56) References Cited

OTHER PUBLICATIONS

Pausch, Randy et al. "Tailor: Creating Custom User Interfaces Based on Gesture" Proceedings of the 3rd Annual ACM SIGGRAPH Symposium on User Interface Software and Technology; Aug. 1990.
Polhemus "3Space® Fastrak User's Manual" 2002 Edition, Rev. C.
Polhemus "Isotrack® II Price List" Sep. 2002.
Polhemus "Isotrack® II—The Fast and Affordable Digital Tracker" Feb. 2003.
Polhemus "Liberty™ Price List" Jul. 2003.
Polhemus "Liberty Latus" Jun. 2005.
Proxima "Cyclops Interactive Pointer System" Aug. 1996.
Proxima Desktop Projector 5500 User's Guide; Jun. 21, 1996.
Proxima Desktop Projector 9100 Multimedia LCD Projector User's Guide; Date Unavailable.
Proxima "Lightbook™ Tough Enough for the Rigors of the Road" Jun. 1997.
Raskar, Ramesh et al. "A Self-Correcting Projector" Mitsubishi Electric Research Laboratories; TR2001-46; Dec. 2001.
Raskar, Ramesh et al. "iLamps: Geometrically Aware and Self-Configuring Projects" Appears in ACM SIGGRAPH 2003 Conference Proceedings; Jul. 2003.
Rekimoto, Jun et al. "The World Through Computer: Computer Augmented Interaction with Real World Environments" Proceedings of the 8th annual ACM symposium on User interface and software technology. 1995.
Rohs, Michael et al. "Direct Manipulation Techniques for Large Displays Using Camera Phones" Proceedings of 2nd International Symposium on Ubiquitous Computing Systems 2004.
Sawicki, Donald S. Traffic Radar Handbook: A Comprehensive Guide to Speed Measuring Systems: (Abstract Only) copradar.com; 2002.
Sega "Confidential Mission" Arcade Game; Owner's Manual; Dec. 2000.
Sega "House of the Dead" Arcade Game; Upright Version Operator's Owner's Manual; 1997; 60 pages.
Sega "House of the Dead: Sega Saturn Console Game with Stunner Peripheral" 1998.
Sega "House of the Dead 2" Arcade Game; Owner's Manual; 1998.
Sega "House of the Dead 3" Arcade Game; Operator's Owner's Manual; Jan. 2002.
Sega "Sega Saturn Technical Bulletins 1-15" May 1995-May 1996; 170 pages.
Sega "Virtua Cop: Sega Saturn Console Game with Stunner Peripheral" 1995 (9 pages).
Sibert, John L. et al. "A Finger-Mounted, Direct Pointing Device for Mobile Computing" Proceedings of the 10th annual ACM symposium on User interface software and technology; Jan. 1997.
Sohn, Misook et al. "SonarPen: A New ultrasonic Pointing Device for an Active TV" (Abstract Only) 2003 IEEE International Conference on Consumer Electronics, 2003. ICCE; Jun. 2003.
Sukthankar, Rahul et al. "Self-Calibrating Camera-Assisted Presentation Interface" Proceedings of International Conference on Control, Automation, Robotics and Vision (ICARCV); 2000.
Sukthankar, Rahul et al. "Smarter Presentations: Exploiting Nomography in Camera-Projector Systems" Proceedings of International Conference on Computer Vision; 2001.
Tuceryan, Mihran et al. "Calibration Requirements and Procedures for a Monitor-Based Augmented Reality System" IEEE Transactions on Visualization and Computer Graphics; vol. 1, No. 3; Sep. 1995.
Tuceryan, Mihran et al. "Single-Point Active Alignment Method (SPAAM) for Optical See-Through HMD Calibration for Augmented Reality" Presence, vol. 11, No. 3; Jun. 3, 2002.
Tuulari, Esa et al. "SoapBox: a Platform for Ubiquitous Computing Research and Applications" Only Includes an Abstract; Lecture Notes in Computer Science; 2002.
US Department of Transportation—National Highway Traffic Safety Administration "Police Traffic Radar: Issue Paper" Feb. 1980.

Ware, Colin "Using the Bat: A Six-Dimensional Mouse for Object Placement" IEEE Computer Graphics and Applications; vol. 8, Issue: 6; 1988.
Watson, G.A. "Least Squares Fitting of Parametric Surfaces to Measured Data" Anziam J. 42 (E); 2000.
Welch, Greg et al. "Motion Tracking: No Silver Bullet, but a Respectable Arsenal" IEEE Engineering in Medicine and Biology Magazine; Dec. 2002.
Wellner, Pierre David "Interacting with Paper on the DigitalDesk" University of Cambridge; Technical Report, No. 330; ISSN 1476-2986; Mar. 1994.
Wilson, Andrew D. et al. "Demonstration of the Xwand Interface for Intelligent Spaces" Microsoft; 2016.
Wilson, Andrew "XWand: UI for Intelligent Spaces" CHI 2003, Apr. 5-10 2003.
Wilson, Andrew D. et al. "Pointing in Intelligent Environment with the WorldCursor" Proceedings of IFIP INTERACT03: Human-Computer Interaction 2003; Sep. 2003.
Wloka, Matthias M. et al. "The Virtual Tricorder: A Uniform Interface for Virtual Reality" Dec. 1995.
Wormell, D. et al. "Advancements in 3D Interface Devices in Virtual Environments" The Eurographics Association; 2003.
You, Suya et al. "Fusion of Vision and Gyro Tracking for Robust Augmented Reality Registration" IEEE Proceedings Virtual Reality; 2001.
International Search Report for International Application No. PCT/US2005/018234, dated May 15, 2006.
Written Opinion for International Application No. PCT/US2005/018234, dated May 15, 2006.
International Preliminary Report on Patentability for International Application No. PCT/US2005/018234, dated Nov. 29, 2006.
Office Action for U.S. Appl. No. 11/135,911, dated Aug. 4, 2009.
Notice for Allowance for U.S. Appl. No. 11/135,911, dated Mar. 22, 2010.
Office Action for U.S. Appl. No. 12/782,980, dated Nov. 10, 2010.
Notice of Allowance for U.S. Appl. No. 12/782,980, dated Jun. 29, 2011.
Office Action for U.S. Appl. No. 13/239,140, dated Jan. 23, 2013.
Notice of Allowance for U.S. Appl. No. 13/239,140, dated May 31, 2013.
Notice of Allowance for U.S. Appl. No. 13/239,140, dated Nov. 14, 2013.
Notice of Allowance for U.S. Appl. No. 13/239,140, dated Mar. 17, 2014.
Notice of Allowance for U.S. Appl. No. 14/175,960, dated Aug. 14, 2014.
Notice of Allowance for U.S. Appl. No. 14/463,405, dated Apr. 9, 2015.
Notice of Allowance for U.S. Appl. No. 14/712,788, dated Jan. 11, 2016.
Notice of Allowance for U.S. Appl. No. 15/089,099, dated Jun. 12, 2017.
Office Action for U.S. Appl. No. 15/696,452, dated Oct. 23, 2017.
Office Action for U.S. Appl. No. 15/696,452, dated May 1, 2018.
Office Action for U.S. Appl. no. 15/696,452, dated Oct. 4, 2018.
Notice of Allowance for U.S. Appl. No. 15/696,452, dated Jan 31, 2019.
Office Action for U.S. Appl. No. 16/395,802, dated May 22, 2019.
Notice of Allowance for U.S. Appl. No. 16/395,802, dated Jun. 25, 2019.
Notice of Allowance for U.S. Appl. No. 16/582,508, dated May 15, 2020.
Corrected Notice of Allowance for U.S. Appl. No. 16/582,508, dated May 27, 2020.
Notice of Allowance for U.S. Appl. No. 16/812,339, dated Mar. 24, 2021.
Office Action for U.S. Appl. No. 17/355,580, dated Feb. 18, 2022.
Notice of Allowance for U.S. Appl. No. 17/355,580, dated May 10, 2022.
Office Action for U.S. Appl. No. 17/690,868, dated May 6, 2022.
Notice of Allowance for U.S. Appl. No. 17/690,868, dated Jun. 2, 2022.
Office Action for U.S. Appl. No. 17/690,883, dated May 5, 2022.

(56) References Cited

OTHER PUBLICATIONS

Notice of Allowance for U.S. Appl. No. 17/690,883, dated Jun. 2, 2022.
Office Action for U.S. Appl. No. 17/858,457, dated Oct. 17, 2022.
Office Action for U.S. Appl. No. 11/483,170, dated Jun. 8, 2009.
Office Action for U.S. Appl. No. 11/483,170, dated Feb. 1, 2010.
Office Action for U.S. Appl. No. 11/483,170, dated Aug. 18, 2010.
Office Action for U.S. Appl. No. 11/483,170, dated Apr. 25, 2011.
Office Action for U.S. Appl. No. 11/483,170, dated Dec. 6, 2011.
Advisory Action for U.S. Appl. No. 11/483,170, dated Feb. 28, 2012.
Examiner's Answer for U.S. Appl. No. 11/483,170, dated Oct. 4, 2012.
Patent Board Decision for U.S. Appl. No. 11/483,170, mailed Jun. 3, 2015.
Notice of Allowance for U.S. Appl. No. 11/483,170, dated Aug. 26, 2015.
Notice of Allowance for U.S. Appl. No. 11/483,170, dated Nov. 6, 2015.
Office Action for U.S. Appl. No. 15/014,879, dated May 17, 2018.
Office Action for U.S. Appl. No. 15/014,879, dated Dec. 27, 2018.
Notice of Allowance for U.S. Appl. No. 15/014,879, dated Apr. 10, 2019.
Office Action for U.S. Appl. No. 16/447,559, dated Mar. 20, 2020.
Office Action for U.S. Appl. No. 16/447,559, dated Jun. 24, 2020.
Office Action for U.S. Appl. No. 161447,559, dated Nov. 23, 2020.
Examiner's Answer for U.S. Appl. No. 16/447,559, dated Aug. 13, 2021.
Decision on Appeal for U.S. Appl. No. 16/447,559, dated May 16, 2022.
Patent Trial and Appeal Board Oral Hearing Transcript for U.S. Appl. No. 16/447,559, mailed May 21, 2022.
Documents filed with U.S. District Court Proceedings for *Ultimatepointer, L.L.C.* vs. *Nintendo Co., Ltd. et al*; U.S. District Court, for the Eastern District of Texas Tyler Division; Civil Action No, 6:11-cv-00496-JRG; Includes publicly available documents filed from Sep. 15, 2011-Oct. 29, 2021; Docket Nos. 1-453; (8,239 pages).
UltimatePointer, Ll.C.'s Second Amended Disclosure of Asserted Claims and Infringement Contentions Pursuant to Patent Local Rule 3-1 and 3-2 for U.S. Pat. No. 7,746,321 filed in the *Ultimatepointer, L.L.C.* vs. *Nintendo Co., Ltd. et al.* for United States District Court for the Eastern District of Texas Tyler Division; Civil Action No. 6:11-cv-00496; Filed Dec. 10, 2012 (84 Pages).
Defendants' Motion for Summary Judgment of Invalidity Based on Indefiniteness Under 35 U.S.C. 112 ¶ 2 filed in the *Ultimatepointer, L.L.C.* vs. *Nintendo Co., Ltd. et al.* for United States District Court for the Eastern District of Texas Tyler Division; Civil Action No: 6:11-cv-00496; Filed Dec. 21, 2012 (20 Pages).
UltimatePointer, L.L.C:s Third Amended Disclosure of Asserted Claims and Infringement Contentions for U.S. Pat. No. 7,746,321 Pursuant to Patent Local Rule 3-1 and 3-2 filed in *Ultimatepointer, L.L.C.*, vs. *Nintendo Co., Ltd. et al.* in the United States District Court for the Eastern District of Texas Tyler Division; Civil Action No. 6:11-cv-00496; Filed Jun. 14, 2013 (70 Pages).
Defendants' First Amended Invalidity Contentions filed in *Ultimatepointer, L.L.C.,* vs. *Nintendo Co., Ltd. et al.* in the United States District Court for the Eastern District of Texas Tyler Division; Civil Action No. 6:11-cv-00496; Filed Jun. 28. 2013 (130 Pages).
Documents filed with U.S. District Court Proceedings for *Ultimatepointer, L.L.C.* vs. *Nintendo Co., Ltd. et al*; U.S District Court, for the Eastern District of Texas Tyler Division; Civil Action No. 6:11-cv-005716-JRG; Includes publicly available documents filed from Nov. 1, 2011-Jul. 8, 2016; Docket Nos. 1-224; (5,385 pages).
UltimatePointer, L,L.C's Second Amended Disclosure of Asserted Claims and Infringement Contentions Pursuant to Patent Local Rule 3-1 and 3-2 for U.S. Pat. No. 8,049,729 filed in *Ultimatepointer, L.L.C.,* vs. *Nintendo Co., Ltd. et al.,* in the United States District Court for the Eastern District of Texas Tyler Division; Civil Action No. 6:11-cv-00571; Filed Dec. 10, 2012 (30 Pages).
UltimatePointer, L.L.C.'s Third Amended Disclosure of Asserted Claims and Infringement Contentions for U.S. Pat. No. 8,049,729 Pursuant to Patent Local Rule 3-1 and 3-2 filed in *UltimatePointer, L.L.C.* vs. *Nintendo Co., Ltd. et al.* in the United States District Court for the Eastern District of Texas Tyler Division; Civil Action No. 6:11-cv-00571; Filed Jun. 14, 2013 (29 Pages).
Nintendo Defendants' Preliminary Invalidity Contentions filed in the United States District Court for the Eastern District of Texas Tyler Division; Civil Action Nos. 6:11-cv-00496 and 6:11-cv-00571; Filed Aug. 21, 2012 (105 Pages).
Retailer Defendant's Invalidity Contentions filed in the United States District Court for the Eastern District of Texas Tyler Division; Civil Action No. 6:11-cv-00496 and 6:11-cv-00571; Filed Oct. 12, 2012 (126 Pages).
Joint Claim Construction and Prehearing Statement in Compliance with Patent Rule 4-3 filed in the United States District Court for the Eastern District of Texas Tyler Division; Civil Action Nos. 6:11-cv-00496 and 6:11-cv-00571; Filed Nov. 12, 2012 (70 Pages).
First Amended Joint Claim Construction and Prehearing Statement in Compliance with Patent Rule 4-3 filed in the United States District Court for the Eastern District of Texas Tyler Division; Civil Action Nos. 6:11-cv-00496 and 6:11-cv-00571; Filed Nov. 19, 2012 (71 Pages).
UltimatePointer, L.L.C.'s Opening Claim Construction Brief filed in the United States District Court for the Eastern District of Texas Tyler Division; Civil Action Nos. 6:11-cv-00496 and 6:11-cv-00571; Filed Nov. 26, 2012 (36 Pages).
Memorandum Opinion and Order filed in the United States District Court for the Eastern District of Texas Tyler Division; Civil Action Nos. 6:11-cv-00496 and 6:11-cv-00571; Filed May 28, 2013 (40 Pages).
Expert Report Pursuant to Fe. R. CIV. P. 26(A) of Gregory Francis Welch Ph.D., Concerning the Invalidity of U.S. Pat. Nos. 7,746,321, and 8,049,729 (Including Exhibits 1-6 and 8-16) filed in the United States District Court for the Eastern District of Texas Tyler Division; Civil Action Nos. 6:11-cv-00496 and 6:11-cv-00571; Filed Jan. 8, 2014 (707 Pages).
Documents filed with U.S. District Court Proceedings for *UltimatePointer, L.L.C.* vs. *Nintendo Co., Ltd. et al*; U.S. District Court, for the Eastern District of Texas Tyler Division; Civil Action No. 6:11-cv-00865-JLR; Includes publicly available documents filed from Sep. 15, 2011—Sep. 1, 2016; Docket Nos. 1-658; (12,950 pages).
Documents filed with United States Court of Appeals for the Federal Circuit in re: Nintendo Co., Ltd. ; Court of Appeals Docket # 13-151; Includes publicly available documents filed from May 10, 2013-Nov. 25, 2013; Docket Nos. 1-50; (1,006 pages).
Documents filed with United States Court of Appeals for the Federal Circuit for *Ultimate Pointer, L.L.C.* vs. *Nintendo Co., Ltd.*; Court of Appeals Docket # 15-1297; Includes publicly available documents filed from Jan. 29, 2015-Apr. 8, 2016; Docket Nos. 1-50; (2,325 pages).
Documents filed with United States Court of Appeals for the Federal Circuit for *Ultimate Pointer, L.L.C.* vs. *Nintendo Co., Ltd.*; Court of Appeals Docket # 15-1532; Includes publicly available documents filed from Apr. 8, 2015-Apr. 8, 2016; Docket Nos. 1-59; (3,151 pages).
Documents filed with United States Court of Appeals for the Federal Circuit for *Ultimate Pointer, L.L.C.* vs. *Nintendo Co., Ltd.*; Court of Appeals Docket # 15-1535; Includes publicly available documents filed from Apr. 8, 2015-Apr. 8, 2016; Docket Nos. 1-7; (103 pages).
Documents filed with United States Court of Appeals for the Federal Circuit for *Ultimate Pointer, L.L.C.* vs. *Nintendo Co., Ltd.*; Court of Appeals Docket # 15-1584; Includes publicly available documents filed from Apr. 23, 2015-Apr. 8, 2016; Docket Nos. 1-27; (265 pages).
Office Action for U.S. Appl. No. 17/858,457, dated Apr. 5, 2023.
U.S. Appl. No. 18/223,665, filed Jul. 19, 2023, Banning.
Notice of Allowance for U.S. Appl. No. 17/858,457, dated Apr. 24, 2023.

* cited by examiner

APPARATUS FOR CONTROLLING CONTENTS OF A COMPUTER-GENERATED IMAGE USING 3D MEASUREMENTS

CROSS-REFERENCE TO RELATED APPLICATIONS

This application is a continuation of U.S. patent application Ser. No. 16/447,559, filed Jun. 20, 2019 which is a continuation of U.S. application Ser. No. 15/014,879, filed Feb. 3, 2016, now U.S. Pat. No. 10,372,237, which is a continuation of U.S. application Ser. No. 11/483,170 filed Jul. 7, 2006, now U.S. Pat. No. 9,285,897, which claims priority to U.S. Provisional Application No. 60/698,702 filed Jul. 13, 2005, and U.S. Provisional Application No. 60/742,393 filed Dec. 5, 2005, all of which are hereby incorporated herein by reference.

STATEMENT REGARDING FEDERALLY SPONSORED RESEARCH OR DEVELOPMENT

Not applicable.

BACKGROUND OF THE INVENTION

1. Field of the Invention

The invention relates generally to devices for making presentations in front of audiences and, more specifically, to devices and methods for making presentations for which interaction with the displayed information through direct-pointing is desired.

2. Background Art

Technology for presenting computer-generated images on large screens has developed to the point where such presentations are commonplace. For example, the software package POWERPOINT, sold by Microsoft Corp., Redmond, Wash., may be used in combination with a so-called 'beamer' to generate interactive presentation material and project for viewing by an audience. Often, such presentations are held in rooms not specifically equipped for the purpose of showing presentations, in which case use is made of a portable beamer in combination with a so-called 'laptop' computer. Under these circumstances the projection surface may be a wall of the room.

During a presentation it is desirable for the presenter to be able to move freely in front of the audience while retaining the capability to interact with the presentation and point to specific features on the displayed images. In general, interaction with a computer is often facilitated by pointing devices such as a 'mouse' or a 'trackball' that enable manipulation of a so-called 'cursor'. Traditionally, these devices were physically connected to the computer, thus constraining the freedom-of-movement of the user. More recently, however, this constraint has been removed by the introduction of wireless pointing devices such as the GYRO-MOUSE, as manufactured by Gyration, Inc.

Broadly speaking, pointing devices may be classified in two categories: a) devices for so-called 'direct-pointing' and b) devices for so-called 'indirect-pointing'. Direct pointing devices are those for which the physical point-of-aim coincides with the item being pointed at, i.e., it lies on the line-of-sight. Direct pointing devices include the so-called 'laser pointer' and the human pointing finger. Indirect pointing devices include systems where the object of pointing (e.g., a cursor) bears an indirect relationship to the physical point-of-aim of the pointing device; examples include a mouse and a trackball. It needs no argument that direct-pointing systems are more natural to humans, allowing faster and more accurate pointing actions.

Indirect pointing devices known in the art include the following. U.S. Pat. No. 4,654,648 to Herrington et al. (1987), U.S. Pat. No. 5,339,095 to Redford (1994), U.S. Pat. No. 5,359,348 to Pilcher et al. (1994), U.S. Pat. No. 5,469,193 to Giobbi et al. (1995), U.S. Pat. No. 5,506,605 to Paley (1996), U.S. Pat. No. 5,638,092 to Eng et al. (1997), U.S. Pat. No. 5,734,371 to Kaplan (1998), U.S. Pat. No. 5,883,616 to Koizumi et al. (1999), U.S. Pat. No. 5,898,421 to Quinn (1999), U.S. Pat. No. 5,963,134 to Bowers et al. (1999), U.S. Pat. No. 5,999,167 to Marsh et al. (1999), U.S. Pat. No. 6,069,594 to Barnes et al. (2000), U.S. Pat. No. 6,130,664 to Suzuki (2000), U.S. Pat. No. 6,271,831 to Escobosa et al. (2001), U.S. Pat. No. 6,342,878 to Chevassus et al. (2002), U.S. Pat. No. 6,388,656 to Chae (2002), U.S. Pat. No. 6,411,277 to Shah-Nazaroff (2002), U.S. Pat. No. 6,492,981 Stork et al. (2002), U.S. Pat. No. 6,504,526 to Mauritz (2003), U.S. Pat. No. 6,545,664 to Kim (2003), U.S. Pat. No. 6,567,071 to Curran et al. (2003) and U.S. Patent Application Publication No. 2002/0085097 to Colmenarez et al. (2002). Each of the foregoing publications discloses a system for which the 2 dimensional or 3 dimensional position orientation and/or motion of an object, such as a handheld pointing device, are measured with respect to some reference coordinate system using appropriate means. Such means include acoustic devices, electromagnetic devices, infrared devices, visible light emitting diode (LED) devices, charge coupled devices (CCD), accelerometer and gyroscopic motion detectors, etc. Although for some of the foregoing devices the reference coordinate system may be positioned close to the display means, no information on the actual position of the presentation display with respect to the system is used, causing the resulting pointing action to be inherently indirect and, hence, less natural to the human operators of such systems.

Other inherently indirect-pointing systems that do not require the position or orientation of the pointing device to be known include devices such as disclosed in U.S. Pat. No. 5,095,302 to McLean et al. (1992) and U.S. Pat. No. 5,668,574 to Jarlance-Huang (1997). The foregoing patents describe indirect-pointing methods that do not provide the speed and intuitiveness afforded by direct-pointing systems.

Direct pointing devices are disclosed, for example, in U.S. Pat. No. 4,823,170 to Hansen (1989), which describes a direct-pointing system comprising a light source, a position-sensing detector located adjacent to the light source and a focusing reflector that, in one application, is parabolic shaped and is attached to the pointing device. Additionally, procedures are described to calibrate the system. In the understanding of current applicant, however, the physical location of the position-sensing detector needs to be, at least preferably, adjacent to the display means. The system disclosed in the Hansel '170 patent cannot easily be ported to a room not specifically equipped for this system.

U.S. Pat. No. 5,929,444 to Leichner (1999) discloses a system primarily intended for target shooting practice, but an application as a direct-pointing cursor control apparatus may arguably be anticipated. The system includes transmitting and detecting equipment in a fixed reference base and a moveable pointing device. A calibration routine is described that aligns the detecting and transmitting means while keeping the pointing device (i.e., a gun) aimed at the center of the target. The Leichner '444 patent does not describe methods or means that allow determination of a point-of-aim of a pointing device on a target of which the size and/or orientation have not been predetermined. Consequently, the system disclosed in the Leichner '444 patent is not suitable to be used as a cursor control means for projection surfaces not specifically adapted to be used with such a system.

U.S. Pat. No. 5,952,996 to Kim et al. (1999), U.S. Pat. No. 6,184,863 to Sibert et al. (2001) and US Patent Application Publication No. 2002/0084980 to White et al. (2002) disclose direct-pointing systems where the 3 dimensional position and/or orientation of the pointing device is measured with respect to sources and/or detectors, the physical position of which in relation to the display means is presumed known. Such systems only work in rooms specifically equipped for their use.

U.S. Pat. No. 5,484,966 to Segen (1996), U.S. Pat. No. 6,335,723 to Wood et al. (2002) and U.S. Pat. No. 6,507,339 to Tanaka (2003) disclose methods suitable for direct-pointing that are useful only if the pointing device is physically close to or touching the display area or volume, for example used with so-called 'interactive whiteboards'. Some of the foregoing patents describe appropriate pointer calibration routines. Such systems are not suitable for presentations where the display surface is out of the presenter's physical reach.

U.S. Pat. No. 6,104,380 to Stork et al. (2000) discloses a direct-pointing system in which at least the 3 dimensional orientation of a handheld pointing device is measured by appropriate means. Additionally, a direct measurement is made of the distance between the pointing device and the displayed image. However, the system disclosed in the Stork et al. '380 patent does not include methods to ascertain the position and orientation of the display means relative to the pointing device. In the foregoing system, these appear to be presumed known. This is also the case for a system disclosed in U.S. Pat. No. 4,768,028 to Blackie (1988), in which the orientation of a helmet-mounted direct-pointing apparatus is measured electromagnetically. The foregoing systems therefore appear to be ill-suited to operate in rooms not specifically equipped for presentation purposes.

U.S. Pat. No. 6,373,961 to Richardson et al. (2002) discloses a direct-pointing system using helmet-mounted eye tracking means. The point-of-gaze relative to the helmet is measured as well as the position and orientation of the helmet relative to the display. The latter is accomplished by equipping the helmet either with means to image sources mounted at fixed positions around the display or with means to image a displayed calibration pattern. Of course, the foregoing system relies on sophisticated helmet mounted equipment capable of, among other things, tracking eye-movement. Moreover, such a system relies on an unobstructed line-of-sight with respect to the display and a substantially constant distance from the display to the helmet-mounted equipment. The disclosed invention does not lend itself to be easily used by a human operator in an arbitrary (not predetermined) presentation setting.

U.S. Pat. No. 6,385,331 to Harakawa et al. (2002) discloses a system that uses infrared technology in combination with image recognition software to distinguish pointing gestures made by the presenter, without the need for an artificial pointing device. The disclosed system, however, requires the presentation room to be set up with highly tuned and sophisticated equipment, and is therefore not easily ported to a different venue.

U.S. Pat. No. 6,404,416 to Kahn et al. (2002) discloses a direct-pointing system where a handheld pointing device is equipped with an optical sensor. In such system either the display is required to be of a specific type (e.g., a cathode ray-based display that uses an electron: beam) or the displayed image is required to be enhanced by timed and specific emanations. When pointed to the display, a handheld pointing device may detect the electron beam or the timed emanations, and the timing of these detections may then be used to ascertain the point-of-aim. The disclosed system is somewhat similar to the technologies used for so-called light guns in video games as disclosed, for example, in U.S. Pat. No. 6,171,190 to Thanasack et al. (2001) and U.S. Pat. No. 6,545,661 to Goschy et al. (2003). Of course, such systems require either a specific display apparatus or a specialized modification of the displayed images. Moreover, an uncompromised line-of-sight between the pointer and the display is a prerequisite for such systems.

U.S. Patent Application Publication No. 2002/0089489 to Carpenter (2002) discloses a direct-pointing system that, in one embodiment, positions a computer cursor at a light spot projected by a laser-pointer. The system relies on the use of an image-capturing device to compare a captured image with a projected image. As such, the system disclosed in the '489 application publication makes use of calibration routines in which the user is required to highlight computer-generated calibration marks with the laser pointer. The system disclosed in the '489 patent application publication is not unlike a system disclosed in U.S. Pat. No. 5,502,459 to Marshall et al. (1996). Also, U.S. Pat. No. 5,654,741 to Sampsell et al. (1997), U.S. Pat. No. 6,292,171 to Fu et al. (2001), U.S. Patent Application Publication No. 2002/0042699 to Tanaka et al. (2002) and U.S. Patent Application Publication No. 2002/0075386 to Tanaka (2002) all disclose systems that can detect a light-spot using optical means. Such systems specifically generally require the use of computationally expensive image processing technologies. All of these inventions require a projection surface with adequate diffusion properties, as well as some form of optical system with a steady and uncompromised view of the display area. As such, they limit the freedom-of-movement of the presenter and place limitations on the position and optical characteristics of the necessary equipment. Also, in some of these inventions fast and involuntary movement of the user's hand may result in a cursor that does not move smoothly or a cursor that does not perfectly track the light spot, causing possible confusion with the user.

U.S. Patent Application Publication No. 2005/0270494 to Banning (2005) and pages 83-87 of ISSN 1476-2986 by Ashdown (2004) describe direct-pointing methods for which the spatial characteristics of a projected display are determined by means of a user-executed calibration procedure. Direct-pointing cursor control is subsequently realized by measuring the position and/or orientation of a pointing device and mathematically intersecting the associated pointing line with the projected display. The calibration procedure requires the user to direct a sufficient number of pointing lines through characteristic points of the projected display, after which its spatial properties are calculated geometrically. To this end, Ashdown's method requires the user to register the spatial properties of 9 lines, whereas Banning uses substantially less lines in combination with assumptions on shape, orientation and/or position of the projected display. Both methods, however, rely on either measuring the position of the pointing device or on the requirement that this position remains constant. As such, they either rely on sophisticated and expensive tracking equipment or severely constrain the freedom-of-movement of the user.

Other pointing systems known in the art may be classified as other than entirely direct-pointing or indirect-pointing systems. Such systems include one disclosed in U.S. Pat. No. 6,417,840 to Daniels (2002), which is combination of a cordless mouse with a laser pointer. Although this system incorporates a direct-pointing device (i.e., the laser pointer), the method used by the system for interacting with the presentation is indirect (i.e., by means of the mouse) and therefore does not afford the fast and more accurate interactive pointing actions provided by some other direct-pointing systems described in some of the foregoing publications.

Another system known in the art that uses both direct and indirect-pointing methods is described in U.S. Pat. No. 6,297,804 to Kashitani (2001). The disclosed system is a system for pointing to real and virtual objects using the same pointing device. In the disclosed system, the pointing means switch between a computer controlled light source (e.g., a laser) and a conventional computer cursor, depending on whether or not the user's intended point-of-aim has crossed a boundary between the real and virtual display (i.e., computer-displayed imagery). Various methods are described to establish these boundaries. Although the computer-controlled light source may be regarded as pointing in a direct manner, its point-of-aim is essentially governed by the system operator using an indirect-pointing system such as a mouse. Thus, the disclosed system does not allow for the desired flexibility afforded by truly direct-pointing methods.

Other systems known in the art include those such as disclosed in U.S. Pat. No. 5,796,386 to Lipscomb et al. (1998), which discloses a calibration procedure to establish the relation between coordinate systems associated with a handheld device and, in one embodiment, a display unit. The system disclosed in the Lipscomb et al. '386 patent may arguably be applicable as a direct-pointing cursor control system. The disclosed calibration routine requires the user to register at least three 3 dimensional positions of the handheld device with a central processing unit. The disclosed system does not appear to include calibration methods for the case where the display unit is out of physical reach of the system operator. The system is thus not practical for use at an arbitrary venue.

U.S. Pat. No. 6,084,556 to Zwem (2000) discloses a head-mounted display unit that displays information governed by the orientation of the apparatus, as measured by a tracking device. This way, the system creates the illusion of a large virtual display that is being looked at by the system operator. Of course, the large display alluded to does not constitute a projected presentation. Also, no methods are disclosed in the Zwem '556 patent to establish the relative position of the head-mounted apparatus with respect to the display.

U.S. Patent Application Publication No. 2002/0079143 to Silverstein et al. (2002) discloses a system in which the position of a moveable display with respect to a physical document is established. The '143 patent application publication describes calibration routines in which the user is required to activate a registration button when the moveable display is over some predetermined position on the physical document. The disclosed system only relates to 2 dimensional applications and, moreover, cannot be used in situations where the interaction region is out of the system operator's physical reach.

SUMMARY OF THE INVENTION

One aspect of the invention is a method for controlling a computer display cursor in an interaction region. A method according to this aspect of the invention includes projecting an image of the computer display to create the interaction region. A distance is established between a first point and a second point. The first point has a predetermined relation to the projection device, and the second point has a predetermined relation to the interaction region. At least one of an orientation and a position of a pointing line is measured. The pointing line has a predetermined relation to a pointing device. The established distance and the at least one of measured position and orientation are used to control the cursor position on the interaction region.

Another aspect of the invention is a method for controlling a parameter related to the position of a cursor on a projected computer screen image. According to this aspect, the method includes establishing a first point having a predetermined relation to the projected computer screen image. An orientation of a pointing line is measured while directing the pointing line to substantially pass through the first point. The pointing line has a predetermined relation to a pointing device. A positional coordinate of the pointing device, relative to the projected computer screen image, is constrained using the measurement of the orientation of the pointing line, and the positional coordinate of the pointing device is used to control the parameter of said cursor.

Another aspect of the invention is a method for controlling a computer display cursor in an interaction region. The method according to this aspect includes establishing a first and a second point. Both the first and the second point have a predetermined relation to the interaction region. A pointing line with a predetermined relation to a pointing device is directed to substantially pass through the first point, and its orientation is measured. The measurement is used to constrain a positional coordinate of the pointing device. The orientation of the pointing line is also measured while directing it to substantially pass through the second point, and this measurement is also used to constrain a positional coordinate of the pointing device. No more than two positional coordinates of the pointing device are initialized to have a predetermined relation during the first and the second measurement of the orientation of the pointing line. The positional coordinates of the pointing device are used to control the computer display cursor.

Other aspects and advantages of the invention will be apparent from the following description and the appended claims.

DETAILED DESCRIPTION

Figure 1:
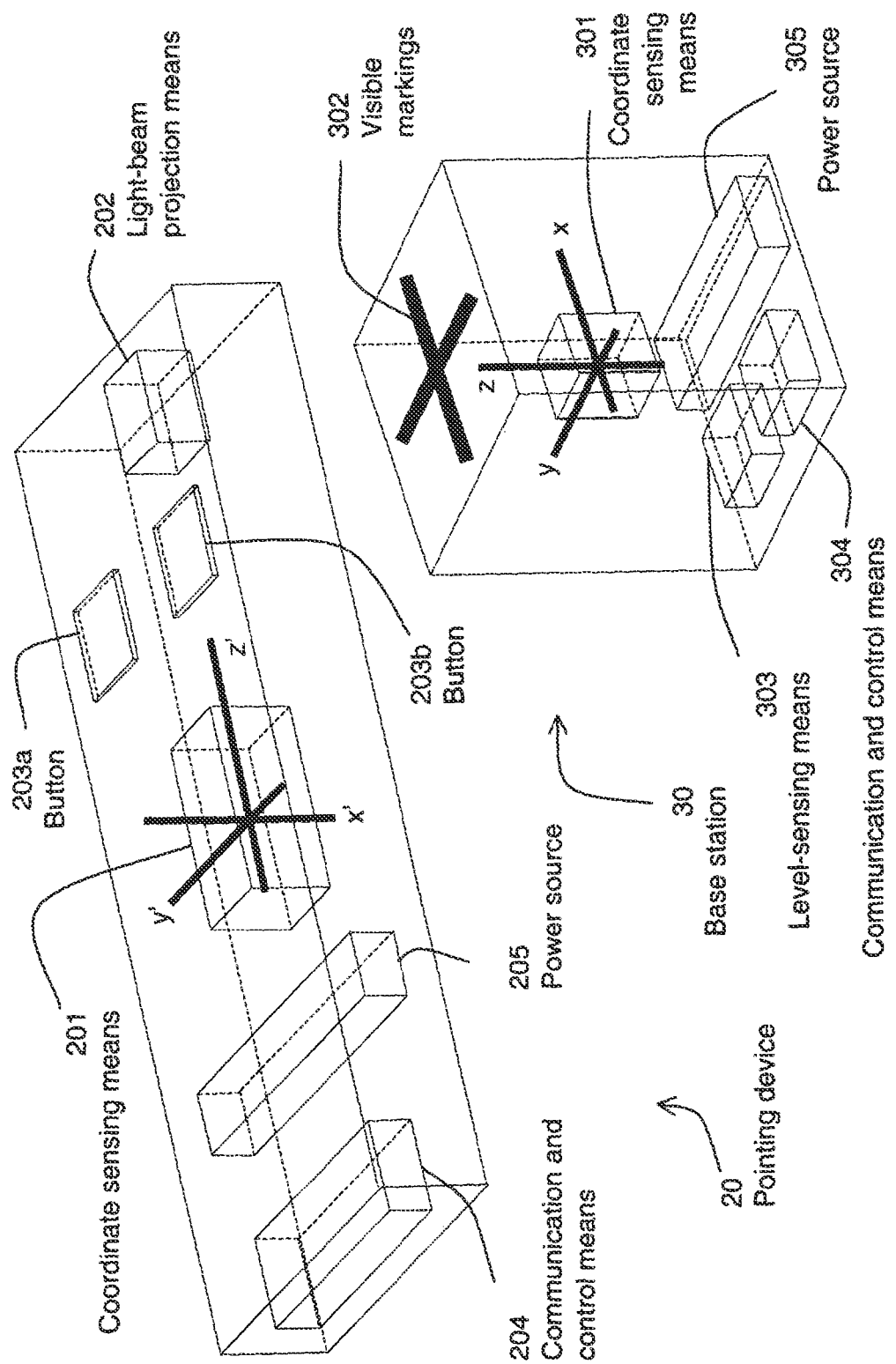
FIG. 1 shows a pointing device and base station according to a first embodiment.

A first embodiment of the invention will be described with reference to FIG. 1. A pointing device 20 has associated with it a coordinate system x' y' z'. A portable base station 30 has associated with it a coordinate system x y z. Pointing device 20 and base station 30 may be equipped with coordinate sensing devices, 201 and 301, respectively, that enable measurement of the 3 dimensional position and 3 dimensional orientation of pointing device 20 and, therefore, of a pointing line 21 (see also FIG. 2) that substantially intersects pointing device 20, all measured relative to the x y z coordinate system. Pointing line 21 may substantially coincide with the long axis of pointing device 20. For example, coordinate sensing devices 201 and 301 may be electromagnetic tracking devices, such as the 3SPACE FASTRAK™ system, manufactured by Polhemus, a Kaiser Aerospace & Electronics Company, Colchester, Vt. Alternatively, coordinate sensing device 201 and 301 may be based on (ultra)sonic tracking systems such as those used in the LOGITECH 2D/6D computer mouse, commercially available from Logitech Inc., Fremont, Calif. Other embodiments for coordinate sensing device 201 and 301 may include, without limitation, sensors based on LEDs, CCDs, accelerometers; inclinometers, gyroscopes, compasses, magnetometers, etc. Also, combinations of such different types of sensors may be used to acquire redundant measurements for quality control purposes. For example, a controlled-source electromagnetic position tracking system may be combined with compasses and inclinometers. Those skilled in the art will appreciate that independent measurements of the Earth's magnetic field and gravity may be used to enhance the measurements made by a controlled-source position detecting system. In the invention, any system may be used that is capable of determining at least parts of the orientation and position in three dimensions, with respect to coordinate system x y z, of a line-segment that substantially intersects pointing device 20.

Base station 30 may comprise a plurality of related physical entities, such as described in U.S. Pat. No. 6,608, 668 to Faul et al (2003); for clarity of explanation one of these physical entities will be associated with coordinate system x y z and be denoted as base station 30, the center of which substantially coincides with the origin of coordinate system x y z. For purposes of explanation of the invention, the origin of coordinate system x' y' z' substantially coincides with the center of pointing device 20, and the z'-axis is substantially aligned with the long axis of pointing device 20.

Pointing device 20 may also be provided with a light-beam projector 202, for example a laser. The physical position and orientation of the projected beam of light with respect to coordinate system x' y' z' may be established with suitable accuracy at the place of manufacture of the pointing device 20 and may be presumed to be known. For purposes of explanation, the beam of light from the light beam projector 202 substantially coincides with the z'-axis. Additionally, one or more control buttons 203a, 203b or the like may be provided, as well as communication and control device 204. Communication and control device 204 may be used to control various features of pointing device 20 and may also communicate via wire, or wirelessly, with base station 30, a central processing unit (not shown separately) such as a COMPAQ Armada M700 as manufactured by Hewlett Packard Company, Palo Alto, Calif., or any other components of the system. The central processing unit may also control a presentation with which user interaction is desired. For clarity of the description which follows, the central processing unit will be referred to hereinafter as "the computer." Furthermore, pointing device 20 may include an internal power source 205, for example a battery, or instead may be connected such as by wire to an external power source.

In addition to coordinate sensing device 301, base station 30 may be provided with communication and control device 304. Communication and control device 304 may be used to control various features of base station 30. Communication and control device 304 may communicate with pointing device 20, with the computer (not shown) that may control the presentation images, or with any other components of the system. The communication and control device 304 may use wire- or wireless technology. In the present embodiment communication with the computer occurs via a universal serial bus (USB) compatible device or the like (not shown). Communication and control device 304 may communicate wirelessly with a relay device (not shown) that communicates via a USB compatible device or the like with the computer (not shown) that may control the presentation with which user-interaction is desired. There may be visible markings 302 on base station 30 that indicate the orientation of one or more coordinate planes defined by prescribed relations between coordinates x, y, z, as well as features of the position of the origin of the x y z coordinate system. For example, a line may be used to indicate the z-x-plane of the x y z coordinate system, for which the y-coordinate is zero; another line may be used to indicate the z-y-plane, for which the x-coordinate is zero. Base station 30 may be provided with a level-sensing device 303 to determine whether or not one of the coordinate planes of coordinate system x y z is substantially horizontal. Level-sensing device 303 may measure two angles or equivalent characteristics that define the orientation of one of the coordinate planes of coordinate system x y z with respect to a horizontal surface. Level-sensing device 303 can be a device such as disclosed in U.S. Pat. No. 6,466,198 to Feinstein (2002), which makes use of model ADXL202 accelerometers sold by Analog Devices Inc., Norwood, Mass. The disclosed accelerometers provide tilt angle information depending on their inclination relative to Earth's gravity. It will be apparent to those skilled in the art that many other types of sensors may be used as embodiment for level-sensing device 303, for example, capacitance-type bubble levels. See, for example, U.S. Pat. No. 5,606,124 to Doyle et al. Finally, base station 30 may be equipped with a power source 305, for example a battery, or may have a connection to an external power source.

Figure 2:
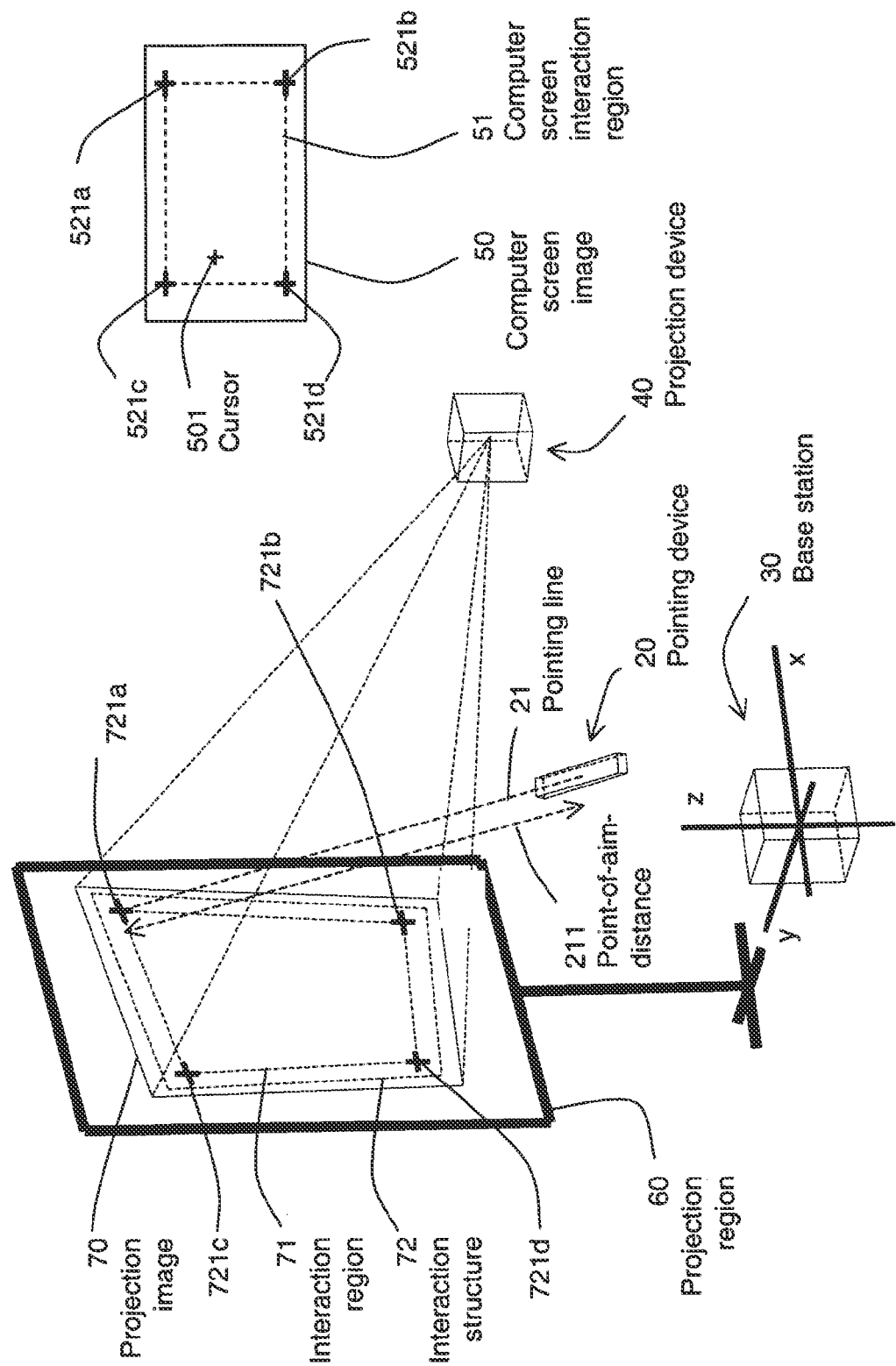
FIG. 2 shows a presentation venue and computer screen.

Referring to FIG. 2, a projection device 40 is arranged to project an image 50 generated by, for example, the computer (not shown). The projection device 40 may be used to generate a projection image 70 on a projection region 60. For example, projection device 40 may be a 2000 lumen projector, model XL8U, manufactured by Mitsubishi Corp. Projection region 60 may be a surface, such as a wall or a projection screen. The projection region 60 may define a flat plane or a may define a more elaborate 2 dimensional (2D) or even 3 dimensional (3D) structure. In FIG. 2, projection region 60 is shown as a screen, but this is only for purpose of illustrating the principle of the invention and is not intended to limit the scope of the invention. Alternatively the combination of projection device 40 and projection region 60 may be incorporated in one and the same physical device, such as a television receiver (cathode ray tube display), liquid crystal display (LCD) screen or the like.

There is a region of space that is designated as a region on which interaction with the user is desired. This region is denoted as the interaction region 71. The interaction region 71 may be flat (planar) or may be a more elaborate 2D or even 3D structure. The interaction region 71 may have features in common with projection image 70 and may be associated in some way with a computer screen interaction region 51. In the present embodiment, however, it will be assumed that interaction region 71 or a scaled version thereof, is substantially part of or substantially coincides with projection image 70. Moreover, it will be assumed in this embodiment that interaction region 71 substantially coincides with the projection of computer screen interaction region 51 as projected by projection device 40.

For display systems which include a separate projection device 40 and projection region 60, the optical axis of projection device 40 may not be aligned with any vector normal to projection region 60. Moreover, projection region 60 may not be flat and 14 therefore may not even be a 2D shape. Consequently, projection image 70 and interaction region 71 may in general not be flat or rectangular, even if the imagery generated by the computer is scaled so as to be presented in rectangular form. In this embodiment, however, it is assumed that projection region 60, projection image 70 and interaction region 71 are substantially flat. Furthermore, it is assumed in this embodiment that interaction region 71 is substantially a quadrangle and that the associated computer screen interaction region 51 is substantially rectangular.

Additionally, calibration points 721a, 721b, 721c, 721d may be provided that may define characteristic features of interaction region 71. For example, interaction region 71 may be trapezoidal in shape, in which case calibration points 721a, 721b, 721c, 721d may define corners of interaction region 71 or corners of a scaled version thereof. Furthermore, screen marks 521a, 521b, 521c, 521d may be provided, and may but need not be associated with calibration points 721a-721d For example, calibration points 721a-721d may coincide with the projected versions of screen marks 521a-521d and may in this way be identified by projection device 40. Calibration points 721a-721d may also be identified by other means than projection, for example by unique descriptions such as the 'upper right corner of interaction region 71', 'center of interaction region 71' etc.

The operation of the present embodiment will now be described with reference to FIGS. 1, 2 and 3. A display system is set up at the venue where a presentation is to made, which can be a combination of a portable projection device 40 and projection surface 60, for example a wall. The display system is connected, using appropriate interconnection devices, to the computer (which may be in the base station 30 or located elsewhere) that generates the presentation images.

The system user positions base station 30 at a convenient location, preferably not far from where the user intends to conduct the presentation. The user may position base station 30 in such a way that one of the coordinate planes of the x y z coordinate system is substantially parallel or substantially coincident with projection region 60. The visual markings 302 may assist in such positioning. Subsequently, the user connects base station 30 to the computer (not shown), for example via a USB compatible device connection (not shown), or using a wireless relay device (not shown). The computer may be disposed in the base station 30 in some embodiments. In some embodiments, the computer may recognize the base station connection and start a program, part of which may be contained in the communication and control device 304, in communication and control device 204, or in control logic contained in the wireless relay device (not shown). Alternatively, the user may be required to load the program into the computer manually via a CD-ROM drive, a floppy drive, memory stick (USB mass storage device not shown) or the like. However it is loaded into the computer, the program may initiate a calibration routine that has as its object establishment of the shape, position, size and orientation of a defined interaction structure 72 relative to the x y z coordinate system. The interaction structure 72 is assumed to substantially coincide with interaction region 71. The operation of the program will now be explained with reference to FIG. 3.

At 80a the program is initiated. During step Bob a default assumption is made regarding interaction region 71. Specifically, interaction region 71 is assumed to substantially coincide with a well-defined interaction structure 72 (FIG. 2 shows an interaction region 71 and an interaction structure 72 that are clearly not identical; this difference is however only meant as an example, and as a practical matter is preferably as small as possible). At 80b default values are entered for the orientation and position of this interaction structure 72. For example, the default setting may assume interaction region 71 to substantially coincide with an interaction structure 72 that is a (flat) quadrangle positioned in a vertical plane that substantially intersects the origin of the x y z coordinate system associated with base station 30. As another example, the default setting may provide that interaction region 71 substantially coincides with an interaction structure 72 that is an isosceles trapezoid of which the parallel edges are horizontal and of which the position is unknown. Using such default values, calibration points 721a-721d not only define characteristic features of interaction region 71 but also of interaction structure 72.

At 80c a decision is made whether the default values for interaction region 71 and interaction structure 72 should be accepted or overridden by the user. In making this decision, input from level-sensing device 303 and visible markings 302 on base station 30 may be used. If the defaults are to be accepted, the program continues to 80j, the details of which are explained below with reference to FIG. 4. If the defaults are overridden, the program continues at 80d to 80i, during each of which the user may override any of the default settings. The user may be aided during any of 80*d* to 80*i* by a library of predetermined shapes, predetermined orientations and/or predetermined positions, or the user can be provided by the program with the capability to construct custom shapes, orientations and/or positions. In any case, the program continues to 80*j*.

It will be appreciated by those skilled in the art that once an assumption has been made regarding the shape of interaction structure 72, it is possible to construct a set of three dimensionally distributed points in space that completely determines the 3D position, orientation and size of the interaction structure 72. The number of points in the set will depend on the complexity of the assumed shape and the ingenuity with which the points are chosen. For example, a rectangular shape that is arbitrarily oriented in space is completely determined by a set of 3 points that coincide with 3 of its corners, but is also completely determined by a set of 8 points, pairs of which may determine each of the four edges of the rectangle.

Figure 3:
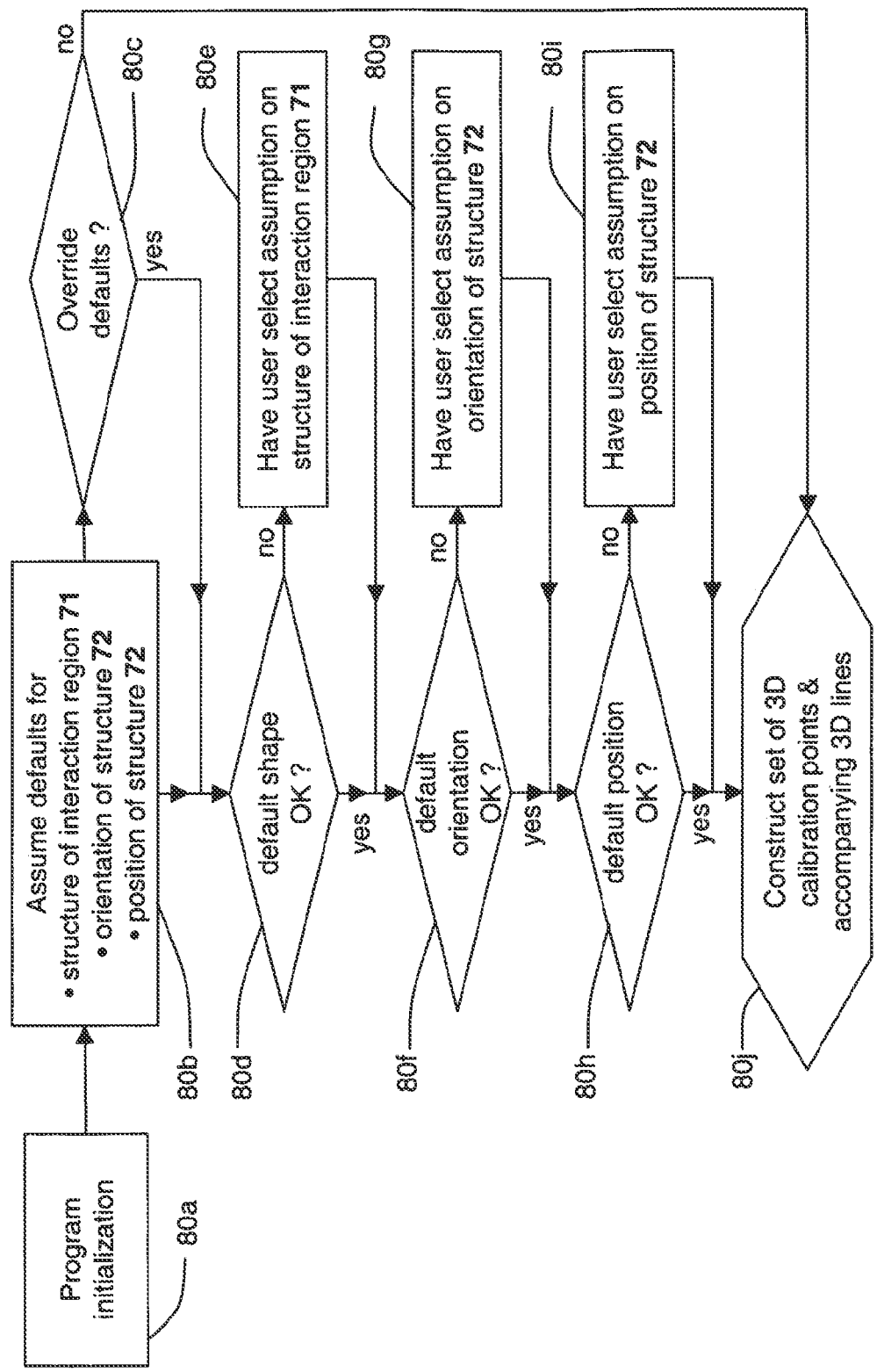
FIG. 3 shows program steps for selection of appropriate assumptions according to several embodiments.
Figure 4:
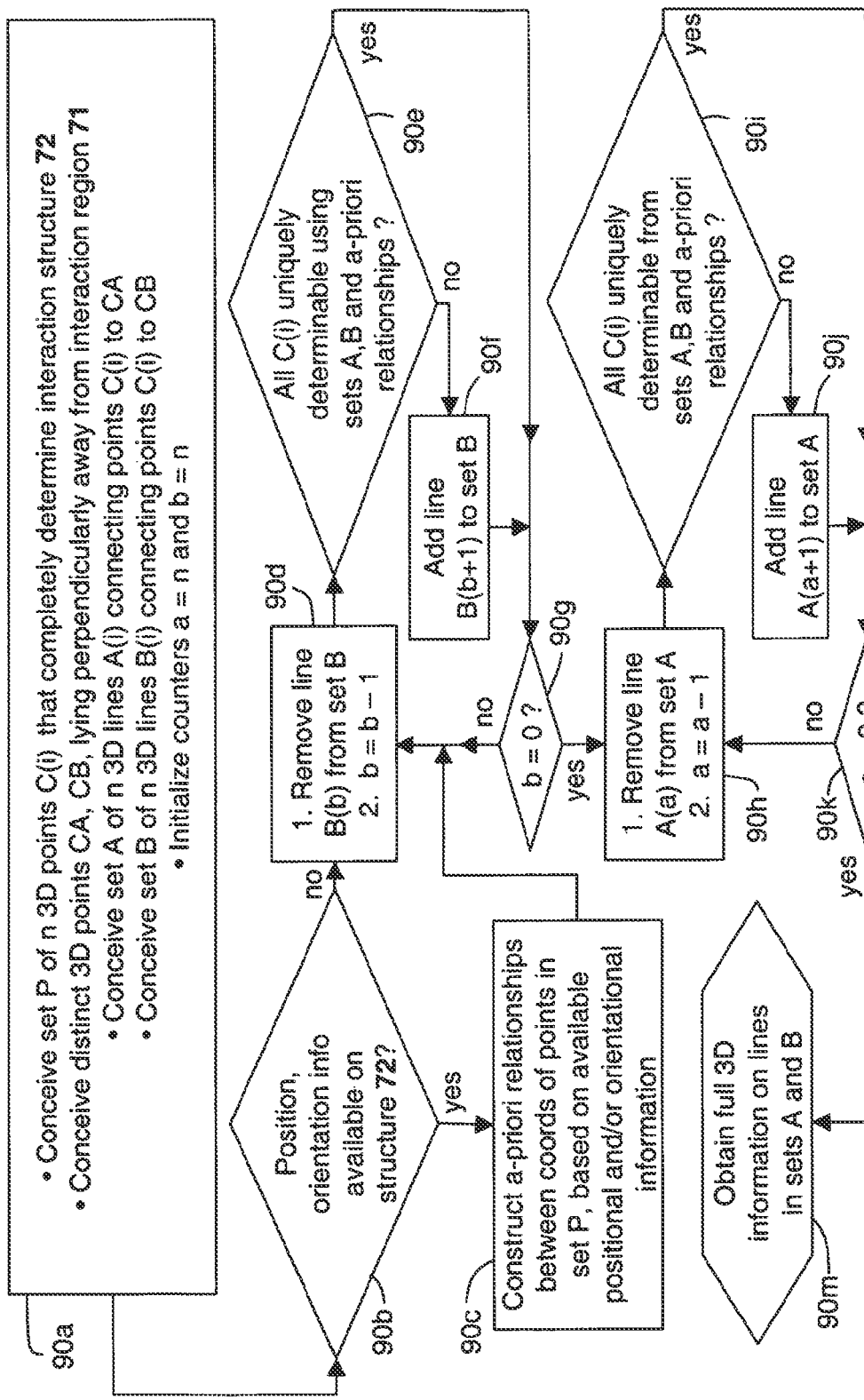
FIG. 4 shows program steps for construction of information set according to several embodiments.

Referring to FIG. 4, describing details of program element 80*j*, the computer program continues at 90*a*, at which a set P is generated that includes a quantity n of points in space, each represented as C(i) (0<i<n+1), that uniquely determine interaction structure 72, together with descriptions of their roles in determining this structure. For example, if the program elements outlined in FIG. 3 reveal that interaction region 71 is assumed rectangular, set P may hold three points described as the upper-left corner, the lower-left corner and the upper-right corner of a rectangular interaction structure 72. If, alternatively, the projection of computer screen interaction region 51 is substantially rectangular, and this projected rectangle has the same center but is physically two times smaller than interaction structure 72, the three points may be described as the upper-right corner, the lower-left corner and the lower-right corner of a rectangle that has the same center but is two times smaller than interaction structure 72. Thus, by carefully choosing the points in set P together with their description, any interaction structure 72 may be completely determined.

In addition to set P, a 3D point CA and another 3D point CB are determined at goa. These additional 3D points are determined so as to lie away from interaction region 71, that is, they lie at some distance out of the plane that is closest to or substantially contains interaction region 71. The distance may be comparable to an edge of projection image 70. For example, point CA may be determined to lie near projection device 40 and point CB may be determined to lie at a distance from point CA that may be equal to the distance between projection device 40 and projection surface 60, measured substantially parallel to projection surface 60. Other choices for point CA and point CB may also be used. Additionally, sets A and B are generated during step 90*a*. Set A includes a number n of lines A(i), each of which connects point CA to one of the points C(i) (0<i<n+1) in set P. Likewise, set B holds a number n of lines B(i), each of which connects point CB to one of the points C(i) (0<i<n+1) in set P. Finally, at 90*a*, counters a, b are both initialized to the value of n.

Flow then continues on to step 90*b*, where a decision is made whether the program elements outlined in FIG. 3 have revealed any information on the 3D position and orientation of interaction structure 72. If the decision is positive flow continues to step 90*c*, where this information is used to establish a priori relationships between the coordinates of the points in set P. For example, the steps outlined in FIG. 3 may have revealed that interaction structure 72 is assumed to coincide with the x-z plane, in which case the a priori relationships may include the requirement that the y-coordinates of all points in set P are equal to zero. A pre-set library of a priori relationships may be provided to aid in the execution of this program element.

The program continues to god, which may also be reached from 90*b* if the decision at 90*b* is negative. At god, line B(b) is removed from set B, after which counter b is decremented by 1.

The program continues to 90*e*, where a decision is made whether complete 3D information on the lines in sets A and B, together with a priori information, constitutes enough information to uniquely determine the coordinates of all the points in set P. For example, the program elements outlined in FIG. 3 may have determined that interaction region 71 is assumed to be rectangular, but no information is known regarding its orientation or position. In this case set P may contain three points, corresponding to three corners of a rectangular interaction structure 72. Each point C(i) (0<i<4) in set P would then be uniquely determined by the intersection of a line from set A and a line from set B if and only if sets A and B contained three lines each.

If the decision at 90*e* is negative, the program continues to 90*f*, where line B(b+1) is added once more to set B.

If the decision at 90*e* is positive, program flow continues to 90*g*. The program flow may also continue from 90*f* to 90*g*. At 90*g* a decision is made whether counter b has reached zero, in which case the lines left in set B (which number may be equal to zero) are deemed necessary for unique determination of the coordinates of all the points in set P. If the decision at 90*g* is positive, program flow continues to 90*h*. If the decision at 90*g* is negative, program flow reverts to god.

During 90*h*, line A(a) is removed from set A, after which counter a is decremented by 1. Program flow then continues to 90*i*, where a decision is made whether complete 3D information on the lines in sets A and B, together with the a priori information, constitute enough information to uniquely determine the coordinates of all the points in set P.

If the decision at 90*i* is negative, program flow continues to step 90*j*, where line A(a+1) is added once more to set A.

If the decision at 90*i* is positive, program flow continues to step 90*k*. The program flow also continues from 90*j* to 90*k*. At 90*k*, a decision is made whether counter a has reached zero, in which case the lines left in set A (which number may be equal to zero) are deemed necessary for unique determination of the coordinates of all the points in set P. If the decision at 90*k* is negative, program flow reverts to 90*h*. If the decision at 90*k* is positive, program flow continues to 90*m*, the details of which are described with reference to FIG. 5.

Figure 5:
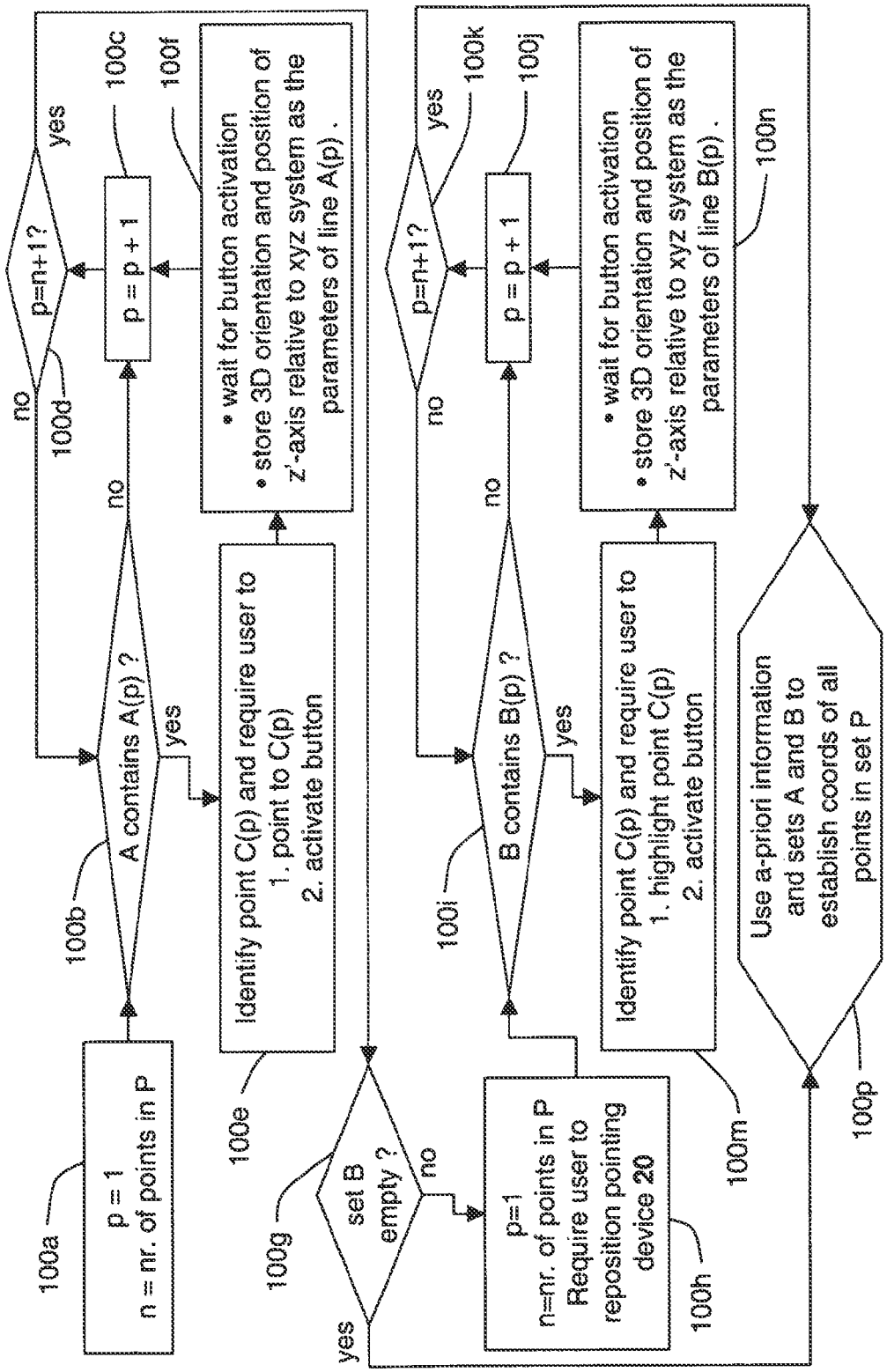
FIG. 5 shows program steps for ascertaining necessary 3D data according to several embodiments.

In FIG. 5, the program continues to 100*a*, where counter p is initialized to 1 and variable n is set to the number of points in set P.

Program flow then continues to 100*b* where a decision is made whether line A(p) (connecting point CA to point C(p)) is included in set A. If the decision is negative, program flow continues to 100*c*, where counter p is incremented by 1.

If the decision at 100*b* is positive, program flow continues to 100*e*, at which the program identifies point C(p) to the user and then can require the user to point to C(p) using pointing device 20, advantageously (but not necessarily) aided by light-beam projection device 202, preferably from a position such as point CA, as determined previously at 90*a* (FIG. 4). The user can also be queried to affirm the pointing action by, for example, activating one of the buttons 203*a* or 204*b*, or the like. The identification of point C(p) may occur, for example, by having the program display a visible screen mark 521*a*-521*d* at a position on computer screen interaction region 51 associated with C(p), which may then be projected by projection device 40 to coincide with point C(p). Other means of identification are also possible, such as the characterization of point C(p) as 'upper-right corner' or the like.

Program flow then continues on to 100*f*, where the program can wait until the highlighting action is affirmed by the user, after which the 3D orientation of the z'-axis and the 3D position of the z'=0 point (of the z'-axis) are measured with respect to the x y z coordinate system, using coordinate sensing device 201 and 301, and communicated to the computer using communication and control device 204 and/or 304. This 3D orientation and position is then associated with line A(p) and stored in memory. Program flow then continues to 100*c*.

After 100*c* program flow continues to 100*d* where a decision is made whether p is equal to n+1. If the decision is positive, it can be concluded that all necessary data on lines A(p) have been ascertained and program flow can continue to 100*g*. If the decision at 100*d* is negative, program flow reverts to 100*b*.

At 100*g* a decision is made whether set B is empty. If the decision is positive, it can be concluded that enough information to uniquely determine the 3D coordinates of all the points in set P is contained in the a priori relationships combined with the available data on the lines in set A, and program flow continues to 100*p*. If the decision at 100*g* is negative, program flow continues to 100*h*.

At 100*h* counter p is again initialized to 1. The user is subsequently required to reposition the pointing device 20 to a different location, displacing it substantially parallel to projection region 60 over a distance substantially equal to the distance between projection region 60 and his or her present location. Other locations may also be used.

Flow then continues to 100*i* where a decision is made whether line B(p) (connecting point CB to point C(p)) is included in set B. If the decision is negative, program flow continues to 100*j* where counter p is incremented by 1.

If the decision at 100*i* is positive, program flow continues to 100*m*, at which point the program identifies point C(p) to the user and can query the user to highlight this point using light-beam projection device 202. The program can also query the user to affirm the highlighting by, for example, activating one of the buttons 203*a* or 204*b* or the like. The identification of point C(p) may occur, for example, by having the program display a visible screen mark 521*a*, 521*b*, . . . at a position on computer screen interaction region 51 associated with C(p), which may then be projected by projection device 4*o* to coincide with point C(p). Other means of identification are also possible, such as the characterization of point C(p) as 'upper-right corner' or the like.

Program flow then continues to 100*n*, where the program may wait until the highlighting action is affirmed. After affirmation, the 3D orientation of the z'-axis and the 3D position of the point z'=0 (of the z'-axis) are measured with respect to the x y z coordinate system, using coordinate sensing device 201 and 301, and are communicated to the program using communication and control device 204 and/or 304. The 3D orientation and position are then associated with line B(p) and can be stored in memory. Program flow then continues to 100*j*.

After 100*j* program flow continues to 100*k* where a decision is made whether p is equal to n+1. If the decision is positive, it is concluded that all necessary data for lines B(p) has been ascertained and program flow continues to loop. If the decision is negative, program flow reverts to 100*i*.

At loop it is concluded that the combined information of the a priori relationships and the data for lines in sets A and B that is stored in memory is enough to establish the coordinates of all points in P, as is further explained with reference to FIG. 6.

Figure 6:
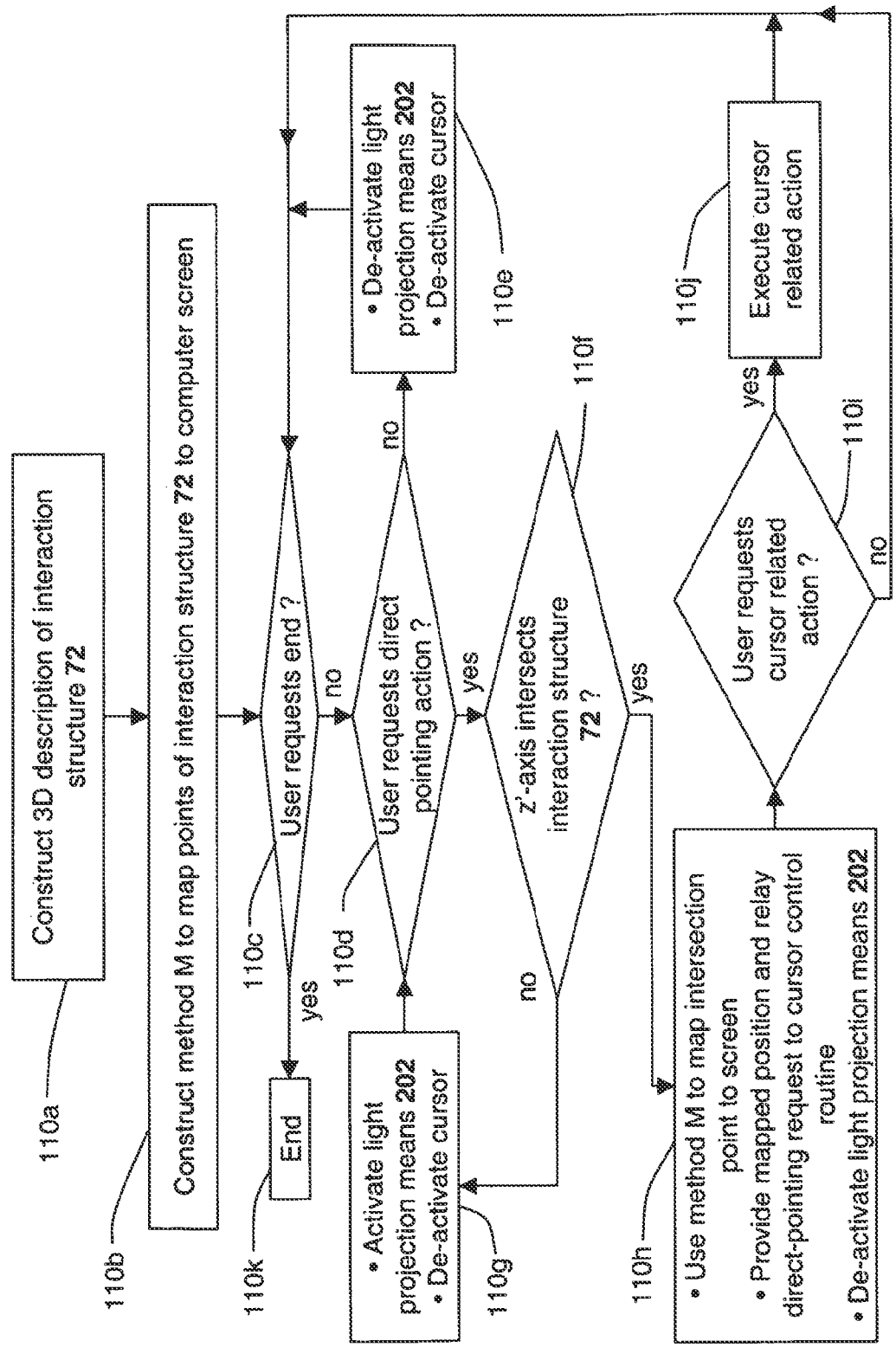
FIG. 6 shows program steps for control of pointing device elements and computer cursor according to several embodiments.

Referring to FIG. 6, as will be appreciated by those skilled in the art, at 110*a* the available information contained in the a priori relationships and the orientations and positions of the lines in sets A and B may be used to establish the coordinates of each of the points in set P, all measured with respect to the x y z coordinate system. It may happen that the 3D data associated with lines A(p) and B(p) (I<p<n+1) cause them not to intersect at point C(p); for example, this could be the case due to insufficient accuracy in determining the orientations and positions of lines A(p) and B(p). Under such circumstances point C(p) may be estimated or determined in such a way that it lies halfway along the shortest line-segment that connects lines A(p) and B(p). Other methods for determining point C(p) are also possible.

Figure 18:
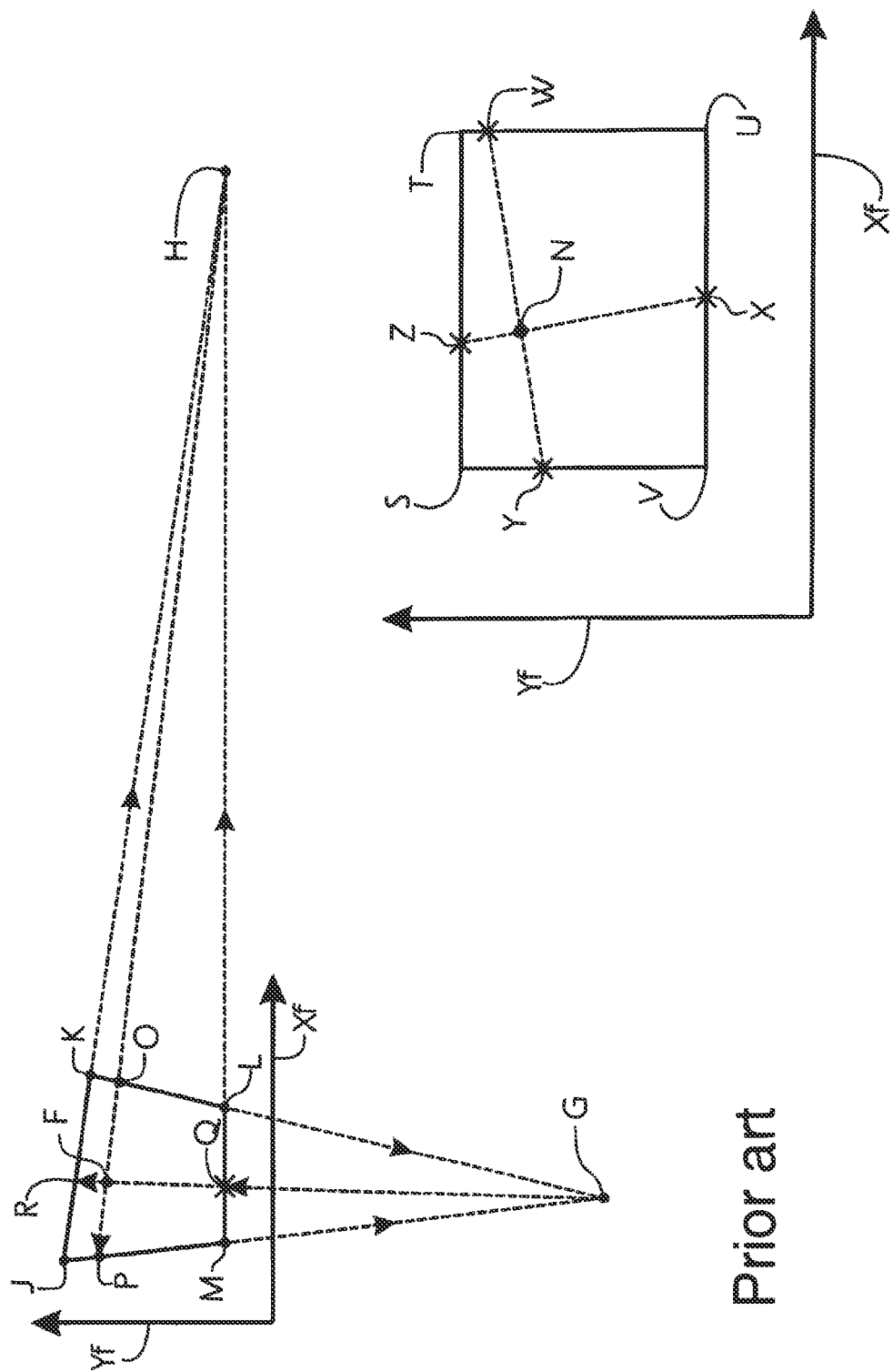
FIG. 18 shows a prior art: construction of method M for a quadrangle.

Once the complete 3D description of interaction structure 72 has been established (given the available data and assumptions), program flow continues to no*b*. At no*b*, a method M is constructed that maps points of interaction structure 72 to computer screen interaction region 51. Such methods are well known to those skilled in the art. For example, a method such as that described in U.S. Pat. No. 6,373,961 to Richardson et al. (2002) may be used, but other appropriate methods may also be used. For completeness, the method disclosed in the Richardson et al. '961 patent will briefly be explained here. Referring to FIG. 18, interaction structure 72 may be defined by line segments JK and ML. Furthermore, point F may define point-of-aim 210, which is also the intersection between the z'-axis and interaction structure 72. The line segments JK and ML are generally not parallel. If not parallel, then the line segments JK, ML are extended until they meet at a point H. Then a line is drawn through F and H, that intersects segment JM at point P and segment KL at point o. If the segments JK and ML are parallel, the a line is drawn instead through F that is parallel to JK, and which intersects the other two line segments as described. The process continues similarly with the other segments, which are extended to meet at point G. A line through F and G intersects segment JK at point R and segment ML at point Q. Subsequently, the following distances are measured and noted as percentages: JR/JK, KO/KL, LQ/LM and MP/MJ. Then four points S, T, U, V are chosen as shown in FIG. 18, that form an exact rectangle STUV; this rectangle may define computer screen interaction region 51. Further, points W, X, Y, Z are chosen on the sides of the rectangle STUV in such a way that SZ/ST=JR/JK, TW/TU=KO/KL, UX/UV=LQ/LM and VY/VS=MP/MJ. Then the points Z and X are joined by a line, and the points Y and W are joined by a line. The point of the intersection of these latter two lines is N, which is the point that results from the operation of method M.

Referring once again to FIG. 6, after no*b*, program flow continues to 110*c* where a decision is made whether the user has requested the program to end. If the decision is positive, the program ends at 110*k*.

If the decision at 110*c* is negative, program flow continues to no*d*, where a decision is made regarding whether the user has requested a direct-pointing action, such as activating button 203*a* or 203*b* or the like.

If the decision at nod is negative, program flow continues to 110e, where the light-beam projection device 202 can be instructed or caused to de-activate (using, for example, control device 204 and/or 304). Furthermore, a software routine (not shown) that controls computer cursor 501 (see also FIG. 2) is instructed that the user does not want to execute a direct-pointing action, after which program flow reverts to 110c. Such cursor control routines are well known to those skilled in the art and are therefore not described here.

If the decision at nod is positive, program flow continues to 110f, where a decision is made whether the z'-axis intersects interaction structure 72. Those skilled in the art will appreciate that this is possible because all relevant 3D information is known or is measurable by coordinate sensing device 201 and 301. If the decision is positive, program flow continues to 110h, at which method M is used to map the intersection point of the z'-axis with interaction structure 72 to computer screen interaction region 51. This mapped position, as well as the user's desire to execute a direct-pointing action are communicated to the cursor control routine (not shown) running on the computer.

After 110h, program flow continues to 110i where a decision is made whether the user wishes to execute an action associated with the position of cursor 501. For example, activating button 203a or 203b or the like may indicate such a request. If the decision is negative, program flow reverts to 110c.

If the decision at 110i is positive, program flow continues to 110j, where the cursor control routine (not shown) is requested to execute the intended action. Such an action may, for instance, be a 'double-click' action or the like. Program flow then reverts to 110c.

There may be situations for which the system of equations that allows determination of all coordinates of the points in set P will be somewhat ill-posed. This could for example occur if locations CA and CB are chosen too close together, or if the angles of some pointing lines 21 with respect to interaction region 71 are too small, as will be appreciated by those skilled in the art. In such cases, the user may be directed to choose a different point for locations CA and/or CB from where the various points C(p) are to be highlighted.

Thus, methods and means are disclosed that afford a highly flexible and easily deployable system for interacting with a presentation in a direct-pointing manner at a location not specifically designed or adapted for such a purpose. Moreover, although it is desirable to have highly accurate coordinate sensing device 201 and 301, in some instances such may not be necessary because the visual feedback afforded by a displayed cursor will compensate to a large extent for any errors made in the measurements of coordinate parameters. The same holds true for the importance of any discrepancies between the actual shape of interaction region 71 and that of the interaction structure 72 that is assumed to coincide with it. Also, minor discrepancies between the actual position and orientation of interaction region 71 and the assumed position and orientation of interaction structure 72 (which is assumed to coincide with interaction region 71) need not be of critical importance, as will be appreciated by those skilled in the art.

Mathematically, there are infinite possible shapes for interaction structure 72 as well as infinite a priori relationships, sets P, A, B and methods M. To further explain the invention, what follows is a list of examples that are believed will be encountered most often. These examples are not meant to restrict the scope of the present invention in any way, but merely serve as further clarification.

Figure 7:
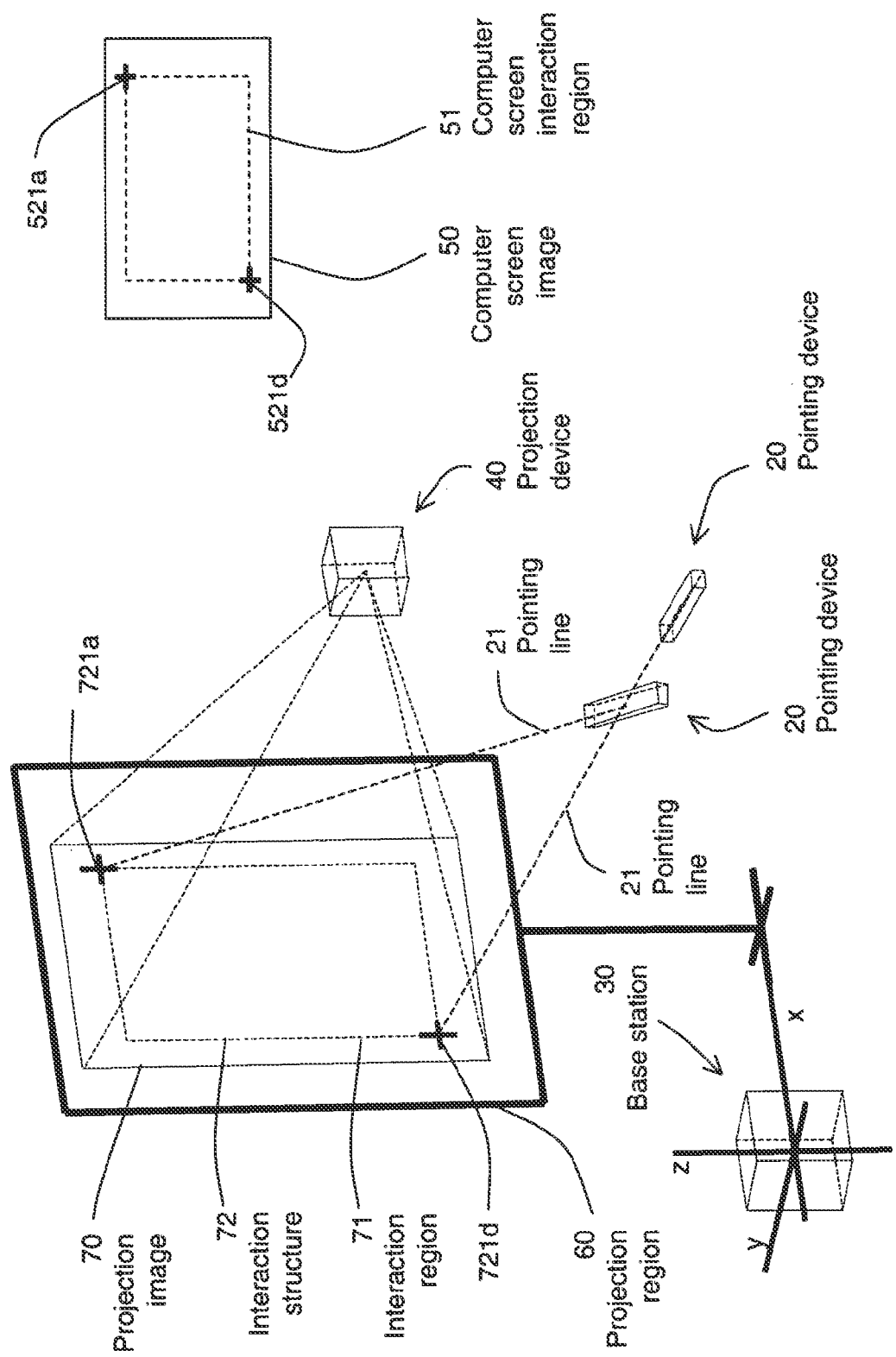
FIG. 7 shows one example of a first embodiment.

Referring to FIG. 7, it can be assumed that the venue where the presentation is to be made is set up such that projection image 70 and interaction region 71 are substantially rectangular. Such may be the case when the optical axis of projection device 40 is substantially parallel to the normal to projection region 60. Projection region 60 may be a projection screen on a stand, as shown, but may also be a wall or any other substantially vertical surface. It can also be assumed that the bottom and top edges of both projection image 70 and interaction region 71 are substantially horizontal. Furthermore, it can be assumed that interaction region 71 is substantially the same size as projection image 70 and that computer screen interaction region 51 is substantially the same size as computer screen image 50. Additionally, it can be assumed that calibration points 721a, 721d substantially coincide with the projected versions of screen marks 521a, 521d. Finally, it is assumed that base station 30 is positioned such that the x-y-plane is substantially horizontal and the x-z-plane substantially coincides with the plane of interaction region 71. To facilitate in the positioning of base station 30, the user may be aided by level-sensing device 303 and visible markings 302.

Referring to FIGS. 3 and 7, process elements 80a-j may then result, either through default settings or through user-supplied settings, in the assumptions that interaction structure 72 is a rectangle that lies in the x-z plane and that its top and bottom edges are parallel to the x-y plane.

Referring to FIGS. 4 and 7, program element goa may then result in a set P containing three points that define the upper-right corner C(1), the upper-left corner C(2) and the lower-left corner C(3) of interaction structure 72. Additionally, program element goa may determine point CA (not denoted. as such in FIG. 7) to lie away from projection region 60, for example at the center of one of the two instantiations of pointing device 20, as shown in FIG. 7. Point CB may be determined anywhere in space. Program element 90a may also result in sets A and B each containing three lines, connecting the points in set P to points CA and CB respectively. Program element 90c may then result in a priori relationships such that all points in set P have y-coordinate equal to zero, that the upper-left corner will have an x-coordinate equal to the x-coordinate of the lower-left corner and that its z-coordinate will be equal to the z-coordinate of the upper-right corner. It will then be appreciated by those skilled in the art that this a priori information, together with complete 3D information on two lines in set A will be sufficient to uniquely determine the position, size and orientation of interaction structure 72 with respect to the x y z coordinate system. Therefore, program elements god, 90e, 90f, 90g may result in an empty set B. Moreover, program elements 90h, 90i, 90j, 90k may result in the removal from set A of line A(2), connecting point CA to point C(2).

Referring to FIGS. 5 and 7, program elements 100a-p may result in the program identifying point C(1) by instructing the computer (not shown) and projection device 40 to project screen mark 521a onto projection region 60, resulting in the appearance of calibration point 721a. Subsequently, the user is required to use light-beam projection device 202 to highlight calibration point 721a and indicate the success of this action to the computer (not shown) by, for example, pressing button 203a. As a result, the orientation and position of the z'-axis are assumed to define line A(i). The same actions are then performed for point C(3) and line A(3). Since set B is empty, the user need not be required to reposition pointing device 20. The two depictions of pointing device 20 in FIG. 7 are meant to illustrate that pointing device 20 only needs to be redirected and not repositioned during this exercise. It will be appreciated by those skilled in the art that program element 100p will then successfully result in a full 3D description of the three points in set P.

Referring to FIGS. 6 and 7, program element 110a may then result in the description of interaction structure 72 as a rectangle with upper-right corner C(1), upper-left corner C(2) and lower-left corner C(3). Step nob may then result in a method M that maps a point δ (not shown) in interaction structure 72 to a point ε (not shown) in computer screen interaction region Si in such a way that the ratio of distances between S and any two of the four corners of interaction structure 72 is the same as the ratio of distances between s and the two corresponding corners of computer screen interaction region 51, as will be appreciated by those skilled in the art. Steps 110c-k may then result in a very intuitive cursor control device that responds to a direct-pointing action by de-activating light-beam projection device 202 and showing cursor 501 at substantially point-of-aim 210 of pointing device 20 whenever point-of-aim 210 lies in projection image 70 (which in this example, by assumption, substantially coincides with interaction region 71). Since there is no necessity for a computer generated cursor and a light spot to be visible simultaneously there will not be any cause for confusion as to which of the two is the 'actual cursor'. Cursor 501 may be hidden from view when point-of-aim 210 does not lie in interaction structure 72, in which case light-beam projection device 202 may be activated automatically. Also, intuitive actions such as 'double click' may be provided by steps 110c-k.

Figure 8:
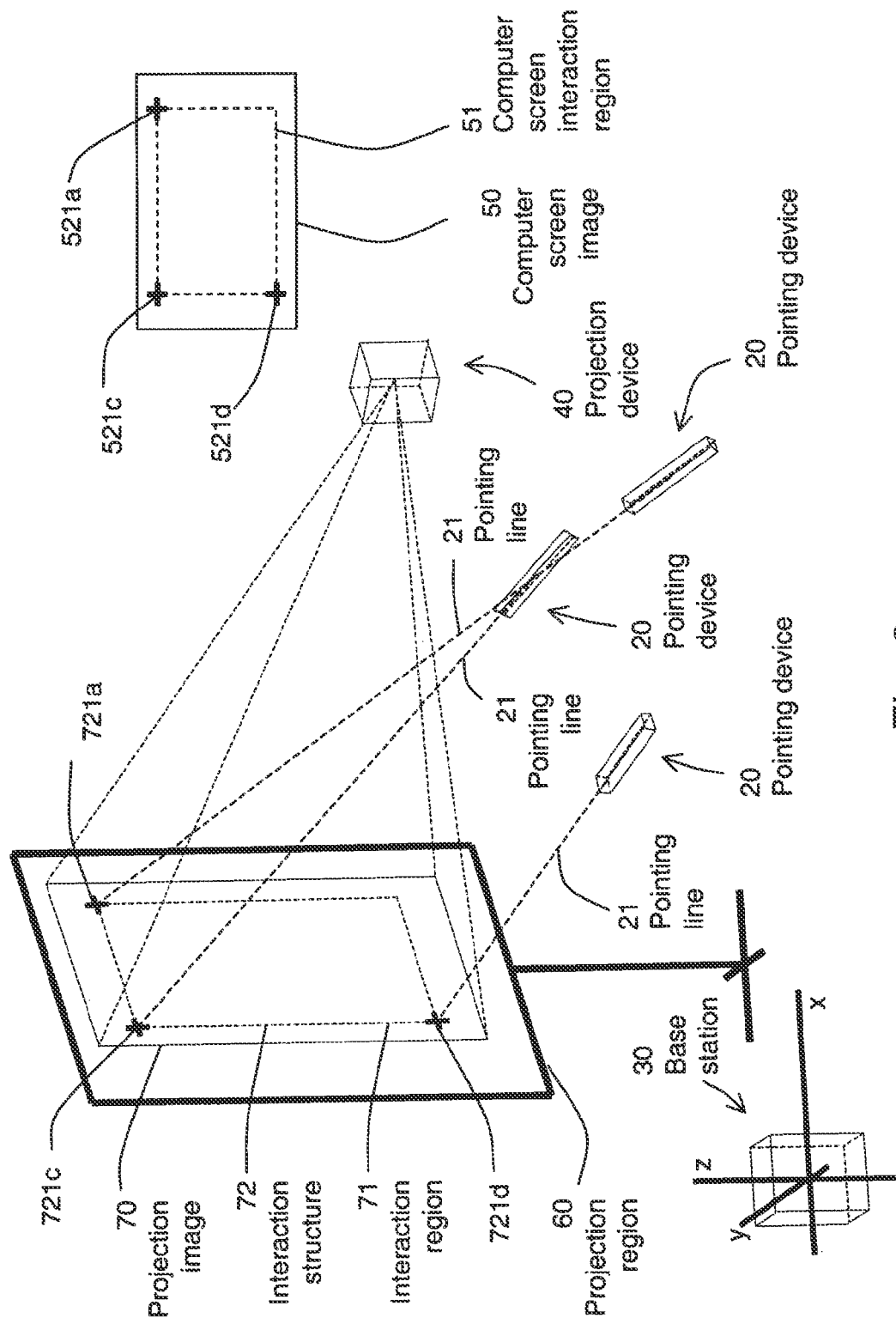
FIG. 8 shows a second example of one embodiment of the invention.

Referring to FIG. 8, it can be assumed that the venue where the presentation is to be given is set up such that projection image 70 and interaction region 71 are substantially rectangular. Such may be the case when the optical axis of projection device 40 is substantially parallel to the normal to projection region 60. Projection region 60 may be a projection screen on a stand, as shown, but may also be a wall or any similar surface. Projection region 60 can be assumed to be oriented substantially vertically. It can also be assumed that the bottom and top edges of both projection image 70 and interaction region 71 are substantially horizontal. Furthermore, it can also be assumed that interaction region 71 is substantially the same size as projection image 70 and that computer screen interaction region 51 is substantially the same size as computer screen image 50. Additionally, it can be assumed that calibration points 721a, 721c, 721d substantially coincide with the projected versions of screen marks 521a, 521c, 521d. Finally, it can be assumed that base station 30 is positioned such that the xy-plane is substantially horizontal. No assumptions are made regarding the x-z-plane and the y-z-plane other than that they are substantially vertical. To facilitate in the positioning of base station 30, the user may be aided by level-sensing device 303.

Referring to FIGS. 3 and 8, program elements 80a-j may then result, either through default settings or user-supplied settings, in the assumptions that interaction structure 72 is a rectangle of which the top and bottom edges are parallel to the x-y-plane (i.e., they are horizontal) and the left and right edges are perpendicular to the x-y-plane (i.e., they are vertical).

Referring to FIGS. 4 and 8, program element 90a may then result in a set P containing three points that define the upper-left corner C(i), the upper-right corner C(2) and the lower-left corner C(3) of interaction structure 72. Additionally, program element goa may determine point CA (not denoted as such in FIG. 8) to lie away from projection region 60, for example, at the center of one of the three instantiations of pointing device 20, as shown in FIG. 8. Point CB (not denoted as such in FIG. 8) may be determined to be displaced from point CA in a direction substantially parallel to interaction region 71, over a distance that may be the same order of magnitude as the size of interaction region 71. Program element goa may also result in sets A and B each containing three lines, connecting the points in set P to points CA and CB respectively. Program element 90c may then result in a priori relationships requiring that the upper-left corner will have x- and y-coordinates equal to the x- and y-coordinates of the lower-left corner and that its z-coordinate will be equal to the z-coordinate of the upper-right corner. As will be explained in detail below, the a priori information together with complete 3D information on two lines in set A and one line in set B will be enough to uniquely determine the position, size and orientation of interaction structure 72 with respect to the x y z coordinate system. Therefore, program elements god, 90e, 90f, 90g may result in set B containing only line B(3). Moreover, program elements 90h, 90i, 90j, 90k may result in set A containing only lines A(1) and A(2).

Referring to FIGS. 5 and 8, program elements 100a-p may result in the program identifying point C(1), C(2) and C(3) by means of projection device 40, in a manner similar to the one described in the previous example. In this case, however, C(1) and C(2) may be highlighted from approximately the same location CA, but C(3) needs to be highlighted from a different" location CB. To explain that the above-mentioned information is enough to uniquely establish the position, size and orientation of interaction structure 72, define the points in set P as:

$$C(1) = \begin{pmatrix} x_1 + \lambda_1 \cdot Rx_1 \\ y_1 + \lambda_1 \cdot Ry_1 \\ z_1 + \lambda_1 \cdot Rz_1 \end{pmatrix} \quad (1)$$

$$C(2) = \begin{pmatrix} x_1 + \lambda_2 \cdot Rx_2 \\ y_1 + \lambda_2 \cdot Ry_2 \\ z_1 + \lambda_2 \cdot Rz_2 \end{pmatrix} \quad (2)$$

$$C(3) = \begin{pmatrix} x_3 + \lambda_3 \cdot Rx_3 \\ y_3 + \lambda_3 \cdot Ry_3 \\ z_3 + \lambda_3 \cdot Rz_3 \end{pmatrix} \quad (3)$$

Here, points CA and CB are defined as $(x_1, y_1, z_1)$ and $(x_3, y_3, z_3)$ respectively. Moreover, lines A(1), A(2) and B(3) are defined as passing through CA, CA and CB respectively, lying in directions governed by $(Rx_1, Ry_1, Rz_1)$, $(Rx_2, Ry_2, Rz_2)$ and $(Rx_3, Ry_3, Rz_3)$. All of these quantities are presumed to be measured by coordinate sensing device 201 and 301. For a unique description of the points in set P a solution is required for $\lambda_1$, $\lambda_2$ and $\lambda_3$.

Using these definitions the conditions described above can be written as:

$$\begin{bmatrix} Rz_1 & -Rz_2 & 0 \\ Rx_1 & 0 & -Rx_3 \\ Ry_1 & 0 & -Ry_3 \end{bmatrix} \begin{pmatrix} \lambda_1 \\ \lambda_2 \\ \lambda_3 \end{pmatrix} = \begin{pmatrix} 0 \\ x_3 - x_1 \\ y_3 - y_1 \end{pmatrix} \quad (4)$$

which can be solved in a straightforward manner according to the expression:

$$\begin{pmatrix} \lambda_1 \\ \lambda_2 \\ \lambda_3 \end{pmatrix} = \qquad (5)$$

$$\begin{pmatrix} [Rx_3 \cdot (y_3 - y_1) + Ry_3 \cdot (x_1 - x_3)]/[Rx_3 \cdot Ry_1 - Rx_1 \cdot Ry_3] \\ [Rz_1/Rz_2] \cdot [Rx_3 \cdot (y_3 - y_1) + Ry_3 \cdot (x_1 - x_3)]/[Rx_3 \cdot Ry_1 - Rx_1 \cdot Ry_3] \\ [Rx_1 \cdot (y_3 - y_1) + Ry_1 \cdot (x_1 - x_3)]/[Rx_3 \cdot Ry_1 - Rx_1 \cdot Ry_3] \end{pmatrix}$$

Note that this solution shows that, if point C(3) was highlighted from any point on the pointing line 21 that is used to highlight point C(i), i.e., $$\begin{pmatrix} x_3 \\ y_3 \\ z_3 \end{pmatrix} = \begin{pmatrix} x_1 + \tau \cdot Rx_1 \\ y_1 + \tau \cdot Ry_1 \\ z_1 + \tau \cdot Rz_1 \end{pmatrix} \qquad (6)$$

the solution for the three unknown λ's would collapse to $$\begin{pmatrix} \lambda_1 \\ \lambda_2 \\ \lambda_3 \end{pmatrix} = \begin{pmatrix} \tau \\ \tau Rz_1/Rz_2 \\ 0 \end{pmatrix} \qquad (7)$$

making unique determination of interaction structure 72 impossible. Conversely, the fact that points C(1) and C(2) are, in this example, both highlighted from substantially the same point CA does not cause any problems. It will be appreciated by those skilled in the art that C(1) and C(2) may also be highlighted from different points, without loss of functionality.

Referring to FIGS. 6 and 8, the course and results of program elements 110a-k will be similar to those described in Example 1.

Figure 9:
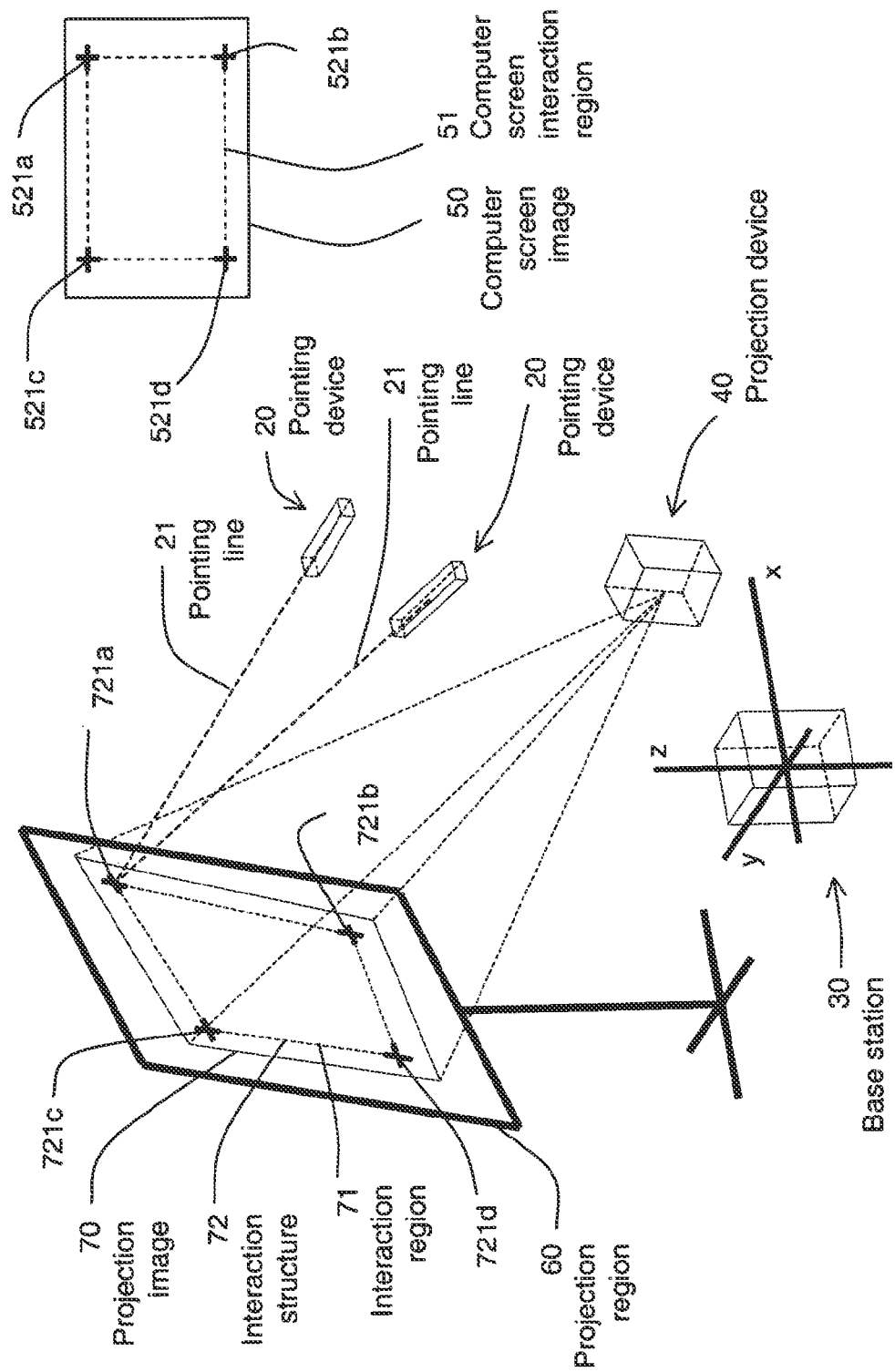
FIG. 9 shows a third example of one embodiment.

Referring to FIG. 9, in another example, the only assumptions made are that interaction region 71 is substantially the same size as projection image 70, computer screen interaction region 51 is substantially the same size as computer screen image 50, calibration points 721a, 721b, 721c, 721d substantially coincide with the. Projected versions of screen marks 521a, 521b, 521c and 521d and computer screen interaction region 51 is substantially rectangular. This situation may arise when the optical axis of projection device 40 is not aligned with the normal to projection surface 60.

Referring to FIGS. 3 and 9, program elements 80a-j may then result, either through default settings or user supplied settings, in the assumption that interaction structure 72 is a quadrangle; no assumptions are made regarding its position or orientation.

Referring to FIGS. 4 and 9, program elements goa may then result in a set P containing four points that define the upper-right, upper-left, lower-right and lower-left corners of interaction structure 72. Additionally, program element goa may conceive point CA (not denoted as such in FIG. 9) to lie away from projection region 60, for example at the center of the first of the two instantiations of pointing device 20, as shown in FIG. 9. Point CB may, for example, be determined to lie at the center of the second of the two instantiations of pointing device 20, as drawn in FIG. 9. Now, program elements 90d, 90e, 90f, 90g and steps 90h, 90i, 90j, 90k may result in sets A and B each containing 4 lines.

Referring to FIGS. 5 and 9, program elements 100a-p may result in the program identifying the four points in set P by means of projection device 40, in a manner similar to the one described in Example 1. In this case, however, all four points in set P may be highlighted from approximately the same location CA first, after which all four points may be highlighted from approximately the same location CB. Note that FIG. 9, for reasons of clarity, only depicts the highlighting of calibration point 721a. Each point C(i) may then be constructed as the point lying halfway the shortest line segment connecting lines A(i) and B(i); this line segment may have zero length.

Referring to FIGS. 6 and 9, the course and results of program elements 110a-k will be similar to those described with respect to the first example, with the exception of program element nob, the mapping element. Now, a more elaborate method M is needed than the one described in previous examples. For example, a method such as described in U.S. Pat. No. 6,373,961 to Richardson (2002) may be utilized, but other appropriate methods may also be used.

Figure 10:
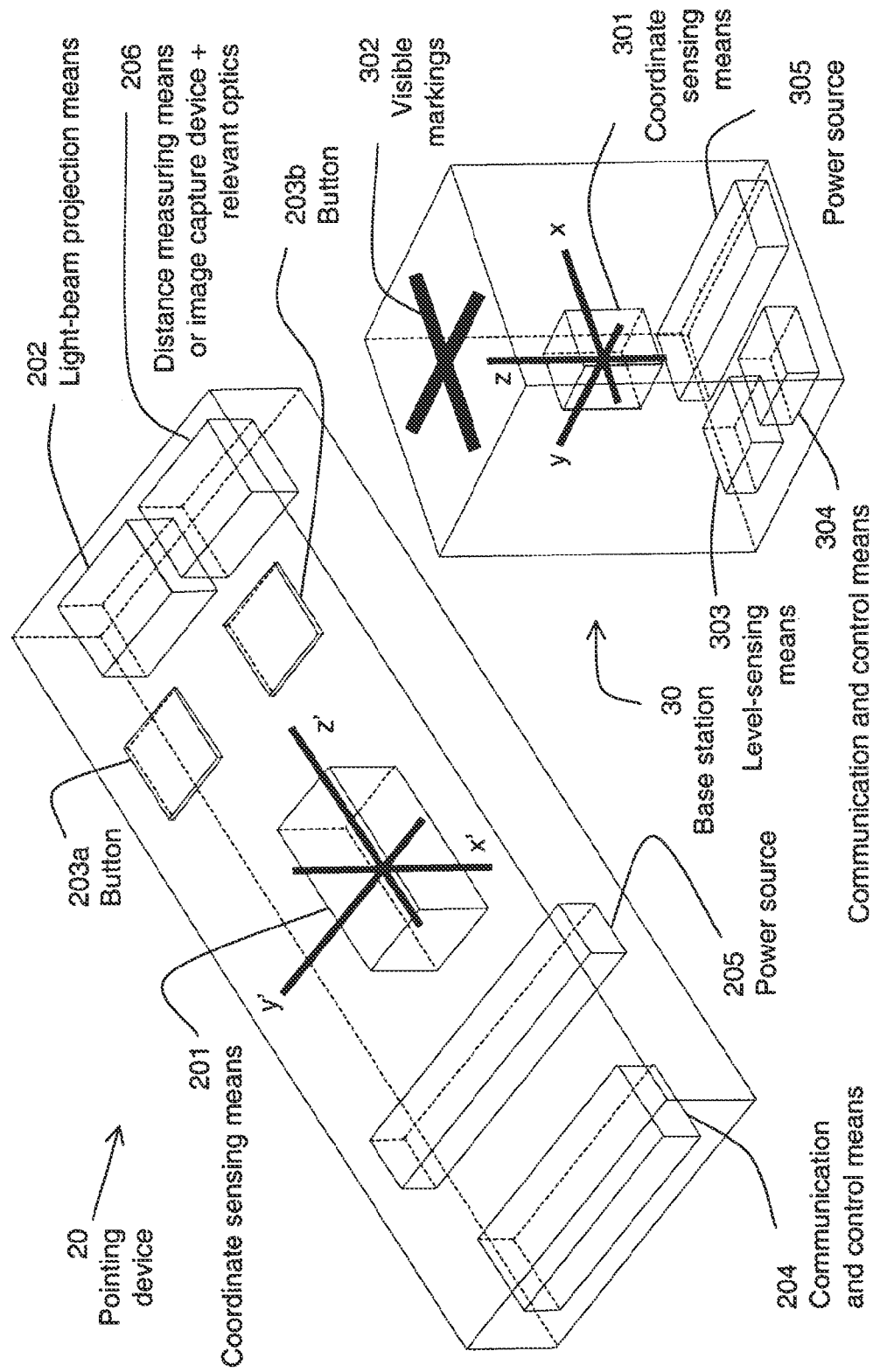
FIG. 10 shows a pointing device and base station according to a second embodiment.

A second embodiment will now be made with reference to FIG. 10, which shows pointing device 20 and base station 30. Here, in addition to any or all of the elements mentioned in the previous embodiment, pointing device 20 is also provided with distance measuring device 206, the position and orientation of which with respect to the x' y' z' coordinate system may be ascertained at the place of manufacture thereof and will be presumed to be known. Distance measuring device 206 may for example be embodied by a focus adjustment, or optical sensor. A digital camera may also be used. Distance measuring device 206 may determine the point-of-aim-distance 211 between the origin of the x' y' z' coordinate system and the point-of-aim, measured substantially parallel to the z'-axis (see also FIG. 2). The point of aim 210 may lie on projection region 60, on which interaction region 71 may lie. Distance measuring device 206 may have associated with it a manual focus adjustment that may be adjusted by the user (manual focus adjustment not shown). Alternatively, distance measuring device 206 may comprise a circuit (not shown) that automatically determines the point-of-aim-distance 211 between the origin of the x' y' z' coordinate system and the point-of-aim. For example, if the point-of-aim lies on projection region 60, distance measuring device 206 may bounce light off of projection region 60. In doing so, use may for instance be made of light-beam projection device 202. Any other appropriate mechanism for determining distance may also be used for distance measuring device 206. The optical axes of light-beam projection device 202 and distance measuring device 206 may coincide, for instance by making use of partially-reflecting elements (not shown) such as disclosed in U.S. Pat. No. 4,768,028 to Blackie (1988).

The operation of the present embodiment will now be described with reference to FIGS. 2, 10, and 3. The process elements in FIG. 3 will be identical to the ones described in the first embodiment, resulting in similar assumptions regarding the shape of interaction region 71 (and interaction structure 72) and possibly orientation and position of interaction structure 72. In particular, a default distance between interaction structure 72 and the origin of coordinate system x y z will be assumed for purpose of initialization.

Figure 11:
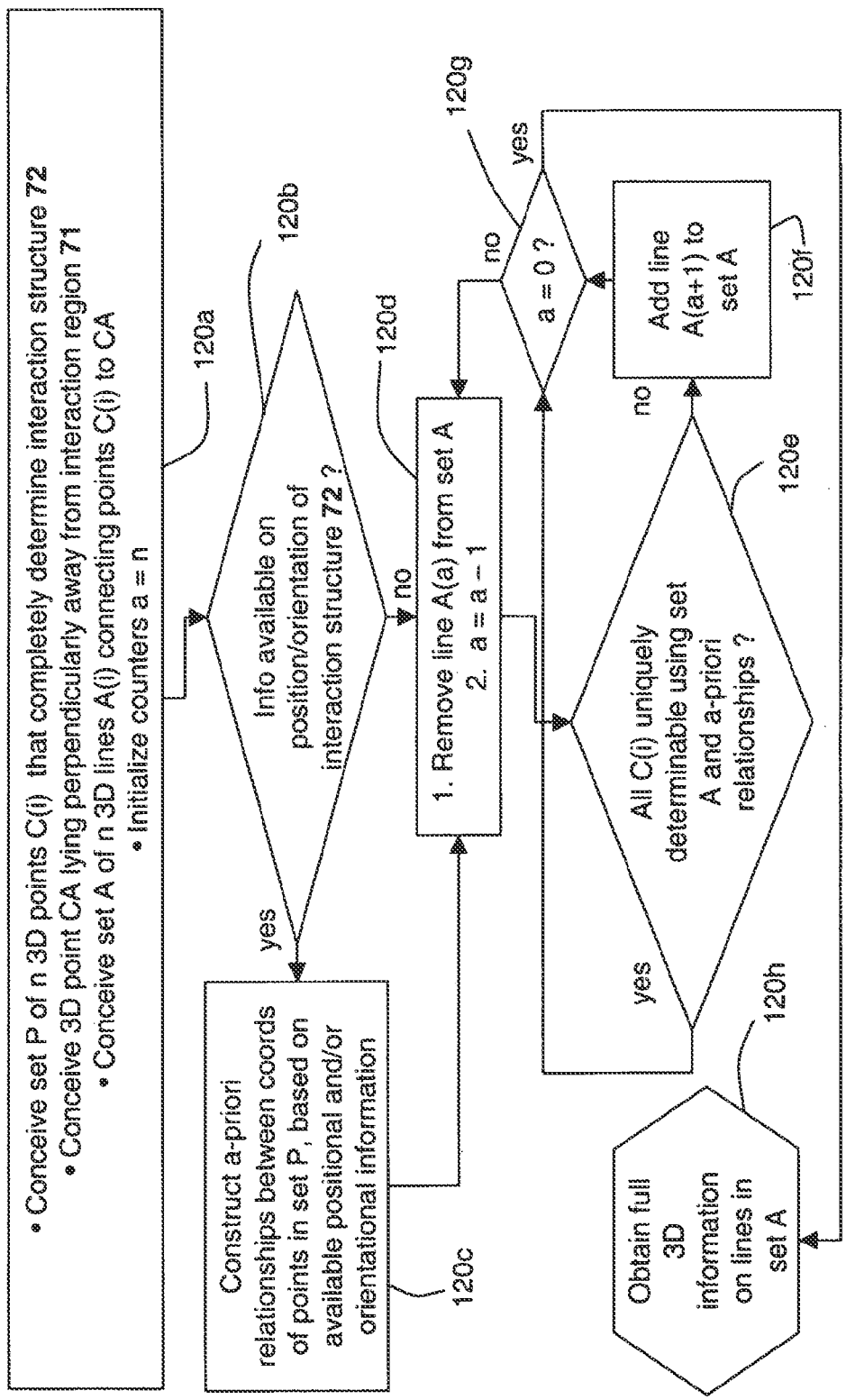
FIG. 11 shows program steps for construction of information set according to several embodiments.

Referring to FIG. 11, instead of the program elements described above with reference to FIG. 4, program flow now continues at 120a. Program elements 120a-120h are shown to be similar to program elements 90a-90m (FIG. 4), except that only point CA, set A and counter a are considered. That is to say, in the present embodiment it is no longer necessary to determine the second point CB and associated repositioning of pointing device 20 during the calibration procedure.

Figure 12:
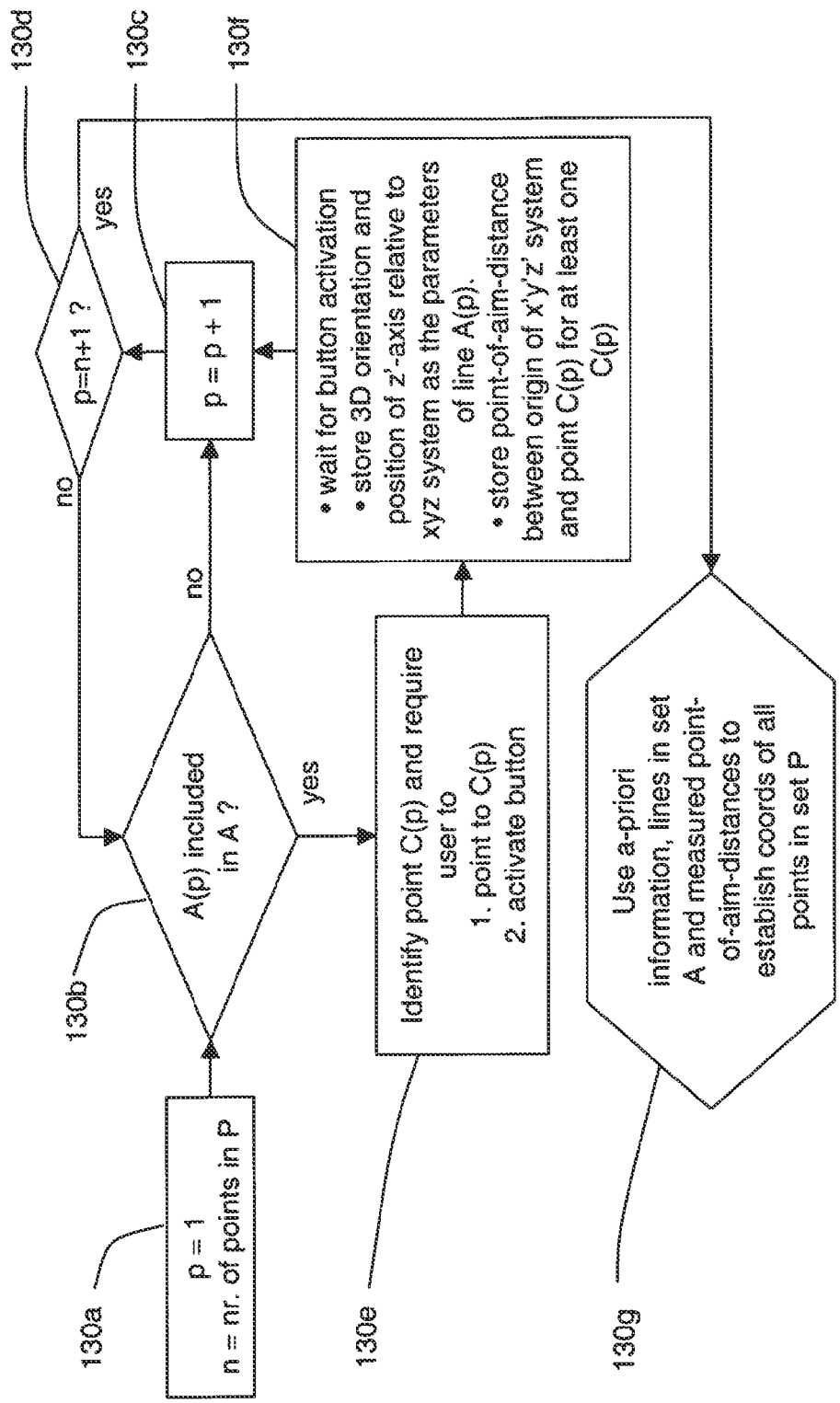
FIG. 12 shows program steps for ascertaining necessary 3D data according to several embodiments.

After program element 120*h*, program flow continues with program elements outlined in FIG. 12. Referring to FIG. 12, program elements 130*a*-130*g* are seen to be similar to steps 100*a*-100*p* (FIG. 5). Comparing program element 130*f* with program element 100*f* (FIG. 5), it can be seen that at 130*f* the program also stores information on the point-of-aim-distance (211 in FIG. 2) between the origin of the x' y' z' coordinate system and at least one of points C(p). Comparing elements 130*g* and 100*p* (FIG. 5), it can be seen that these point-of-aim-distances (211 in FIG. 2) are also used in determining the 3D coordinates of the points in set P.

With complete information on the 3D coordinates of the points in set P, it is then possible to construct a 3D description of interaction structure 72 (in FIG. 2). Therefore, program elements 110*a*-110*k* as described above with reference to FIG. 6 may also be followed in the present embodiment.

Thus, methods and means are disclosed that afford a highly flexible and easily deployable system for interacting with a presentation in a direct-pointing manner at a location not specifically equipped for such a purpose. Moreover, when utilizing the second preferred embodiment it is often sufficient for the user to highlight various calibration points 721*a*, 721*b*, . . . from one and the same position, making the calibration procedure even more easy to follow.

Figure 13:
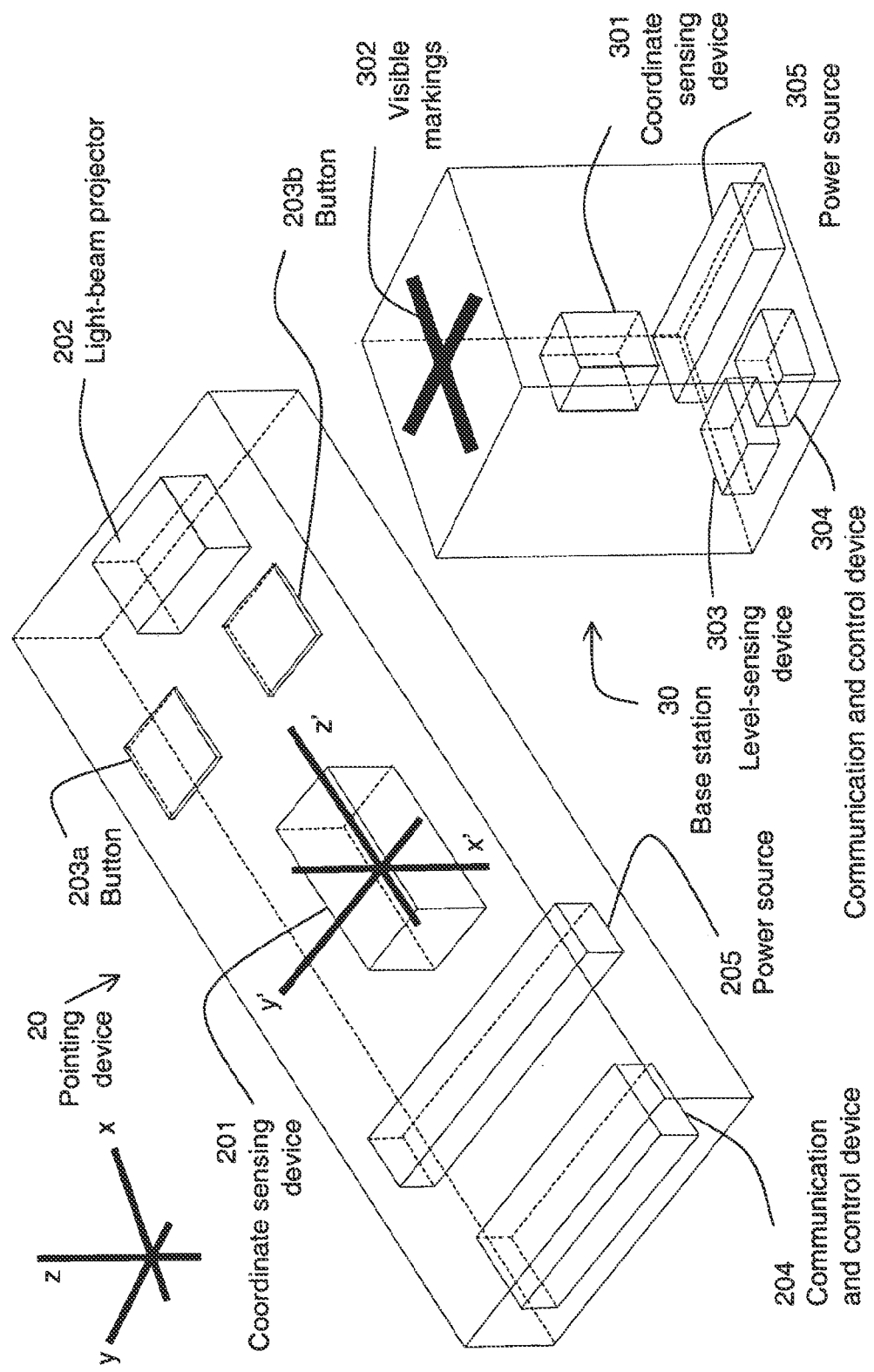
FIG. 13 shows a pointing device and base station according to a third embodiment.

Another embodiment will now be explained with reference to FIG. 13. FIG. 13 shows another embodiment of the pointing device 20. Pointing device 20 may be equipped with any or all of the elements mentioned in the other embodiments, such as described above with reference to FIG. 1 and FIG. 10. The present embodiment may include a base station 30 that has associated with it a coordinate system x y z. However, in the present embodiment it can be assumed that the position of pointing device 20 will remain substantially unchanged relative to interaction region 71 over an extended period of time, and that the origin of coordinate system x y z may be assumed to be virtually anywhere instead of being related to the base station 30. Furthermore, if any of the axes of the x y z system are chosen to be related to (locally) well-established, independent and stationary directions such as, for example, the Earth's magnetic field and/or the Earth's gravitational field, the Earth itself may be interpreted as embodying base station 30. Under such circumstances there may not be a need for an artificial base station 30; coordinate sensing device 201 may then, for example, be embodied by devices sensing the directions of the Earth magnetic and gravitational fields, such as accelerometers and a compass (for example, model no. HMR3300 device as manufactured by Honeywell International Inc., Morristown, N.J.), and communication and control device 204 may be configured to communicate directly with the computer (not shown).

The operation of the present embodiment will now be described with reference to FIGS. 8, 13, and 3. The remainder of the description of the present embodiment will, for purposes of explanation, include the assumption that any separately embodied base station 30 (FIGS. 8 and 13) is omitted entirely. It is also assumed that one of the axes of the orthogonal coordinate system x y z is substantially parallel to the Earth's gravity field (or has a defined relationship thereto), while the second and third axes of the coordinate system are in a fixed, known relationship to the at least one geographically defined axis. In the present embodiment it is assumed that the relative position of pointing device 20 with respect to interaction region 71 remains substantially unchanged, therefore the origin of coordinate system x y z will, for purposes of explanation, be chosen to coincide with a fixed point in the pointing device 20. For the purpose of the present embodiment, it should be understood that the three instantiations of pointing device 2*o* as shown in FIG. 8 substantially coincide.

It can be assumed in the present embodiment that a display system is arranged at the venue where a presentation is to be made, as a combination of a portable projection device 40 and projection surface 60, for example a wall. It will furthermore be assumed that this display system is connected, using appropriate means, to the computer (not shown) that generates the presentation imagery.

Upon arriving at the venue, the user connects pointing device 20 to the computer (not shown), for example via a USB connection (not shown), or using a wireless relay device (not shown). Also, the computer may recognize the connection and start a program, part of which may be contained in communication and control device 204 or in control logic contained in the wireless relay device itself (not shown). Alternatively, the user may be required to load the program into the computer manually via a CD drive, a floppy drive, memory stick or the like (not shown). In any case, the program may initiate a calibration routine that has as its object establishing the shape, position, size and orientation of a well-defined interaction structure 72, relative to the x y z coordinate system, wherein the interaction structure 72 is assumed to substantially coincide with a scaled and parallel version of interaction region 71. The flow of this program will be explained with reference to FIG. 3.

At 80*a* the program is initiated. At 80*b* defaults are entered for interaction region 71. Specifically, interaction region 71 is assumed to be a substantially parallel and scaled version of a well-defined interaction structure 72. Moreover, the respective corners of interaction region 71 and interaction structure 72 are assumed to substantially lie on lines intersecting each other in the origin of coordinate system x y z. It should be noted that FIG. 8 shows an interaction region 71 and an interaction structure 72 that are almost coincident, but this is only meant for illustrative purposes and is not a limitation on the scope of the invention. Again referring to FIG. 3, at 80*b* default values are also established for the orientation and position of the interaction structure 72. For example, the default values may provide that interaction region 71 is substantially a parallel and scaled version of an interaction structure 72 that is a flat rectangle of which the two most vertical sides are substantially parallel to the Earth's gravitational field, and of which the two most horizontal sides are substantially perpendicular to the Earth's gravitational field; moreover, the default values may provide that the respective corners of interaction region 71 and interaction structure 72 substantially lie on lines intersecting each other in the origin of coordinate system x y z. The default values may furthermore provide that the position of interaction structure 72 is such that the distance between pointing device 20 and the lower left corner of interaction structure 72 is equal to 1. Note that other values for the foregoing distance may be equally valid in the present embodiment. Based on the foregoing default values, calibration points 721*a*,

721*c*, 721*d*, . . . can define characteristic features of interaction region 71 and can also define characteristic features of interaction structure 72.

At 80*c* a decision is made whether the default values for interaction region 71 and interaction structure 72 should be accepted or overridden by the user. If the default values are to be accepted, the program flow continues to 80*j*, the details of which are explained below with reference to FIG. 11. If the defaults are to be overridden, the program flow continues with elements 80d-80i, during which the user may override any of the default settings. The user may be aided during program elements 80d-80i by a library of predetermined shapes, predetermined orientations and/or predetermined positions. Alternatively, the user can be provided with the capability to construct custom shapes, orientations and/or positions. In any event, program flow continues to 80j.

Referring to FIG. 1i, program flow now continues to 120a. Program elements 120a-120h are substantially similar to program elements 90a-90m (FIG. 4), except that only point CA, set A and counter a. are considered. In the present embodiment it is not required to determine a second point CB and an associated repositioning of pointing device 20 during the calibration procedure.

Figure 14:
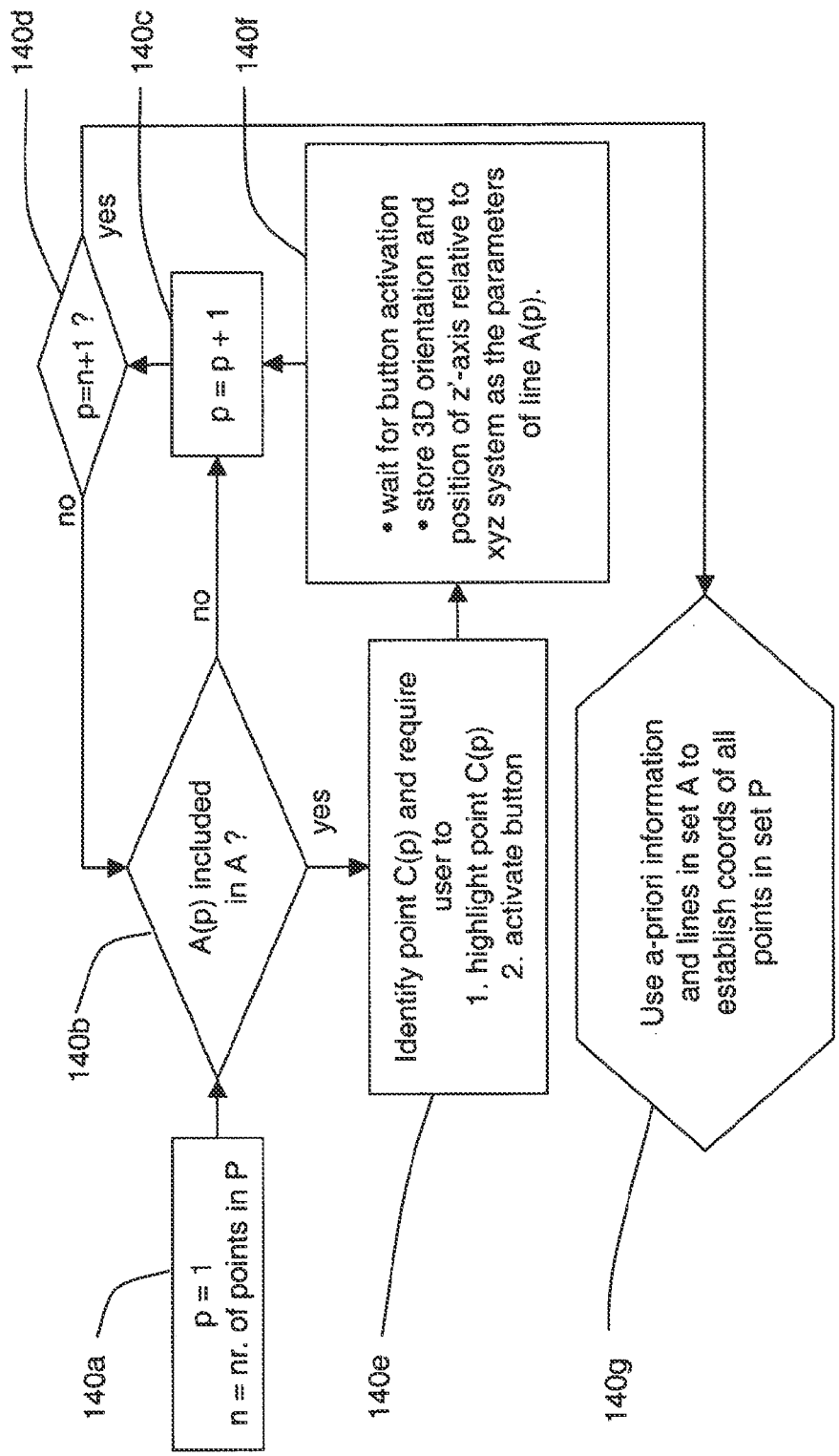
FIG. 14 shows program steps for ascertaining necessary 3D data according to several embodiments.
Figure 15:
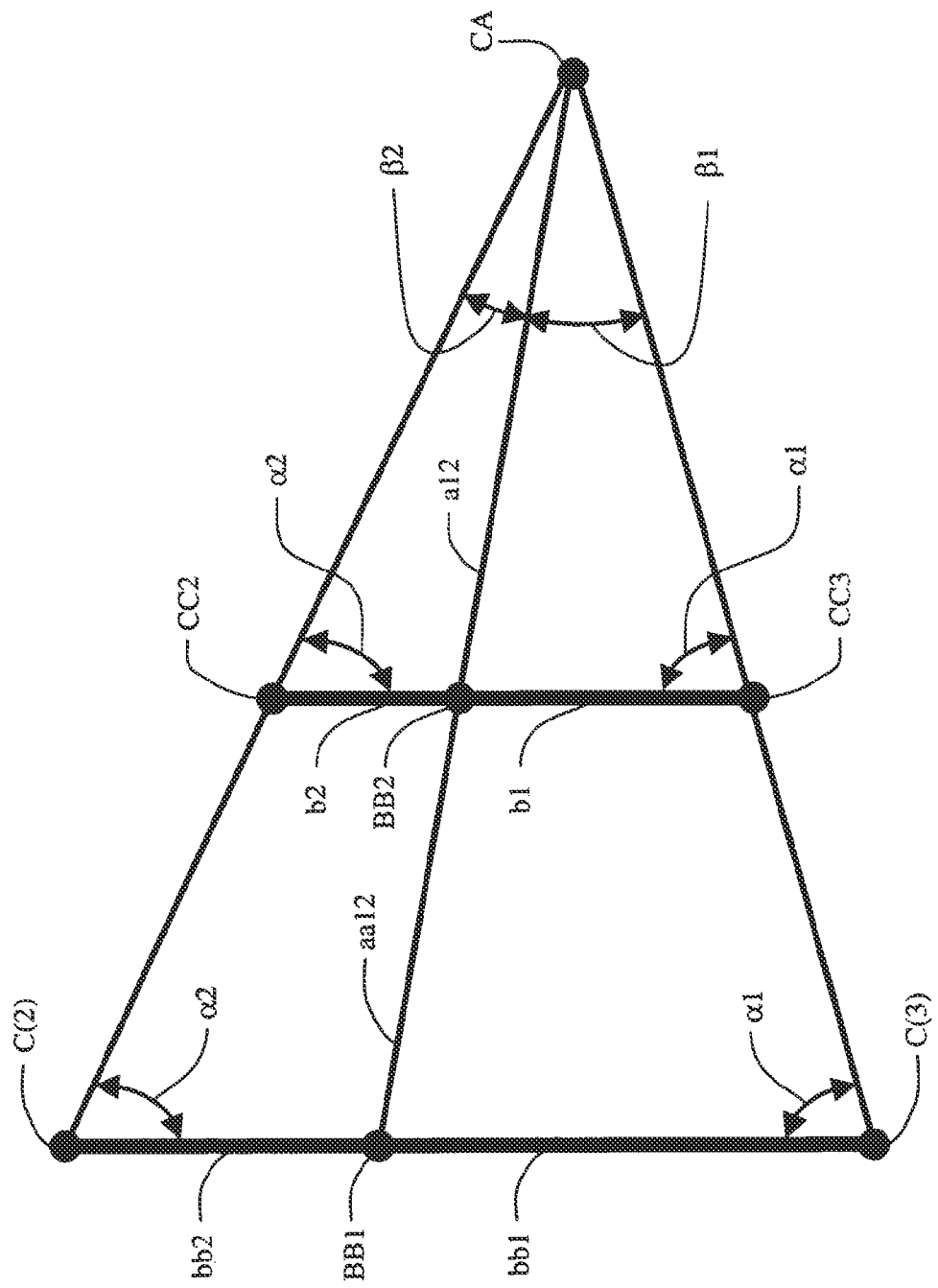
FIG. 15 shows projection of interaction structure on horizontal and vertical planes.

After 120h, program flow continues with elements described with reference to FIG. 14. In FIG. 14, program elements 140a-140g are shown to be similar to steps 130a-130g (FIG. 12). Comparing element 140f with element 130f (FIG. 12), it can be seen that element 140f does not include storing information for any directly measured distance. Element 140f need not include storing information on the position of the z'-axis, because the position of pointing device 20 is assumed to remain substantially unchanged over an extended period of time. Comparing elements 140g and 130g, it can be seen that any directly measured distance is not needed to determine the 3D coordinates of the points in set P (see FIG. 4). In fact, having the default distance (set to 1) between pointing device 20 and the lower left corner of interaction structure 72 is sufficient for operation of the system in the present embodiment. To explain this fact, reference is again made to FIG. 8. Using the above default values, interaction structure 72 will be completely defined by, for example, its upper-left corner C(1), its upper-right corner C(2) and its lower-left corner C(3)

$$C(1) = \lambda_1 \cdot \begin{pmatrix} Rx1 \\ Ry1 \\ Rz1 \end{pmatrix} \quad (8)$$

$$C(2) = \lambda_2 \cdot \begin{pmatrix} Rx2 \\ Ry2 \\ Rz2 \end{pmatrix} \quad (9)$$

$$C(3) = \lambda_3 \cdot \begin{pmatrix} Rx3 \\ Ry3 \\ Rz3 \end{pmatrix} \quad (10)$$

lying on lines A(1), A(2) and A(3) that connect the origin to points $(Rx_1, Ry_1, Rz_1)$, $(Rx_2, Ry_2, Rz_2)$ and $(Rx_3, Ry_3, Rz_3)$ respectively. Using these definitions, the conditions described above determine relationships between the various variables that can be written as $$\begin{bmatrix} Rz_1 & -Rz_2 & 0 \\ Rx_1 & 0 & -Rx_3 \\ Ry_1 & 0 & -Ry_3 \end{bmatrix} \begin{pmatrix} \lambda_1 \\ \lambda_2 \\ \lambda_3 \end{pmatrix} = \begin{pmatrix} 0 \\ 0 \\ 0 \end{pmatrix} \quad (12)$$

which will have non-trivial solutions only if the determinant of the matrix equals zero. Then, it can be shown that any combination of $(\lambda_1, \lambda_2, \lambda_3)$ that can be written in the form:

$$\begin{pmatrix} \lambda_1 \\ \lambda_2 \\ \lambda_3 \end{pmatrix} = \begin{pmatrix} Rz2/Rz1 \\ 1 \\ (Rz2 \cdot Rx1)/(Rz1 \cdot Rx3) \end{pmatrix} \cdot \alpha \quad (13)$$

where α is any arbitrary real number, will generate solutions for interaction structure 72 that are parallel to each other. The assumption that the distance between pointing device 20 and the lower left corner of interaction structure 72 is 1 will hence uniquely generate one of these solutions. To see that other assumptions regarding this distance do not influence the operation of the present embodiment, reference is made to FIG. 15. In FIG. 15, projections of two parallel solutions for interaction structure 72 are shown, obtained for different values of distances CA-C(3). When it is assumed, for purposes of explanation, that these two solutions are parallel to the z-x plane, FIG. 15 may be interpreted as a projection of the two solutions onto the x-y plane. These projections are shown as the thick line segments C(3)-C(2) and CC3-CC2. FIG. 15 also shows the projection of point CA (i.e., the origin of coordinate system x y z), from where the lower left and upper right corners of interaction structure 72 were highlighted, and line-segments C(3)-CA and C(2)-CA which coincide with the (projections of) the highlighting lines A(3) and A(2) (not denoted as such in FIG. 15). Finally, line-segment BB1-CA indicates (the projection of) a pointing line that is consistent with a point-of-aim BB1 on the one and point-of-aim BB2 on the other of the two solutions for interaction structure 72. To show that BB1 and BB2 represent the same horizontal coordinate when measured relative to the appropriate solution for interaction structure 72, the lengths of line-segments C(3)-BB1, C(2)-BB1, CC3-BB2, CC2-BB2, BB1-CA and BB2-CA are represented by bb1, bb2, b1, b2, aa12 and a12, respectively. It is sufficient to show that bb1/bb2=b1/b2. Consider the following equalities:

$$\frac{bb1}{\sin\beta1} = \frac{aa12}{\sin\alpha1} \quad (14)$$

$$\frac{bb2}{\sin\beta2} = \frac{aa12}{\sin\alpha2} \quad (15)$$

while, at the same time $$\frac{b1}{\sin\beta1} = \frac{a12}{\sin\alpha1} \quad (16)$$

$$\frac{b2}{\sin\beta2} = \frac{a12}{\sin\alpha2} \quad (17)$$

From this it follows that $$\frac{aa12}{bb1} = \frac{a12}{b1} \quad (18)$$

$$\frac{aa12}{bb2} = \frac{a12}{b2} \quad (19)$$

which, in turn, provides that $$bb1\frac{a12}{b1} = bb2\frac{a12}{b2} \Rightarrow \frac{bb1}{bb2} = \frac{b1}{b2} \quad (20)$$

This implies that BB1 and BB2 represent the same horizontal coordinate when measured relative to the appropriate solution for interaction structure 72. Note that, if FIG. 15 is interpreted as a projection onto the z-y-plane, it can be concluded that BB1 and BB2 also represent the same vertical coordinate when measured relative to the appropriate solution of interaction structure 72. Therefore the initial assumption that the distance between C(3) and CA is equal to 1 does not influence the operation of the third preferred embodiment.

It is theoretically possible that there are no non-zero solutions for the parameters $\lambda_1$, $\lambda_2$, and $\lambda_3$, when the determinant referred to above in equation (12) is non-zero. Such may be the case, for example, due to errors in measurements or in the assumed rectangular shape of interaction region 71. In such cases additional techniques may be used to find an acceptable solution for interaction structure 72. For example, a minimization routine may be used to find a solution for interaction structure 72 that minimizes a summation of the distances between some of its corners (which, by assumption, lie on lines connecting the origin of coordinate system x y z with the corners of interaction region 71) and the highlighting lines.

With complete information on the 3D coordinates of C(1), C(2) and C(3) it is possible to construct a 3D description of interaction structure 72. Therefore, program elements 110a-110k as described in the first embodiment and explained above with reference to FIG. 6 may also be followed in the present embodiment.

There may be situations in which the user is not able to hold pointing device 20 continuously at precisely the same position while performing the actions required by the calibration procedure described in FIGS. 3, 11 and 14, or during the use of the system as a direct-pointing device. Such changes in position of the pointing device 20 can cause errors in the calculation of the point-of-aim. It will be appreciated that if the discrepancy between the calculated and the true point-of-aim is small enough, the visual feedback provided by the projection of the cursor (501 in FIG. 2; projected cursor not explicitly shown) during use of the system as a direct-pointing device will still afford the user the perception that direct-pointing is being performed.

There are many other methods capable of establishing position, size and orientation of interaction structure 72, as will be appreciated by those skilled in the art. For example, if the distance between pointing device 20 and interaction structure 72 is presumed known, if interaction structure 72 is assumed to be rectangular with two vertical and two horizontal sides and if its aspect ratio (the ratio between its horizontal size and its vertical size) is also presumed known, then knowledge of two lines from CA to the upper-right and lower-left corner is sufficient to narrow the number of solutions for interaction structure 72 down to 2, dictated by 2 solutions of a quadratic equation (see also paragraph 181). One further assumption is then required to determine which of these 2 solutions is the correct one; this assumption may be in the form of a third line passing through yet another characteristic point of interaction structure 72, but it may also be in the form of knowledge of the (approximate) angle between the plane in which interaction structure 72 lies and a line connecting the origin to one of its corners. Other scenarios may also be conceived for which solutions may be devised that are within the scope of the general methods set forth herein.

In the present embodiment, using well-established and stationary directions such as, for example, the Earth's magnetic field and the Earth's gravitational field, it may be possible to omit a separately embodied base station, making the present embodiment of the system possibly more compact, less expensive to make and easier to deploy.

While the above description contains many specificities, these should not be construed as limitations on the scope of the invention, Many other variations are possible. For example, pointing device 20 may be hand held, but may also be carried by the user in a different manner, such as by means of a headset, finger-worn ring or the like.

Although the first, second and third embodiments make use of the assumption that the interaction structure 72 and interaction region 71 are quadrangles, this need not be the case even when the corresponding computer screen interaction region 51 is rectangular in shape. For example, projection region 60 may be spherical in shape. This may cause the projection of a square computer screen interaction region 51 to result in interaction region 71 having the general shape of a sphere-segment. Other shapes are also possible, depending on a number of factors such as the angle between the optical axis of projection device 40 and projection region 60. It will be appreciated by those skilled in the art that set P (see FIG. 4, step 90a and FIG. 1i, step 120a) and method M (see FIG. 6, step 110b) may become more complicated under these circumstances, but may still be well defined. In fact, method M and sets P, A, B may be constructed in any way that is advantageous to the particular system application. It is also possible to determine more points and associated line sets than just CA and CB, and associated line sets A and B. Specifically, set P may have more or fewer than the number of points described with reference to the foregoing embodiments, depending on the complexity of the presentation venue. Also, sets A and B may contain more lines than the minimum number needed to establish the coordinates of the points in set P.

The present invention may make use of mathematical techniques not described explicitly herein but well known to those skilled in the art to aid with various aspects of the present invention, for example in the determination of position and/or orientation of interaction structure 72. The second example of the first embodiment, for example, was described as relying on three lines highlighting corners of the interaction structure 72. It is also possible that a more accurate solution for the position and/or orientation of interaction structure 72 may be obtained when the user is requested to also highlight the fourth corner of the screen. An appropriate minimization routine may then be used to find a solution characterized by, for example, a minimum accumulated distance between the four corners of interaction structure 72 and the closest highlighting line.

Moreover, although set P is described as containing points that are needed to completely define interaction structure 72, other embodiments of the invention may use so-called "control points" for quality control purposes. Such control points may be used to test the validity of the assumptions made concerning, for example, the shape, the position, size and/or orientation of interaction region 71 and, therefore, interaction structure 72, as well as to test the accuracy of the measurements made to establish the 3D features of the various lines. As an example, consider the case in which interaction structure 72 is taken to be a rectangle for which all data needed to uniquely establish its size, orientation and position with respect to the x y z coordinate system has been ascertained by the program elements described with respect to the foregoing embodiments. Moreover, in this example interaction region 71 and, therefore, interaction structure 72, are assumed to substantially coincide with the projection of a rectangular computer screen interaction region 51. Then, the computer may display a suitable screen mark 521a, 521b, . . . at, for example, the center of computer screen interaction region 51, which may be projected by projection device 40 onto projection region 60. It will be appreciated that the process elements described herein may be used to calculate 3D coordinates of this projected point, based on the available data regarding shape, size, orientation and position of interaction structure 72. The user may then be required to highlight the projected point using light-beam projection device 202 and indicate the success of this action to the computer by, for example, activating button 203a. If all measurements and highlighting actions were accurate enough and no false assumptions were made, the 3D coordinates of the projected point should substantially conform to the 3D characteristics of the z'-axis. If the discrepancy is deemed too large the user may be required to repeat part or all of the calibration steps outlined in the present invention.

There may also be more than one method M and sets P, A and B, each of which may be associated with a different interaction structure 72 and interaction region 71. There may be more than one interaction structure 72 and interaction region 71, each of which may, but need not, lie on projection region 60 and each of which may, but need not, be associated by means of projecting screen marks 521a, 521b, ..., with one or more computer screen interaction regions 51.

Although coordinate sensing devices 201 and 301 (see for example FIG. 1) were in some embodiments described as being able to provide information on the 3D position and 3D orientation of pointing device 20 (see for example FIG. 2) relative to the x y z coordinate system, it should be understood that such information provision requirements may be relaxed under some circumstances. Specifically, in the first embodiment it is only required that the 3D position and 3D orientation of pointing line 21 (see for example FIG. 2) be known, instead of having complete information on the position of pointing device 20 along the pointing line 21. That is, in some cases pointing device 20 may be moved along pointing line 21 without loss of functionality. In such embodiments the coordinate sensing devices need only provide information on the 3D position and 3D orientation of a line (as opposed to a line-segment) substantially intersecting pointing device 20. If coordinate sensing devices are able to provide complete 3D information (i.e., 3D position and 3D orientation) of pointing device 20, as opposed to pointing line 21, the extra positional information may, for example, be used to implement the capability to zoom in on a region around point-of-aim 210 (not explicitly shown in FIG. 2); other actions may also be based on the extra positional information. The foregoing capability may be inferred from the description of the third embodiment, in which the coordinate sensing device is only used to provide information on the angle between the pointing line and two other fixed lines, instead of full position and orientation information about a line segment.

Although the first, second and third embodiments describe the application of the invention as a cursor control device, the invention may also be used to facilitate non-cursor-related applications. Such applications may include "virtual writing" on the interaction region 71, target practice and the like. Also, the invention may be used other than for presentations such as, for example, to control a cursor on a television screen in order to make selections from menus associated with such things as Digital Satellite Television; other applications may also be anticipated.

Moreover, the features of the present invention that enable the tracking of a point-of—
aim relative to art interaction region may be enhanced by algorithms that allow the filtering of involuntary, fast and/or small hand-movements (that may be caused, for example, by the activation of buttons). Such algorithms may be used to control a point that moves less erratically than the actual point-of-aim while still being associated with it. Such motion filtering may produce a more steady motion of cursor 501. Such algorithms may also be used when the user is required to highlight calibration points 721a, 721b, .... Filter algorithms are well-known in the art.

The present invention also contemplates the inclusion into pointing device 20 of sensors capable of detecting motion or acceleration, both linear and angular, in addition to or as part of coordinate sensing device 201. Such sensors may be used to detect unintended motion or acceleration of pointing device 20 that may be caused, for example, by trembling of the user's hand. The programs described above with reference to FIGS. 5, 6, 12 and 14 may be enhanced by algorithms that compare the output of such sensors and/or coordinate sensing device to predefined thresholds, so that a change in measured orientation and/or position by coordinate sensing device 201 may be recognized as significant only if such output exceeds these thresholds. Using threshold selection, a change in cursor position may only be affected if inferred to be intentional, avoiding the type of "jitter" associated with the use of regular laser pointers by a user with an unsteady hand.

Figure 16:
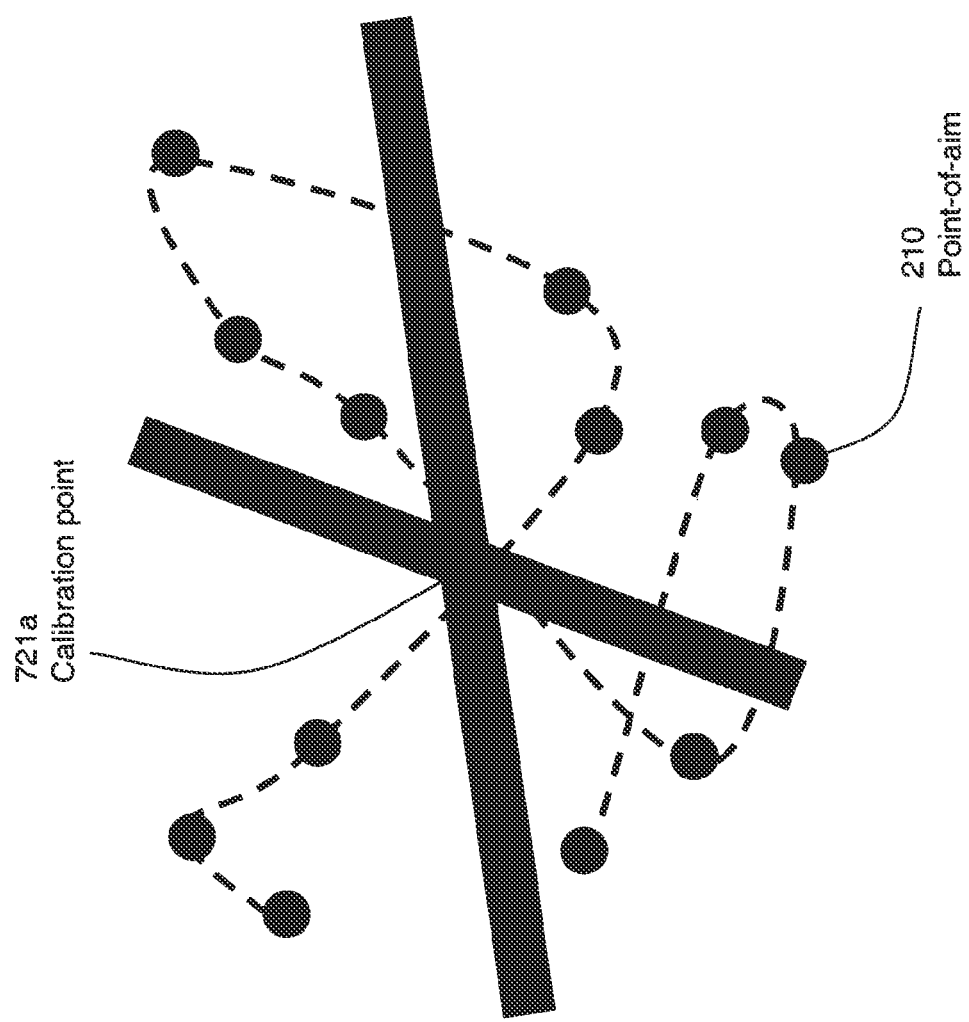
FIG. 16 shows an image of calibration point and light spots at the points-of-aim.

Furthermore, pointing device 20 may be equipped with an image capturing device, such as a digital camera, preferably with zoom and controllable focus capabilities. Other image capturing devices, in combination with appropriate optical devices, may also be used. As stated before, such a digital camera may be used as an embodiment of distance measuring device 206. Referring to FIG. 16, such a digital camera or the like (not shown) may also be used to aid in the process of highlighting the calibration points 721a, 721b, .... Images of calibration points 721a, 721b, ... and light spots at point-of-aim 210 may be captured during the time when the user is engaged in the highlighting process. These images may be temporarily stored, together with the position and orientation of the z'-axis at the time the image was acquired. During the highlighting process, it is likely that point-of-aim 210 changes slightly. The resulting sequence of images may then be used to more accurately estimate the orientation and position of the pointing line 21 that connects the origin of the x' y' z' system to calibration point 721a, 721b, .... For example, an averaging algorithm may be used. Alternatively, the stored position and orientation of the z'-axis corresponding to the captured image for which the light spot at point-of-aim 210 is closest to the center of calibration point 721 a, 721 b, ... may be taken as the position and orientation of the pointing line 21 that connects the origin of the x' y' z' system to calibration point 721a, 721b, ....

Some features may also be omitted without affecting the overall applicability of the present invention. Referring to FIG. 1, for example, level-sensing device 303 and visible markings 302 may be helpful but are not of critical importance and may be omitted. If level-sensing device 303 is present, the output may also be utilized to correct the orientation of the x y z coordinate system to ensure that its x-y plane is substantially horizontal, as previously explained. In such a case, the visible markings 302 may no longer precisely indicate the position of certain coordinate planes or even the origin of the x y z coordinate system. If the orientation of the uncorrected x-y-plane with respect to a horizontal surface is small enough, though, visible markings 302 may still provide sufficiently reliable information on coordinate planes and origin of the corrected x y z coordinate system.

Furthermore, the programs outlined in FIGS. 3, 4, 5, 6, 11, 12 and 14 may be changed appropriately without loss of functionality, particularly with respect to the order of some of the elements. The programs may also be written in any language that is advantageous to particular the implementation, including without limitation C, Java, and VisualBasic.

Other embodiments that include automatic activation and de-activation of light-beam projection device 202, or include provision for instructing the cursor control routines to show or hide computer cursor 501 are also within the scope of the present invention. For example, automatic activation and de-activation of light-beam projection device 202 may occur depending on whether or not the z'-axis intersects one of the interaction structures 72, or regions of space close to them. This may be performed by instructions to the cursor control routines to show or hide computer cursor 501. Also, means may be provided to activate light-beam projection device 202 manually.

Furthermore, pointing device 20 may include a conventional, indirect pointing device such as a trackball or the like, to be used in situations where direct pointing is not possible or not desired. As a practical matter, coordinate sensing device 201, in some embodiments in combination with coordinate sensing device 301, may be used to effect cursor control in an indirect manner if the intended use makes this desirable. To effect cursor control in indirect pointing applications, pointing device 20 may include a user input device that enables the user to select whether indirect cursor motion control is desired, or may include sensors and/or algorithms that enable determining when direct pointing actions are not possible. For example, an algorithm or sensor may be included that enables determination of whether pointing device 20 is within the operational range of base station 30. The third described embodiment, specifically, may be enhanced with algorithms and/or sensors, such as accelerometers, that enable to determination of whether pointing device 20 has been displaced significantly from the position at which the calibration procedure was performed, making direct pointing actions no longer possible without additional calibration steps. As part of the third described embodiment, additional input devices and algorithms may be included that enable the user to mark an orientation in space such that indirect cursor motion control may be effected based on the changes in orientation with respect to this marked orientation, as described in the cited prior art. Other embodiments of a system may also be enhanced by such functionality and input devices.

In addition to the previously described methods to determine size, position and orientation of interaction region 71, other methods are also within the scope of the invention. These include methods based on the use of digital cameras and the like. The position and orientation of such cameras, relative to the x y z coordinate system, may be tracked by using a device such as coordinate sensing device 201 and 301. For example, given sufficient knowledge of the optical characteristics of a digital camera, 3D features of an object may be determined from one or more images taken from one or more positions. Using such images, a complete 3D description of interaction region 71 may be determined.

Another alternative for establishing JD position, size and orientation of interaction region 71 is provided by a digital camera or the like used in addition to, or as embodiment of, the distance measuring device 206. In such embodiments the direction relative to the x' y' z' coordinate system of the axis along which distance is measured may be controlled and measured by mounting the digital camera and/or distance measuring device 206 in such a way that their orientation relative to the x' y' z' coordinate system may be controlled and measured. Other implementations in which the foregoing components are positionally fixed are also contemplated. For purposes of explanation, the axis along which distance is measured is denoted as the z"-axis, and the z"=0 position is assumed to coincide with the origin of the x' y' z' coordinate system. The orientation of the z"-axis with respect to the x' y' z' coordinate system, and also with respect to the x y z coordinate system may therefore be assumed to be known. In this embodiment, calibration points 721a, 721b, . . . may be displayed simultaneously, as projections of screen marks 521a, 521b, . . . , and may differ in appearance, such that they may be distinguished by image processing software. Alternatively, calibration points 721a, 721b, . . . may appear as projections of screen marks 521a, 521b, . . . in an automatically controlled sequence. The user may then be queried to direct pointing device 20 in the general direction of interaction region 71 in such a way that the digital camera may image the calibration point under consideration. An automated calibration sequence may then be executed, wherein the z"-axis is directed, in sequence, to calibration points 721a, 721b, . . . etc. The image processing software may identify the various calibration points 721a, 721b, . . . and the 3D position of these points may then be determined from knowledge of the orientation of the z"-axis and the coordinates of
the z"=0 position with respect to the x y z coordinate system, in addition to the measured point-of-aim-distance 211 between the calibration points 721a, 721b, . . . and the origin of the x' y' z' coordinate system. This embodiment may also provide light-beam projection device 202 mounted in a way that enables control of the direction of the light-beam relative to the x' y' z' coordinate system. This light-beam may be used to aid in positioning the z"-axis. Embodiments where light-beam projection device 202 are fixed or left out entirely are also contemplated.

The present invention also contemplates situations in which parts of the calibration procedures outlined may be repeated at appropriate times. For example, when the relative position of base station 30 and interaction region 71 changes substantially there may be a need to recalibrate the system. Such may also be the case when the position with respect to interaction region 71 of pointing device 20 changes significantly, while operation of a particular embodiment of the invention operated using the assumption that such position remains substantially unchanged. As another example, coordinate sensing device 201 and/or coordinate sensing device 301 may include time-integrated acceleration measuring devices. In such a case accuracy of coordinate sensing may deteriorate over time, because of drift in the base acceleration measurements. When the deterioration has become large enough to be unacceptable to the user, the user may be queried to place pointing device 20 in certain defined positions with respect to the x y z coordinate system, so as to re-initialize coordinate sensing device 201 and 301.

The present invention also contemplates the use of a plurality of pointing devices 20. Each of the plurality of pointing devices 20 may be uniquely identifiable by the computer, for example by carrying a unique ID code inside their respective communication and control device 204. Each of the plurality of pointing devices may be associated with a specific cursor and/or a specific interaction region 71. For example, a first pointing device may be used to control a corresponding cursor on the left-hand one of two interaction regions 71, and a second pointing device may be used to control a corresponding cursor on the right-hand one of two interaction regions 71. Alternatively, both pointing devices may be used to control a corresponding, identifiable cursor on the same interaction region 71.

Furthermore, the present invention contemplates the use of a plurality of entities such as base station 30, a particular one of which may be associated with the origin of the x y z coordinate system. Such a base station may be designated as the 'master base station'. Each of the base stations may include coordinate sensing device 201, so that their respective position and orientation relative to the master base station can be determined with greater accuracy than that afforded by the coordinate sensing device 201 that is incorporated in pointing device 20. Using such multiple base stations and coordinate sensing devices, 3D data pertaining to pointing device 20 may be determined relative to the closest base station, and the relative position and orientation of that base station with respect to the master base station may be used to establish the 3D data pertaining to pointing device 20 with respect to the x y z coordinate system. This may be of particular use in a situation where a user desires to move to a position in the room not within practical range of the master base station. In such a case, the user may take one of the additional base stations along. Since the position and orientation of this base station with respect to the master base station may be established with higher accuracy, this base station may be viewed as a relay-station, effectively increasing the operational range of the entire system. Note that, in such a case, the position of this base station may be changed with respect to interaction structure 72 without the need to re-execute the calibration procedures. Alternatively, signals from multiple base stations, as measured by the coordinate sensing device 201 disposed in pointing device 20, may be used simultaneously to reduce measurement errors. Generally speaking, determining the 3D data pertaining to pointing device 20 with respect to the x y z coordinate system by making use of only one base station 30 may be less accurate than by making use of a plurality of base stations. Hence, the effective range of operation of pointing device 20 may be enhanced by distributing a plurality of base stations over a large region of space.

Figure 17:
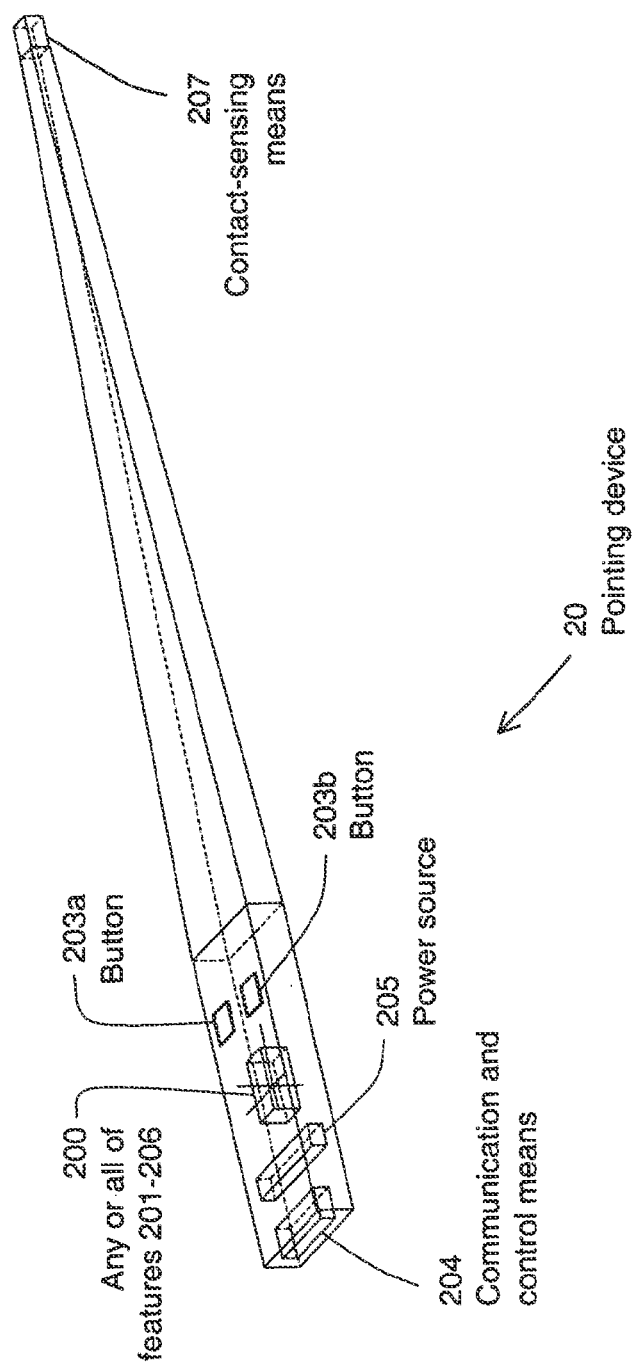
FIG. 17 shows an alternative embodiment of pointing device.

Referring to FIG. 17; in another embodiment, different devices than light-beam projection devices may be used to determine the position of the points in set P. For example, light-beam projection device 202 may be omitted in an embodiment where pointing device 20 has the general shape of an elongated body, such as a pointing stick. The length of this stick may be predetermined or variable. For example, pointing device 20 could be in the shape of an extendable, or telescopic pen such as the INFINITER Laser Baton sold by Bluesky Marketing—Unit 29, Six Harmony Row, Glasgow, G51 3BA, United Kingdom. The process of highlighting a calibration point 721a, 721b, . . . , in this embodiment may be replaced by the action of pointing to the calibration point 721a, 721b, . . . , thereby guided by the elongated shape of pointing device 20 instead of the light spot shown in FIG. 16 at point-of-aim 210. Distance measuring device 206 may also be provided in a related embodiment, similar to the second described embodiment. For example, distance measuring device 206 may include a device to measure the distance from the tip of the elongated body of pointing device 20 to the origin of the x' y' z' coordinate system. In such an embodiment, in order to obtain measurements of point-of-aim-distance 211, as described for example at program element 130f (see FIG. 12), the user might be queried to make physical contact between the tip of pointing device 20 and the calibration point. Referring to FIG. 17, pointing device 20 may also comprise contact-sensing device 207, for example at the tip of pointing device 20, capable of indicating physical contact between the tip of pointing device 20 and a surface. Contact-sensing device 207 may be in the form of a pressure-sensor or switch. Such sensors are known in the art.

The present invention also contemplates the use of various other sensors integrated in pointing device 20 and/or base station 30 to help determine the position and/or orientation of interaction structure 72. For example, pointing device 20 and/or base station 30 may include (ultra)sonic emitting and detecting devices to enable measuring substantially the shortest distance between a known point in the x y z coordinate system (e.g., the position of pointing device 20 or of base station 30) and the plane in which projection region 60 lies. The user may be queried to align pointing device 20 or base station 30 such that the distance measuring device is oriented substantially perpendicularly to projection region 60. It should be understood that other types of sensors may be included in pointing device 20 or base station 30 to help constrain the position and/or orientation of interaction structure 72.

Figure 19:
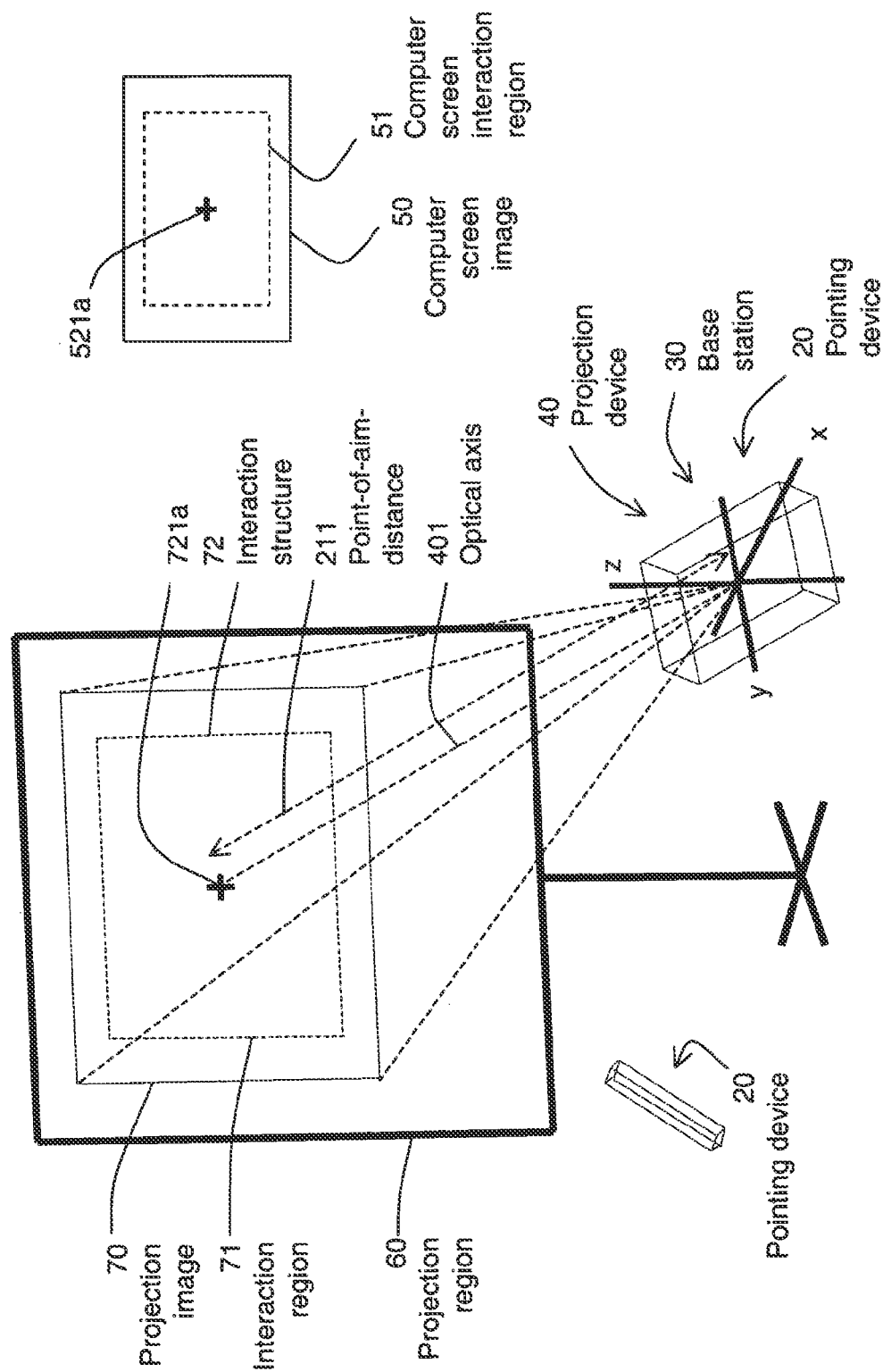
FIG. 19 shows a fourth preferred embodiment.

It may be advantageous to put some parts disclosed in this application in a known relation to one another. For example, projection device 40 and base station 30 may advantageously be incorporated in one and the same physical device, or be in a fixed relationship to one another. Alternatively, projection device 40 may be equipped with a coordinate sensing device 201. Whatever means are used, the system may be set up such that the position and/or orientation of some components, such as projection device 40 (and its components) with respect to coordinate system x y z is fixed, known, or can be measured. If additional appropriate sensors are included (such as, for example, level sensing device 303, visible markers 302, etc.), even the position and/or orientation of moveable parts of projection device 40 with respect to coordinate system x y z may be considered measurable and hence known. In particular, such an integrated device may furthermore incorporate a device like pointing device 20, associated with a pointing line 21; that is, it may be equipped with a device that allows the orientation and/or position with respect to coordinate system x y z of a pointing line 21 to be known, measured and/or adjusted (potentially automatically). The preferred embodiment that results is depicted in FIG. 19 where, by example, the pointing line associated with integrated pointing device 20 has been made to coincide with the optical axis 401 of projection device 40. In this application, optical axis 401 is defined as the line substantially connecting the optical origin 402 of the projection beam (see also FIG. 21) with the projected center of computer screen image 50, as projected by projection device 40. (Note that the projected center of computer screen image 50 may coincide with the center of projection image 70, notably so if both are rectangular.) Alternatively, the pointing line 21 may substantially coincide with another line connecting a characteristic point of projected image 70 (for example, one of its corners) to the optical origin 402 of projection device 40, or with other convenient lines. An even more advantageous embodiment may result when the pointing device 20 that is integrated with base station 30 and projection device 40 also incorporates distance measuring device/image capture device 206, as indicated by the appearance of point-of-aim-distance 211 in FIG. 19. To explain, it will now be assumed that the origin of the x y z system coincides with the origin of the x' y' z' system of the pointing device 20 that is integrated with base station 30 and projection device 40, as well as with the optical origin 402 of the projection beam of projection device 40. It will also be assumed that the aspect ratio is known of a substantially rectangular computer screen image 50 that is to be projected by projection device 40. If one furthermore assumes that projection device 40 is aligned in such a way that its optical axis 401 is substantially perpendicular to (a flat) projection region 60 and that its optical characteristics (such as the dimensions of its projection beam and the size of the to-be-projected image) are known, it will be clear to those skilled in the art that knowledge of the distance between the optical origin of projection device 40 and (the center of) projection image 70 is sufficient to uniquely establish the position, shape, orientation and size of projection image 70 (and interaction region 71 and interaction structure 72, assumed in this example to substantially coincide with projection image 70), as measured with respect to the x y z coordinate system. Notably, in such a scenario there would not be a need for the use of a user-wielded pointing device 20 to aid in establishing the above parameters. Indeed, under these circumstances a user-wielded pointing device 20 may be used as a direct-pointing instrument straight-away, without user-assisted calibration, after the above described automated calibration procedure has been executed so as to establish all necessary parameters of projection image 70 (and interaction region 71 and interaction structure 72).

If the integrated device (formed by at least combining, in the fashion described above, projection device 40 and base station 30, and possibly a pointing device 20) is not aligned perfectly perpendicular to projection region 60, an effect commonly referred to as keystoning will result in a projection image 70 that is not rectangular. For example, if the optical axis 401 is perpendicular to (a vertically oriented) projection region 60 in a horizontal but not in a vertical sense, projection of a rectangular computer screen image 50 will generally result in a projection image 70 that is an isosceles trapezoid with two horizontal edges. This is the most common form of image distortion, and is known as vertical keystoning. Conversely, if the optical axis 401 is perpendicular in a vertical, but not in a horizontal sense, the resulting isosceles trapezoid will have two vertical edges; this effect is known as horizontal keystoning. If both horizontal and vertical misalignments are not too severe, the assumption that projection image 70 (and interaction region 71 and interaction structure 72) is rectangular may still result in a system that affords the feeling of direct pointing, even if the system also assumes the vertical and horizontal alignments are perfectly perpendicular; the reasons for this are explained in paragraph 95.

Figure 20:
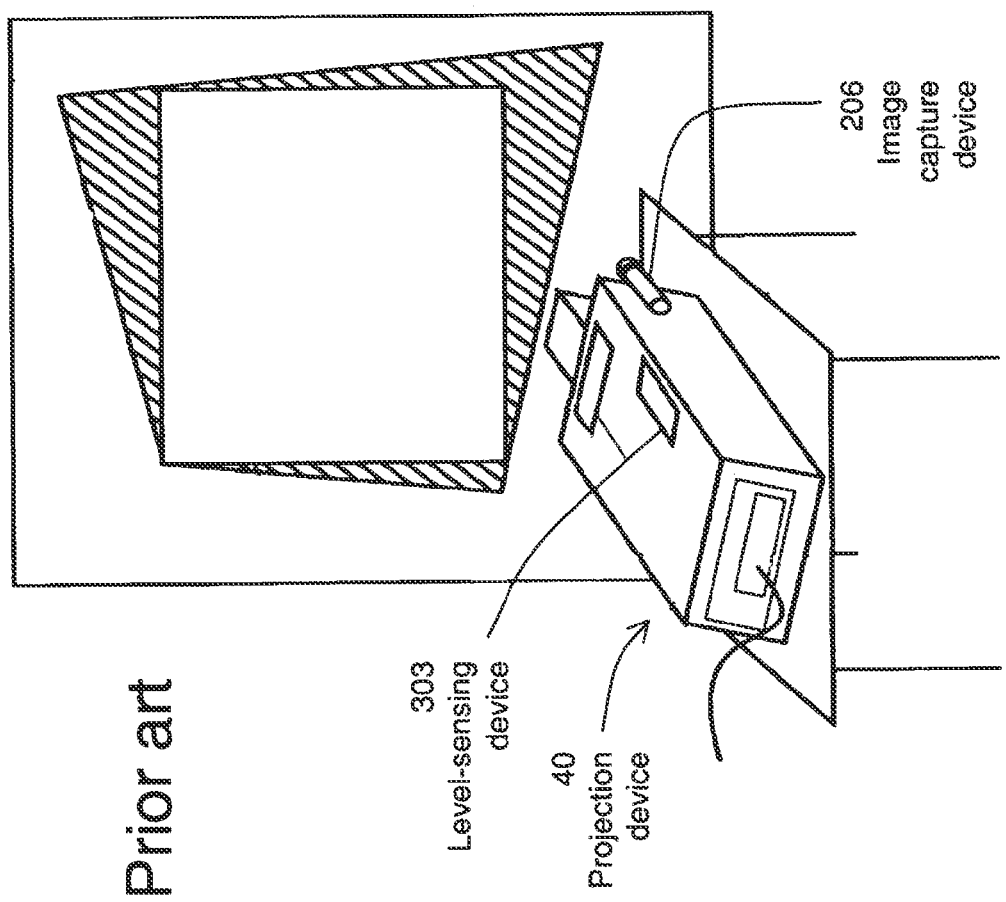
FIG. 20 shows prior art: the correction of vertical and horizontal keystoning.

In the more general case, as depicted in prior art FIG. 2o, one or both of these misalignments may be substantial. In such a case, the keystone effect will result in a projection image 70 that is neither rectangular nor shaped like an isosceles trapezoid. As explained in numerous prior art (such as U.S. Pat. No. 6,520,647 to Mitsubishi Electric Research Laboratories Inc., and U.S. Pat. No. 6,877,863 to Silicon Optix Inc.), vertical keystoning can easily be corrected for by incorporating sensors like level sensing device 303—see also prior art FIG. 20. Using such sensors, the vertical angle between the (vertically oriented) projection image 70 and optical axis 401 can easily be established. If, furthermore, distance measuring device 206 is subsequently used to substantially establish the distance between the projected version of the center of computer screen image 50 and the optical origin 402 of projection device 40 (i.e., measured along the optical axis 401), those skilled in the art will appreciate that inclusion of information on the optical characteristics of projection device 40 will, once again, provide sufficient information to be able to establish position, shape, orientation and size of an interaction structure 72 that is near-coincident with an interaction region 71 and projection image 70, provided the horizontal keystone effect is not too severe. Note that this may be done independent of whether or not the vertical keystone effect is corrected for.

Figure 21:
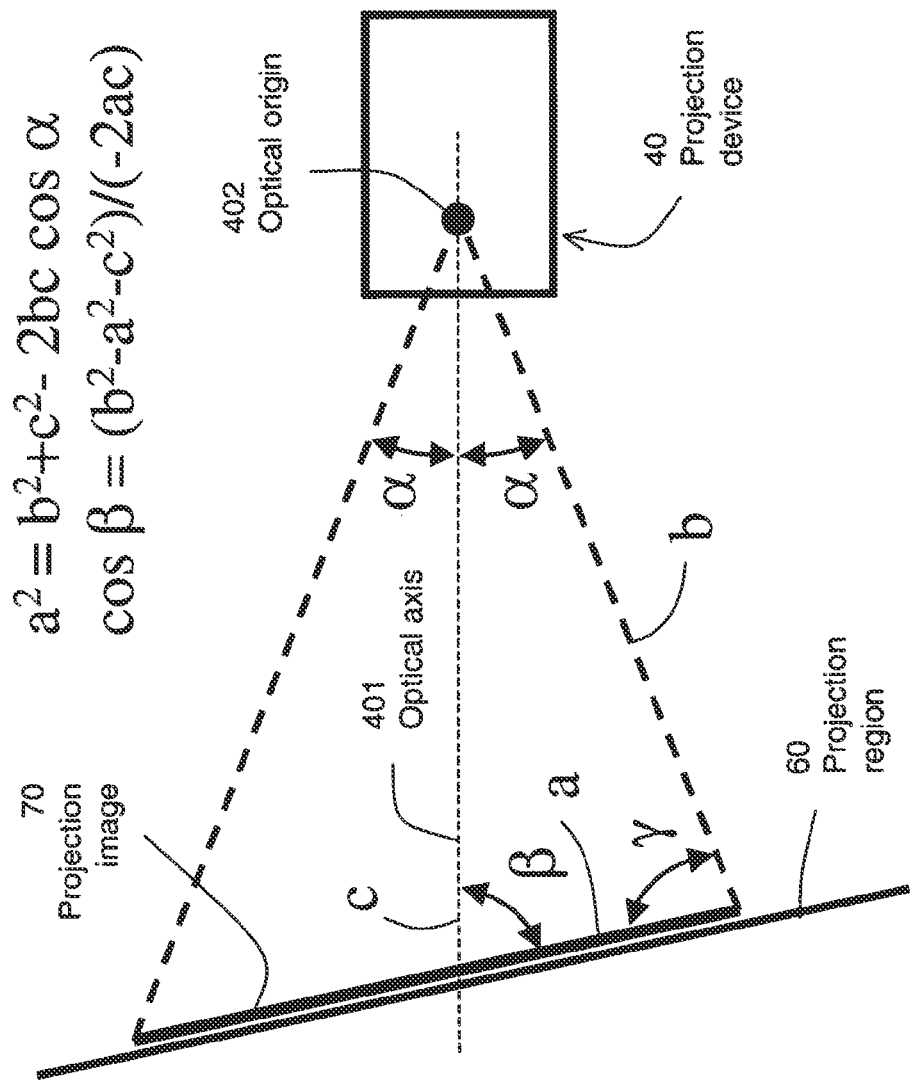
FIG. 21 shows application of the cosine rule for non-perpendicular projection situations.
Figure 22:
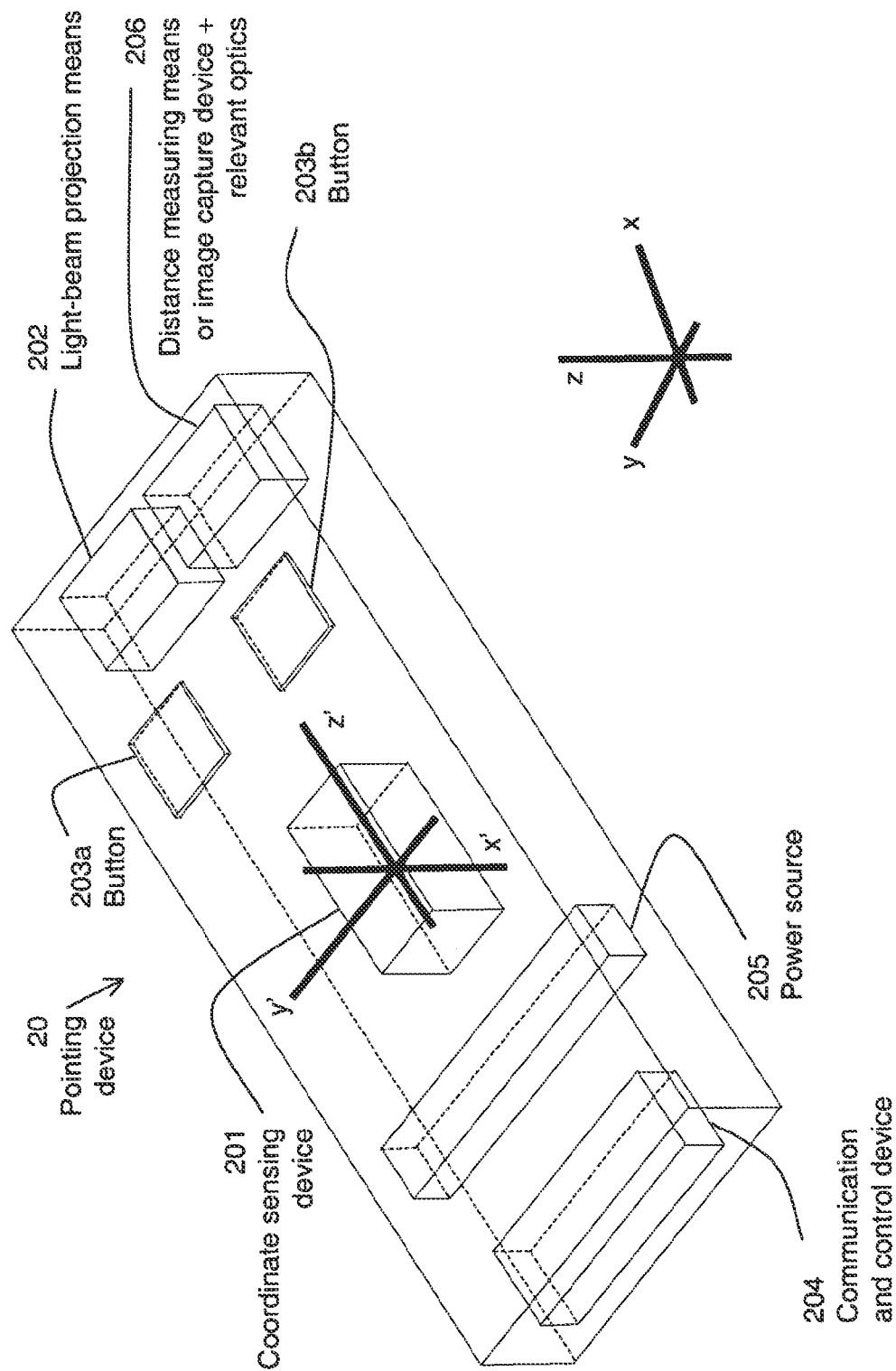
FIG. 22 shows a pointing device without base station according to a fifth embodiment.

If the horizontal keystone effect is also severe, the above cited prior art teaches that additional sensors may be used to establish the horizontal angle between projection region 60 and optical axis 401, and that they may be used to correct for the horizontal keystone effect. Using both vertical and horizontal keystone correction, a situation as depicted in prior art FIG. 20 may thus arise, characterized by a non-perpendicular alignment both in horizontal and vertical sense, nonetheless resulting in a substantially undistorted rectangular projection image 70. Such sensors may be devices such as used in distance measuring device/image capturing device 206—see also prior art FIG. 20. Alternatively, distance measuring device 206 may be used to establish the distance from the optical origin 402 of the projection beam to two well-chosen characteristic points of projection image 70. One characteristic point might be the projected center of computer screen image 50; the other one might be the projected version of a point half-way the left vertical edge of computer screen image 50. Simple application of the cosine rule (see FIG. 21, depicting a top-view of FIG. 19 for a case where the horizontal alignment is not perfectly perpendicular) shows that, if distances b and c and angle α are known (the latter angle following from knowledge of the optical dimensions of the projection beam), all other quantities in the triangle can be calculated—including the sought-after angle s. Given the above, it will be appreciated that inclusion of any such sensors will allow a unique determination of position, shape, orientation and size of projection image 70 (and a near-coincident interaction region 71 and interaction structure 72), even in the general case of a projection device 40 (integrated in the above described sense with at least base station 30 and possibly a pointing device 20) that is misaligned with respect to projection region 60 both in the horizontal and vertical sense. Note again that this may be done independent of whether or not the vertical and/or horizontal keystone effect is corrected for.

Finally, then, it will be understood that use of an image capturing device 206 of which the position and orientation in the x y z coordinate system is known may be of great help in the presently discussed embodiment, as already alluded to in paragraph 158 and 159. Indeed, those skilled in the art will recognize that distance measuring device 206 may be embodied by combining knowledge of the optical characteristics of projection device 40 (such as the dimensions of its projection beam and the size of the to-be-projected image) with information obtained from a captured image of projection image 70 by a sensor like image capture device 206. After all, if the size of projection image 70 (for ease of explanation, but not out of necessity, assumed to be rectangular) can be established using an image capture device 206, one may use knowledge of the optical characteristics of projection device 40 to easily establish the distance from its optical origin 402 to, for example, the projected center of computer screen image 50. This way, then, 3D parameters describing projection image 70, interaction region 71 and interaction structure 72 can easily be determined, as will be appreciated by those skilled in the art. Alternatively, focus mechanisms in image capture device 206 may also be found useful in this regard. In short, it will be understood that any device capable of establishing the distance from a known point in the x y z coordinate system (such as, for example, the optical origin 402 of the projection beam of projection device 40) to a point with a predetermined relation to projection image 70, interaction region 71 or interaction structure 72 is contemplated by the current application. It will also be understood that, although the above continuously referred to the projected center of computer screen image 50, this was merely intended as an example and such a point may, without loss of functionality, be replaced by any point related in a known fashion to computer screen image 5o, projection image 70, interaction region 71 or interaction structure 72.

Furthermore, other techniques disclosed in this application may be combined with the above described methods, including but not limited to those outlined in paragraphs 149, 155, 160, 161, 162, 163 and 164. In particular, calibration sensors associated with projection device 40 or base station 30 or an integrated pointing device 20 and their associated calibration methods may be combined with methods related to a user-wielded pointing device 20, as disclosed in this application. For example, the system may require the user to highlight one or more calibration marks 721a,b, . . . with a user-wielded pointing device 20, in order to correct for the horizontal non-alignment of projection device 40 and projection region 60 (the horizontal keystone-effect), while sensors incorporated in projection device 40 or base station 30 may be used to automatically correct for any vertical misalignment. Also, control points (see also paragraph 147) may be used to check the validity of the calculated position, orientation, shape and size of projection image 70, interaction region 71 and/or a near-coincident interaction structure 72. Also, it will be understood that in certain embodiments base station 30 may be left out entirely. Furthermore, distance measuring device 206 may also advantageously be left out. To explain, the reader is referred to the embodiment described in paragraphs starting at paragraph 126. If the methods and devices described there are combined with the methods and devices outlined in paragraphs 167-171, another advantageous embodiment will result. That is to say, if the position of a user-wielded pointing device 20 is not too different from the optical origin 402 of the projection beam of projection device 40, such that they may be considered to substantially coincide, it will be appreciated by those skilled in the art that a system results that does not have a need for position sensing, an associated base station 30 or distance measuring device 206. Particularly when projection region 60 is sufficiently far away from projection device 40, such that projection image 70 is relatively large, any small discrepancy between the position of a user-wielded pointing device 20 and the position of projection device 40 will be negligible. In such a case, knowledge of the dimensions of the projection beam (assuming that the angle between its optical axis 401 and projection region 60 is substantially known) will be sufficient to substantially ascertain the point-of-aim of user-wielded pointing device 20, as will be obvious from the methods disclosed in this application. An improvement on the above system may be obtained by including one or more distance sensing devices 206 that may, for example, be used to establish the horizontal and/or vertical angles between optical axis 401 and projection region 60, as described above. This way, it is possible to compensate for a non-perpendicular alignment that might, without inclusion of such sensors, cause intolerable errors in the computation of the point-of-aim of a user-wielded pointing device 20.

Figure 23:
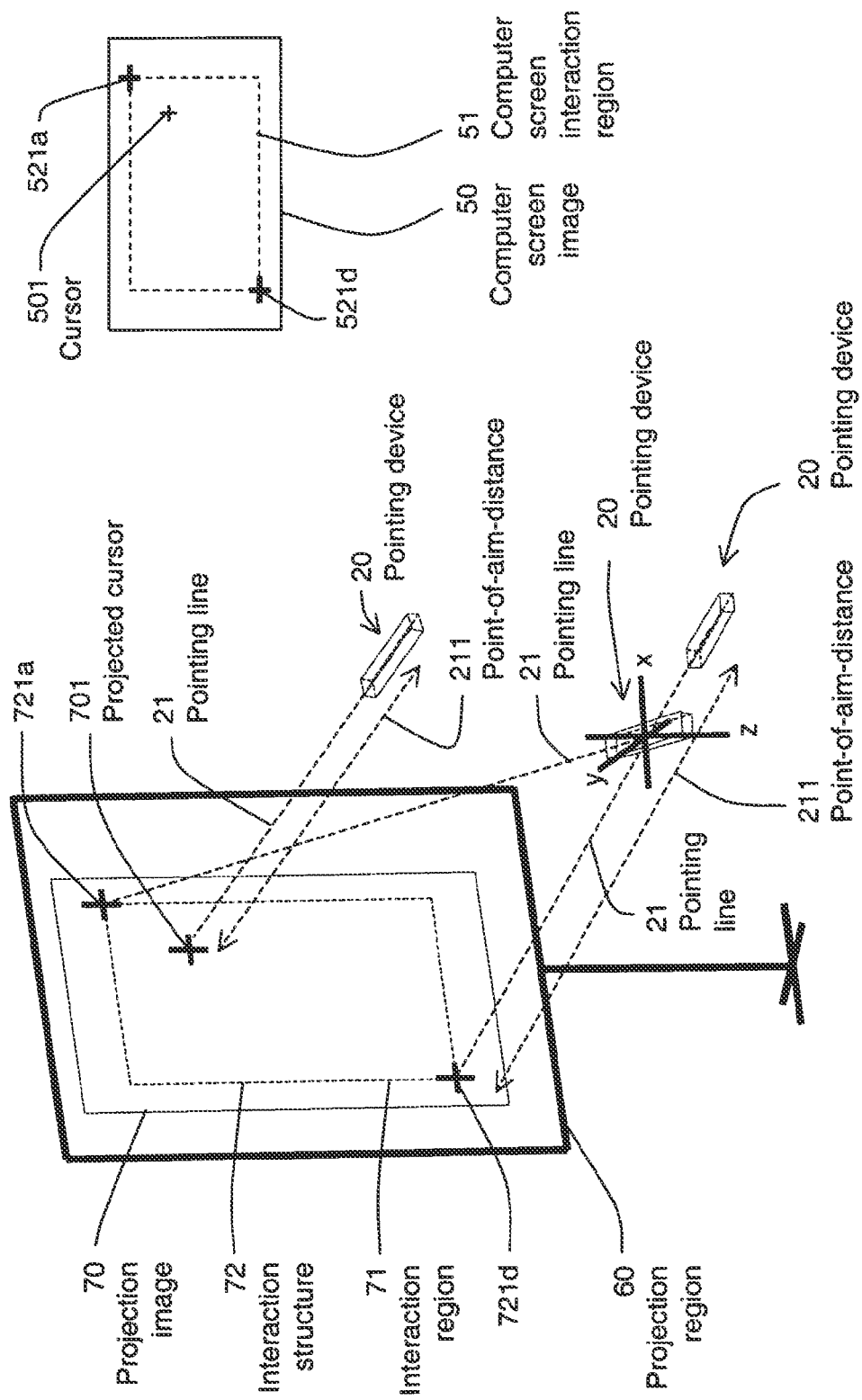
FIG. 23 shows a fifth preferred embodiment.

Yet another preferred embodiment results as a variation on a combination of the embodiments described in paragraphs 120-125 and paragraphs 126-145, and will be disclosed here with reference to FIGS. 3, 11, 12, 22, and 23. It will be understood that, for reasons of clarity, projection device 40 has not been drawn in FIG. 23. The present embodiment is characterized by a pointing device 20 that is equipped with at least a distance measuring device 206 and a coordinate sensing device 201 that may be limited to sensing orientation. Such a coordinate sensing device 201 may for example rely on an electronic compass like the HMR3300, on gyroscopes, on combinations of the above, or on any other suitable technology. It will be assumed that the position of pointing device 20 does not change substantially while the calibration procedures described in FIGS. 3, 11 and 12 are executed, as indicated in FIG. 23 by the two near-coinciding instantiations of pointing devices 20. For purpose of explanation it will therefore be assumed that the origin of coordinate system x y z and the origin of coordinate system x' y' z' are coincident, at least while the above-mentioned calibration procedures are executed. Finally, it will be assumed that one of the axes of the orthogonal coordinate system x y z is substantially vertical while the other two are substantially horizontal (the inclusion of a level-sensing device 303, not specifically shown in FIG. 22 for reasons of clarity, may be beneficial in this context).

The operation of the present embodiment will now be described with reference to FIGS. 3, 11, and 12. The process elements in FIG. 3 will be identical to the ones described in the first embodiment, resulting in similar assumptions regarding the shape of interaction region 71 (and interaction structure 72) and possibly orientation and position of interaction structure 72. In particular, a default distance between interaction structure 72 and the origin of coordinate system x y z will be assumed for purpose of initialization.

With reference to FIG. 11, program flow now continues at 120a. Program elements 120a-120h are shown to be similar to program elements 90a-90m (FIG. 4), except that only point CA, set A and counter a are considered. That is to say, in the present embodiment it is no longer necessary to determine the second point CB and associated repositioning of pointing device 20 during the calibration procedure, since the position of pointing device 20 is assumed not to change substantially from the origin of coordinate system x y z during execution of the steps considered.

After program element 120h, program flow continues with program elements outlined in FIG. 12. Referring to FIG. 12, program elements 130a-130g are seen to be similar to steps 100a-100p of FIG. 5. Comparing program element 130f with program element 100f (FIG. 5), it can be seen that at 130f the program also stores information on the point-of-aim-distance between the origin of the x' y' z' coordinate system and at least one of points C(p), indicated in FIG. 23 as 721d. Comparing elements 130g and 100p (FIG. 5), it can be seen that these point-of-aim-distances (2u in FIG. 23) are also used in determining the 3D coordinates of the points in set P.

With complete information on the 3D coordinates of the points in set P, it is then possible to construct a 3D description of interaction structure 72 (see FIG. 23). Therefore, program elements 110a-110k as described earlier with reference to FIG. 6 may also be followed in the present embodiment.

As in previously a described embodiment, the above outlined embodiment may be satisfactorily used as a direct-pointing system if the position of pointing device 20 does not change substantially from the origin of coordinate system x y z. When the user moves to a different part of the room the position of pointing device 20 will, by assumption, be unknown (since coordinate sensing device 201 was assumed to only be capable of sensing orientation). This position then needs to be reestablished in order to be able to execute steps like 110*f* and 110*h* (see FIG. 6), which allow the system to be used for direct-pointing cursor control.

In order to reestablish the position of pointing device 20 the user may be required to direct pointing line 21 to substantially pass through a point of which the 3D coordinates are substantially known in coordinate system x y z. In doing so, the user may but need not be assisted by light-beam projection device 202. This point could, for example, be a corner point or any other well-defined point of interaction structure 72 (which, by assumption, coincides with interaction region 71). Advantageously, it could be the last position that projected cursor 701 (see FIG. 23) was directed to. After all, the 3D characteristics of interaction structure 72 (and interaction region 71) are known, as is the position of computer cursor 501; the inverse of map M can then easily be used to compute the 3D characteristics of projected cursor 701. It will also be apparent that measurements of the orientation of pointing line 21 and point-of-aim-distance 211 will then constitute enough information to calculate the position of pointing device 20 in coordinate system x y z. With the position of pointing device 20 reestablished, the present embodiment can again successfully be used to control the computer cursor in a direct-pointing manner. This will remain to be the case as long as the position of pointing device 20 does not stray far from the recently reestablished position.

The applicant recognizes that the action of directing pointing line 21 through the above-mentioned well-defined point (whilst measuring point-of-aim-distance 211 and orientation of pointing device 20) may result in a pointing line 21 not perfectly passing through this point, especially if the user is not aided by light-beam projection means 202. Indeed, any errors made during this action will result in similar mismatches between subsequently calculated points-of-aim and true points-of-aim of pointing device 20. These mismatches may not be too apparent to the user though since, presumably, the user was not capable of discerning such a mismatch when attempting to direct pointing line 21 through the above mentioned well-defined point, as will be appreciated by those skilled in the art. Consequently, the present embodiment may still afford the user the feeling of direct-pointing cursor control under such circumstances.

Sensors capable of sensing position may but need not be added to the coordinate sensing device 201 of the current embodiment. Indeed, even if these sensors were only capable of maintaining positional accuracy over a limited period of time (e.g., sensors based on accelerometer technologies), their inclusion could still be advantageous. For example, such sensors may be employed to accurately track the position of pointing device 20 over the relatively short period of time that starts when the user directs pointing line 21 through the above-mentioned well-defined point (whilst measuring point-of-aim-distance 211 and orientation of pointing device 20), and ends when the user indicates his or her desire to stop direct-pointing cursor control. This way, direct-pointing cursor control can still be maintained even if the position of pointing device 20 strays relatively far from the position it was in at the start of the above-mentioned period of time. In a similar way, such position sensors may also be beneficial during the (relatively short) calibration procedures aimed at establishing the 3D characteristics of interaction structure 72 (and, by assumption, interaction region 71), and can help to reduce errors that are due to a violation of the assumption that the position of pointing device 20 remains constant. The inclusion of such sensors may even obviate the need for distance measuring device 206 during calibration, when they are used according to the methods of earlier described embodiments (see for example paragraphs 107-113).

Distance measuring device 206 may be embodied by a laser sensor such as implemented in the TruLaser TLM100 Distance Measurer manufactured by Stanley. Such sensors are exceptionally well suited for the present embodiment, being capable of accurately determining distance along a pointing line 21 to a point on a plane, even if the angle between the plane's normal and pointing line 21 is large. Other distance sensors that experience more difficulty under such circumstances may however also be used satisfactorily. For example, (ultra)sonic sensors such as the MaxSonar-EZI as manufactured by Maxbotix have a measurement beam that is far broader than that of the above mentioned laser-sensor. Such (ultra)sonic sensors are known to be susceptible to measurement errors when the beam's central axis is at a large angle to the normal of a smooth plane it is aimed at. Approximate knowledge of this angle may conceivably be used to at least partially correct for such errors, as will be appreciated by those skilled in the art.

A system based on coordinate sensing device 201 capable of sensing orientation (such as the HMR3300 electronic compass) in combination with an (ultra)sonic distance measuring device 206 (such as the MaxSonar-EZI) constitutes a particularly economical and consequently advantageous preferred embodiment, which will now be described. Using methods outlined in the embodiment described in paragraphs 126-145, the orientation, size and position of an interaction structure 72 that is a scaled and parallel version of interaction region 71 can readily be found. For example, if it is assumed that interaction region 71 is substantially a rectangle with horizontal and vertical sides, it is sufficient to consider only 3 calibration lines. If it is furthermore assumed that the aspect ratio of this rectangle is known, only 2 calibration lines suffice to narrow the number of possible solutions for interaction structure 72 down to 2. This can be understood by considering an example of two calibration lines passing through lower left corner C(3) and upper right corner C(2), depicted as 721*d* and 721*a* in FIG. 23. If the lower left corner of interaction structure 72 (which is assumed to be a scaled and parallel version of the rectangular interaction region 71) lies at such a distance from the origin that its z-coordinate equals 1, we find $$C(2) = \lambda_2 \cdot \begin{pmatrix} Rx2 \\ Ry2 \\ Rz2 \end{pmatrix} \tag{21}$$

$$C(3) = \begin{pmatrix} LLx \\ LLy \\ 1 \end{pmatrix} \tag{22}$$

Here, LLx, LLy, Rx2, Ry2 and Rz2 are known, since C(3) and C(2) lie on pointing lines 21 of which the orientation has been measured. If we subsequently require these points to define a rectangle with horizontal and vertical sides and aspect ratio rat, we find $$\sqrt{(LLx-\lambda_2 \cdot Rx2)^2 + (LLy-\lambda_2 \cdot Ry2)^2} = rat \cdot$$
$$\sqrt{(\lambda_2 \cdot Rz2-1)^2} \Rightarrow (Ry2^2 + Rx2^2 - rat^2 \cdot Rz2^2) \cdot \lambda_2^2 + (-2 \cdot LLx \cdot Rx2 - 2 \cdot LLy \cdot Ry2 + 2 \cdot rat^2 \cdot Rz2) \cdot \lambda_2 + (LLx^2 - rat^2 + LLy^2) = 0 \tag{23}$$

which can readily be solved for λ. Because of the quadratic nature there will in general be 2 solutions to Equation (23), and additional data is needed to pick the correct solution. This may be in the form of a third line passing through yet another characteristic point of interaction structure 72, but it may also be in the form of knowledge of the (approximate) angle between the plane in which interaction structure 72 lies and a line connecting the origin to one of its characteristic points. The applicant realizes that the above equation may not always generate real solutions for $\lambda_2$, since the pertinent determinant may be negative due to measurement errors, a mismatch between the true and assumed aspect ratio, etc. Those skilled in the art will appreciate, however, that there are many ways to find real values for L that approximately solve Equation (23). For example, the value for rat may be slightly varied from its a-priori value to the point where Equation (23) yields real solutions, which may be acceptable as solutions to the original problem. Other ways of finding approximate solutions are also contemplated by the current application.

It will be understood that an interaction structure 72 that substantially coincides with interaction region 71 can be readily found if the distance from the origin to at least one of the characteristic points of the latter is measured. Such a measurement can be made using accurate sensors based on (for example) laser technology. If (ultra)sonic sensors are used for this purpose, knowledge of the angle between the (ultra)sonic beam (for purpose of explanation assumed to be substantially centered on pointing line 21) and the normal to the plane in which interaction region 71 lies may prove beneficial, as will be appreciated by those skilled in the art of (ultra)sonic distance measurement. This angle can be readily calculated, as outlined above, once the orientations of a minimum of two calibration lines have been measured, and may advantageously be used during processing of any (ultra)sonic distance measurement(s).

Figure 24:
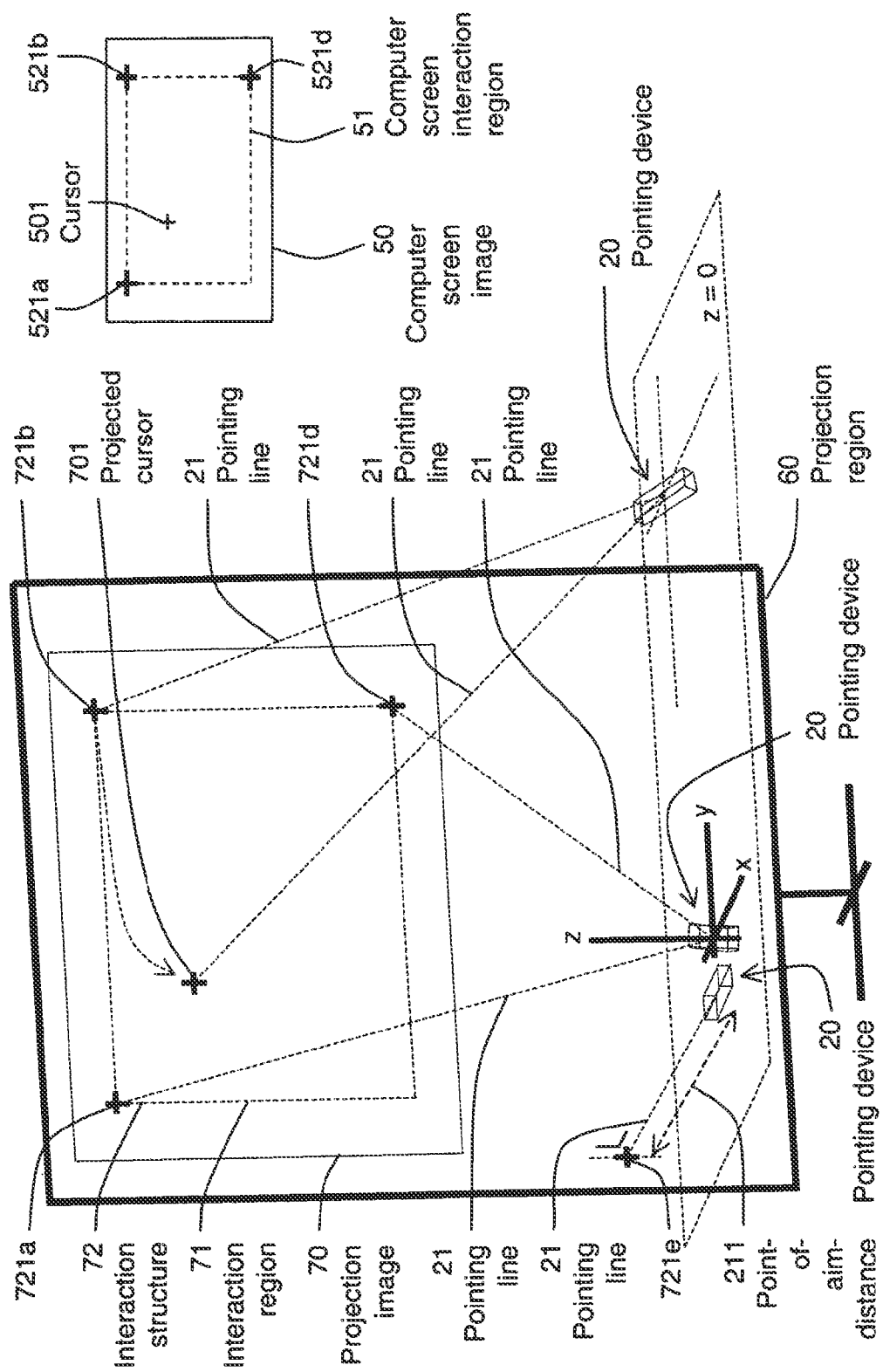
FIG. 24 shows a sixth preferred embodiment.

The accuracy and reliability of the (ultra)sonic distance measurement may be greatly enhanced if the angle between the (ultra)sonic beam and the normal to the plane in which interaction region 71 lies is small. For this reason, the user may advantageously be asked to execute the entire calibration procedure from a position that meets such a requirement. It will be obvious that the fulfillment of this requirement may be tested once the orientation of at least 2 calibration lines has been measured. In general, the user may be directed to perform the required distance measurement(s) whilst orienting pointing device 21 in one or more directions deemed most advantageous. For example, the user may be asked to substantially point at the center of interaction region 71, at certain points on its edges, or trace out a diagonal of interaction region 71 whilst multiple distance measurements are taken. Many other ways of measuring a suitable distance parameter are possible. With reference to FIG. 24 (for purpose of clarity projection device 40 has been omitted from the drawing, and interaction region 72 and interaction structure 71 have been depicted as coincident), it may in some cases be advantageous to take a distance measurement whilst directing pointing device 20 at a point that does not lie in interaction region 71, but has a defined relationship to it. Such points may include a point 721e that substantially lies in the same horizontal plane as pointing device 20 (that is, with vertical coordinate substantially equal to 0) as well as in the plane in which interaction region 71 lies (which is assumed vertical). This will result in a measurement for which the (ultra)sonic beam and the plane in which interaction region 71 lies are substantially perpendicular in the vertical sense, which may constitute more optimal conditions for the use of (ultra)sonic measurement devices. This can be advantageous in situations where interaction region 71 is mounted so high above pointing device 20 that any pointing line 21 pointed at interaction region 71 will have a large angle with the normal to the plane in which interaction region 71 lies, as depicted in FIG. 24. Even more optimal circumstances might be created if point 721e is chosen such that pointing line 21 perpendicularly intersects the plane in which interaction region 71 lies in both horizontal and vertical sense. Other points that have a defined relationship to interaction region 71 may also be used advantageously. It will be evident that the validity of desirable conditions (such as the (ultra)sonic beam being near-horizontal) can easily be checked, since the orientation of pointing device 20 with respect to coordinate system x y z, as well as with respect to interaction region 71, are known, measurable or can be calculated.

Even without distance measuring device 206, the outlined methods provide for a direct-pointing cursor control system as long as pointing device 20 substantially remains at one and the same position. When the user decides to move to a different location in the room, depicted in FIG. 24 as the third instantiation of pointing device 20, the position of pointing device 20 will be unknown and has to be at least partially reestablished. As explained earlier, this may be accomplished by requiring the user to direct pointing line 21 through a well-defined point of which the 3D coordinates are known in coordinate system x y z, whilst measuring the orientation of pointing line 21 and point-of-aim-distance 211. However, an (ultra)sonic distance measuring device 206 may not be capable of establishing point-of-aim-distance 211 with sufficient accuracy, especially when the angle between pointing line 21 and interaction region 71 is unfavorable. Also, measuring point-of-aim-distance 211 may take too much time to be convenient during operation of the invention as a direct-pointing cursor control system. In such cases, with reference to FIG. 24, use may be made of the fact that an average user will tend to wield pointing device 20 in the same horizontal plane as from which the initial calibration routine was executed. Under such circumstances, the position of pointing device 20 can be reestablished without the need for a distance measurement, namely as the intersection of pointing line 21 with a horizontal plane with vertical coordinate z=0, i.e., with a plane through the origin of coordinate system x y z (chosen such that it contains the point from where the calibration procedures were executed). Advantageously, the well-defined point mentioned above may be chosen such that the angle between pointing line 21 and the normal to the plane with vertical coordinate z=0 is as small as possible, so as to minimize the error in the calculated position. Other choices are also possible; good candidates may include points close to the upper edge of interaction region 71 such as its upper right corner 721b, depicted in FIG. 24. It will be appreciated that small errors in calculated position resulting from the fact that pointing device 20 is not always held exactly at the same vertical position may still afford the user the feeling that the cursor is controlled in a direct-pointing manner. To the user, then, the invention affords a system where the cursor may be 'grabbed out of the top right screen corner', and subsequently moved about in a direct-pointing manner.

Those skilled in the art will appreciate that the user may but need not be required to 'grab the cursor' every time he or she desires to engage in direct-pointing cursor control. For example, pointing device 20 may be equipped with two buttons that activate cursor control, namely one that requires the user to first direct pointing line 21 through a well-defined point and another that presumes the position of pointing device 20 has not substantially changed since the last time the cursor was activated. Alternatively, the user may be required to indicate his or her desire to reestablish position in other ways, for example by executing a predefined motion pattern such as shaking pointing device 20; coordinate sensing device 201, possibly in combination with additional sensors such as accelerometers and gyros may be of help under these circumstances. Still alternatively, the system may include algorithms aimed at detecting when pointing device 20 may have strayed far enough to warrant reestablishing its position in coordinate system x y z. Such detection algorithms may for example be based on elapsed time, on inertial measurements made by gyros and/or accelerometers that may be part of coordinate sensing device 201, on distance measurement devices capable of sensing received power from a transmitting device fixed in space, etc. All of these and similar methods are contemplated by the invention.

It will also be appreciated that inclusion of coordinate sensing devices 201 that are capable of maintaining positional accuracy over a limited amount of time (e.g., inertial sensors) may obviate the need for distance measuring device 206 both during calibration as well as during operation of the present embodiment. This may be understood by considering calibration methods outlined in earlier described embodiments (see for example paragraphs 107-113) m combination with methods outlined in paragraph 184.

Thus, methods and means are disclosed that afford a compact system for interacting with a presentation in a direct-pointing manner, whilst leaving the presenter free to move about the presentation venue. This system, moreover, obviates the need for a base-station 30 that embodies a coordinate system x y z, and for a coordinate sensing device 201 capable of continuously tracking positional coordinates of pointing device 20 in this coordinate system.

It will be obvious that elements of the various disclosed embodiments can advantageously be combined. In particular, combining the embodiments described in paragraphs 167-172 and paragraphs 173-188 will result in a system that may calibrate itself automatically, and leaves the presenter free to move about the presentation venue whilst engaging in direct-pointing interaction with the display. Moreover, the resulting system obviates the need for a base-station 30 that embodies a coordinate system x y z, and for a coordinate sensing device 201 capable of continuously tracking positional coordinates.

Figure 25:
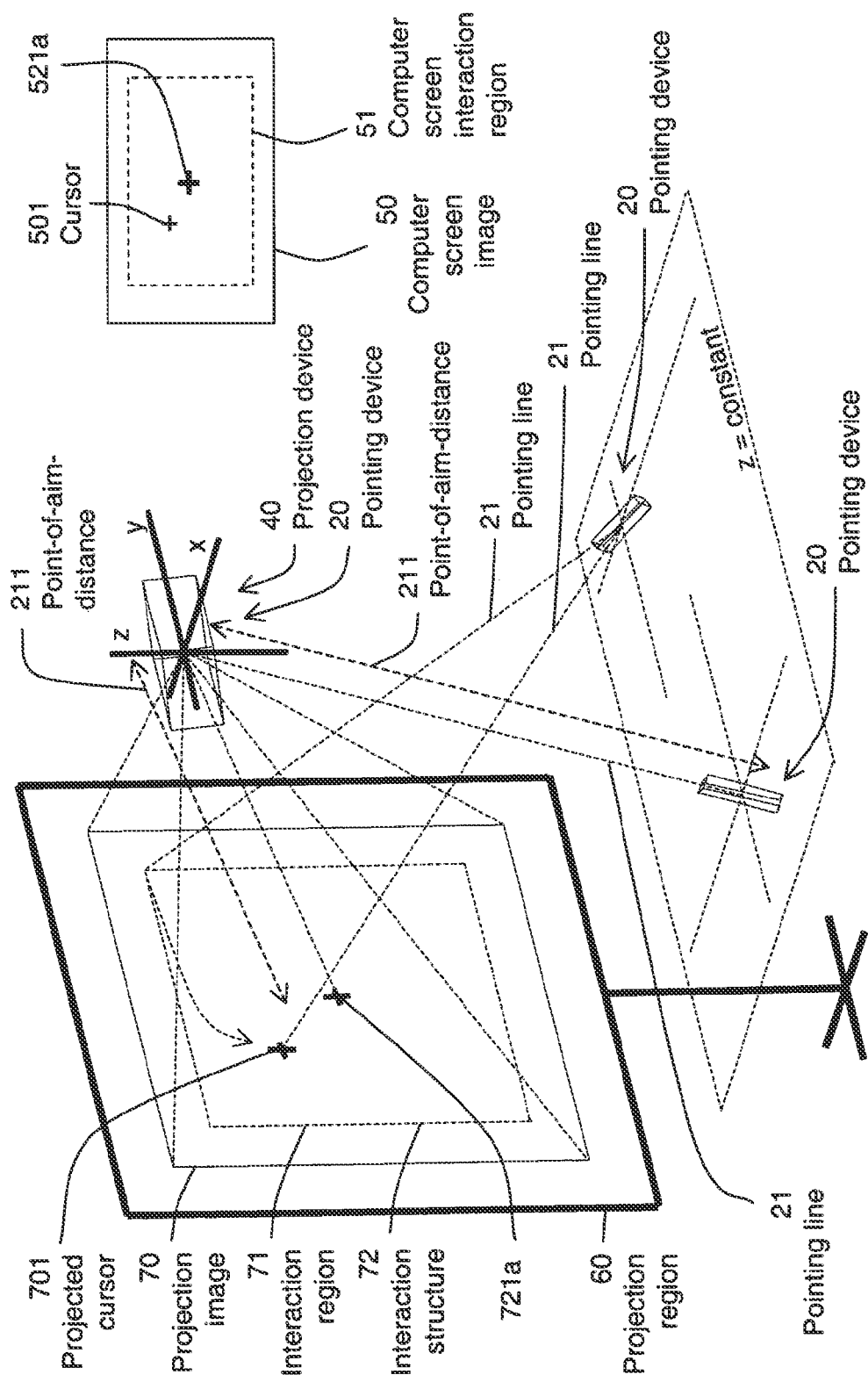
FIG. 25 shows a seventh preferred embodiment.

In particular, when use is made of distance measurement devices 206 for which the sensitive axis is relatively poorly defined (such as (ultra)sonic devices), methods disclosed in paragraphs 167-172 and 182-188 may still result in an economical and versatile system for which the calibration procedure is almost completely automatic. To clarify, reference is made to FIG. 25, where projection device 40 is integrated with a pointing device 20 that contains at least distance measurement device 206 and coordinate sensing device 201. As explained in previous embodiments, this may result in a system capable of automatically establishing size, orientation and position of interaction structure 72 (and, by assumption, interaction region 71) as measured in a coordinate system x y z that has a predetermined relation to projection device 40. Moreover, since the line-of-sight between projection device 40 and interaction region 71 will in general be unimpeded, and since the angles pertinent to the problem are very well defined, those skilled in the art will appreciate that distance sensing device 206 may advantageously be embodied by (ultra)sonic sensors. What remains, then, is to find the vertical coordinate of the plane in which the user generally deploys the user-wielded pointing device 20, depicted in FIG. 25 as the 'z=constant' plane.

To this end, the user-wielded pointing device 20 may also be equipped with a distance measuring device 206, and the user may be required to perform a one-time calibration step by directing it towards a known point in coordinate system x y z whilst measuring both orientation of the pertinent pointing line 21 as well as the pertinent point-of-aim-distance 211. This known point can advantageously be chosen to coincide with projection device 40, particularly so if distance sensing devices 206 of both projection device 40 and user-wielded pointing device 20 are based on (ultra)sonic technology. In such a case it will be obvious to those skilled in the art that the pertinent point-of-aim-distance 211 can be measured with relatively high accuracy, since (ultra)sonic transducers will be present both at the target and at the source. Alternatively, the user may be asked to direct user-wielded pointing device 20 to two or more known points in coordinate system x y z, such as top right and lower left corner of interaction region 71, after which its position can be found by triangulation. In the latter case there is not even a need to incorporate a distance sensing device 206 in user-wielded pointing device 20. Whatever choice is made, the above outlined methods yield enough information to establish the position of user-wielded pointing device 20 and, in particular, the z-coordinate of the plane in which it generally resides, so that methods outlined in paragraphs 182-188 may be successfully employed to re-establish its position in case it is moved to a different location. As such, this system will be seen to be highly flexible, relatively inexpensive to manufacture, and extremely user-friendly. Indeed, the necessary equipment may come in the form of modules that can be retrofitted to existing projection devices 40 not specifically equipped for this application.

It will be understood that in some cases it may be unnecessary to provide a separately embodied base station 30, whilst still providing a coordinate sensing device 201 capable of tracking orientational and positional coordinates. For example, coordinate sensing device 201 may partly or completely rely on inertial sensing means such as accelerometers and gyroscopes, or on distance measurements with respect to walls, ceiling and/or floor. In such cases it would be possible to leave out base station 30 entirely and simply choose an appropriate x y z coordinate system. In such embodiments communication and control device 204 could be configured to communicate directly with the computer.

The present invention also contemplates the use of automated procedures to establish the nature of the calibration points 721*a*, 721*b*, 721*c*, 721*d*, based on the measurements of the orientation and/or position of the pointing lines 21 that substantially pass through them. For example, with reference to FIG. 7, calibration points 721*a* and 721*d* need not be explicitly identified to the user as upper-right and lower-left corner respectively, but may merely be identified as diagonally opposite corners. Those skilled in the art will appreciate that in such a case an automated procedure may use the measurements of orientation and/or position of both pointing lines 21, specifically with respect to the x-y-plane, to identify which of the two lines passes through the upper one of the two diagonally opposite corners. The practical consequence to the user is that the user need not be concerned about which of the two calibration points 721*a* and 721*d* is highlighted first. Similar arguments can be used to construct automated procedures that determine whether a pointing line 21 substantially passes through a left or a right corner of interaction region 71 (and, by assumption, of interaction structure 72). For example, the a-priori assumption may be made that the clock-wise angle between a pointing line 21 through a left corner and a pointing line 21 through a right corner, measured parallel to the x-y-plane, should not exceed 180 degrees, as will be appreciated by those skilled in the art.

Finally, although the methods disclosed by the present invention are described in 3D, the invention may also be applied in 2D scenarios.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a first device that is configured to be taken along by a user and that includes:
a memory,
a display,
a processor,
a communication device, and
a plurality of sensors that includes:
a digital camera;
a gyro; and
a accelerometer;
wherein the system is configured to detect position and orientation of the first device based on output of at least one of the plurality of sensors;
a second device that is different from the first device and that is configured to be wielded in mid-air and that includes:
a second gyro; and
a second accelerometer,
a third device that is different from the first device and the second device and that is configured to be wielded in mid-air and that includes:
a third gyro; and
a third accelerometer,
wherein the system is configured to detect changes in position of the second device based at least in part on output of the second gyro and the second accelerometer,
wherein the system is configured to detect position of the third device based at least in part on output of the third gyro and the third accelerometer,
the positions of the second and third devices being relative to the first device.

2. The system according to claim 1,
wherein the detecting of changes in position of the second device is not based on output of the digital camera, and
wherein the detecting of changes in position of the third device is not based on output of the digital camera.

3. A system comprising:
a first remote control device that is configured to be wielded in mid-air and that includes:
a first processor;
a first orientation sensor;
a first wireless communication device; and
a first user input element;
a second remote control device that is configured to be wielded in mid-air and that includes:
a second processor,
a second orientation sensor,
a second wireless communication device, and
a second user input element;
a third device that is different from the first and second remote control devices, the third device including:
a third processor,
a third orientation sensor,
a third wireless communication device,
a display, and
a memory;
wherein the first remote control device is configured to detect orientation based on a first output of the first orientation sensor,
wherein the second remote control device is configured to detect orientation based on a second output of the second orientation sensor;
wherein the third device is configured to detect orientation based on a third output of the third orientation sensor;
wherein the third wireless communication device is responsive to a first wireless signal from the first wireless communication device and responsive to a second wireless signal from the second wireless communication device;
wherein the third processor is configured to control a location of a feature displayed on the display in response to at least one of the first wireless signal and the second wireless signal;
wherein the first remote control device is configured to send, via the first wireless communication device, a first identifier of the first device to the third device, the first identifier identifying the first device; and
wherein the second remote control device is configured to send, via the second wireless communication device, a second identifier of the second device to the third device, the second identifier identifying the second device.

4. The system according to claim 3,
wherein the first remote control device includes buttons, and
wherein the second remote control device includes buttons.

5. The system of claim 3, wherein the first orientation sensor includes a first accelerometer and a first gyro, the second orientation sensor includes a second accelerometer and a second gyro, and the third orientation sensor includes a third accelerometer.

6. The system of claim 5, further comprising a position sensor configured to sense positions of the first and second remote control devices relative to the third device, and to sense position of the third device, wherein the third processor is configured to control a location of the feature based on signals from the position sensor.

7. The system of claim 3, wherein the display is configured to be head-worn.

8. A system comprising:
a first device that includes:
a first processor,
a first sensor, and
a first communication device;
a second device, different from the first device, that includes:
a second processor,
a second sensor, and
a second communication device;
a third device that includes:
a display,
a memory,
a third processor,
a third sensor, and
a third communication device;
wherein each of the first and second devices is configured to be wielded in mid-air;

wherein the third communication device is responsive to signals from the first and the second communication devices;

wherein the third device is configured to control a location of a first feature on the display in response to the signal from the first device; and wherein the first device is configured to send a first identifier to the third device and the second device is configured to send a second identifier to the third device.

9. The system of claim 8, wherein the display is configured to be head worn.

10. The system of claim 8, wherein the third device is configured to respond to a change in an orientation of the first device based on the first signal.

11. The system of claim 8, wherein the third device includes a digital camera.

12. The system of claim 8, wherein at least one of the first device and the second device includes a pressure sensor.

13. The system of claim 8, wherein the first identifier comprises a first unique processor readable identifier and the second identifier comprises a second unique processor readable identifier.

* * * * *